United States Patent
Lee et al.

(10) Patent No.: US 11,134,294 B2
(45) Date of Patent: Sep. 28, 2021

(54) IMAGE DISPLAY APPARATUS AND MOBILE TERMINAL

(71) Applicant: LG ELECTRONICS INC., Seoul (KR)

(72) Inventors: Eunjung Lee, Seoul (KR); Jaekyung Lee, Seoul (KR); Seunghyun Heo, Seoul (KR); Obong An, Seoul (KR); Mingi Kim, Seoul (KR); Gahyun Sun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/741,439

(22) PCT Filed: Jul. 21, 2015

(86) PCT No.: PCT/KR2015/007547
§ 371 (c)(1),
(2) Date: Jan. 2, 2018

(87) PCT Pub. No.: WO2017/003007
PCT Pub. Date: Jan. 5, 2017

(65) Prior Publication Data
US 2018/0205983 A1    Jul. 19, 2018

(30) Foreign Application Priority Data

Jul. 2, 2015  (KR) ........................ 10-2015-0094881
Jul. 2, 2015  (KR) ........................ 10-2015-0094883

(51) Int. Cl.
*H04N 21/41*    (2011.01)
*H04N 21/436*   (2011.01)
(Continued)

(52) U.S. Cl.
CPC ....... *H04N 21/4126* (2013.01); *G06F 3/1454* (2013.01); *G06F 3/1462* (2013.01);
(Continued)

(58) Field of Classification Search
None
See application file for complete search history.

(56) References Cited

U.S. PATENT DOCUMENTS 9,490,998 B1 * 11/2016 Danciu ............... H04L 12/2818
2011/0314386 A1 * 12/2011 Jeong .................... G06F 3/0487
715/741

(Continued)

FOREIGN PATENT DOCUMENTS

| WO | WO 2012/044676 A2 | 4/2012 |
| WO | WO 2012/150744 A1 | 11/2012 |
| WO | WO 2014/189289 A1 | 11/2014 |

OTHER PUBLICATIONS

Choi, "Samsung Releases New Remote Controller for Smart TV," bloter.net, Jan. 2, 2014, pp. 1-5, with an English translation.
(Continued)

*Primary Examiner* — Jason K Lin
(74) *Attorney, Agent, or Firm* — Birch, Stewart, Kolasch & Birch, LLP

(57) ABSTRACT

The present invention relates to an image display apparatus and a mobile terminal. The image display apparatus according to one embodiment of the present invention comprises: a display; an interface unit for exchanging data with the mobile terminal; and a control unit for controlling a mirroring related menu including mirroring related server information or content related to the server information such that the mirroring related menu is displayed on the basis of a user input, receiving a mirroring application item from the mobile terminal through the interface unit, and controlling the received mirroring application item such that the
(Continued)

received mirroring application item is displayed in the mirroring related menu. Therefore, the mirroring application item received from the mobile terminal can be simply installed and displayed.

5 Claims, 68 Drawing Sheets

(51) Int. Cl.
| | | |
|---|---|---|
| *H04N 21/414* | (2011.01) | |
| *G06F 3/14* | (2006.01) | |
| *H04N 21/254* | (2011.01) | |
| *H04N 21/4223* | (2011.01) | |
| *H04M 1/72412* | (2021.01) | |
| *H04N 21/422* | (2011.01) | |
| *H04N 21/4363* | (2011.01) | |
| *H04N 21/475* | (2011.01) | |
| *H04N 21/478* | (2011.01) | |
| *H04M 1/72469* | (2021.01) | |
| *H04W 76/10* | (2018.01) | |
| *H04N 21/485* | (2011.01) | |
| *H04W 88/02* | (2009.01) | |

(52) U.S. Cl.
CPC ...... *H04M 1/72412* (2021.01); *H04N 21/254* (2013.01); *H04N 21/4122* (2013.01); *H04N 21/41407* (2013.01); *H04N 21/4223* (2013.01); *H04N 21/42206* (2013.01); *H04N 21/436* (2013.01); *H04N 21/43637* (2013.01); *H04N 21/478* (2013.01); *H04N 21/4753* (2013.01); *G09G 2370/022* (2013.01); *G09G 2370/16* (2013.01); *H04M 1/72469* (2021.01); *H04N 21/485* (2013.01); *H04W 76/10* (2018.02); *H04W 88/02* (2013.01)

(56) References Cited

U.S. PATENT DOCUMENTS

| | | | |
|---|---|---|---|
| 2013/0124740 A1 | 5/2013 | Liansky et al. | |
| 2013/0212286 A1 | 8/2013 | Krishnakumar et al. | |
| 2013/0254291 A1* | 9/2013 | Park | H04L 65/403 |
| | | | 709/204 |
| 2014/0009394 A1* | 1/2014 | Lee | H04N 5/4403 |
| | | | 345/157 |
| 2014/0208205 A1 | 7/2014 | Bartholomew | |
| 2014/0297674 A1* | 10/2014 | Rhee | G06F 3/167 |
| | | | 707/758 |
| 2014/0325561 A1* | 10/2014 | Allen | H04N 21/2393 |
| | | | 725/38 |
| 2015/0229997 A1* | 8/2015 | Park | H04N 21/482 |
| | | | 725/38 |
| 2016/0261905 A1* | 9/2016 | Aruga | G06K 7/10366 |
| 2017/0149873 A1* | 5/2017 | Jang | H04N 21/4402 |

OTHER PUBLICATIONS

Lee, "From Nexus 6 to the Player, What has Changed?," Tech Hollic, www.techholic.eo.kr/news/articleView.html?idxno=23510, Oct. 7, 2014, pp. 1-9, with an English translation.

* cited by examiner

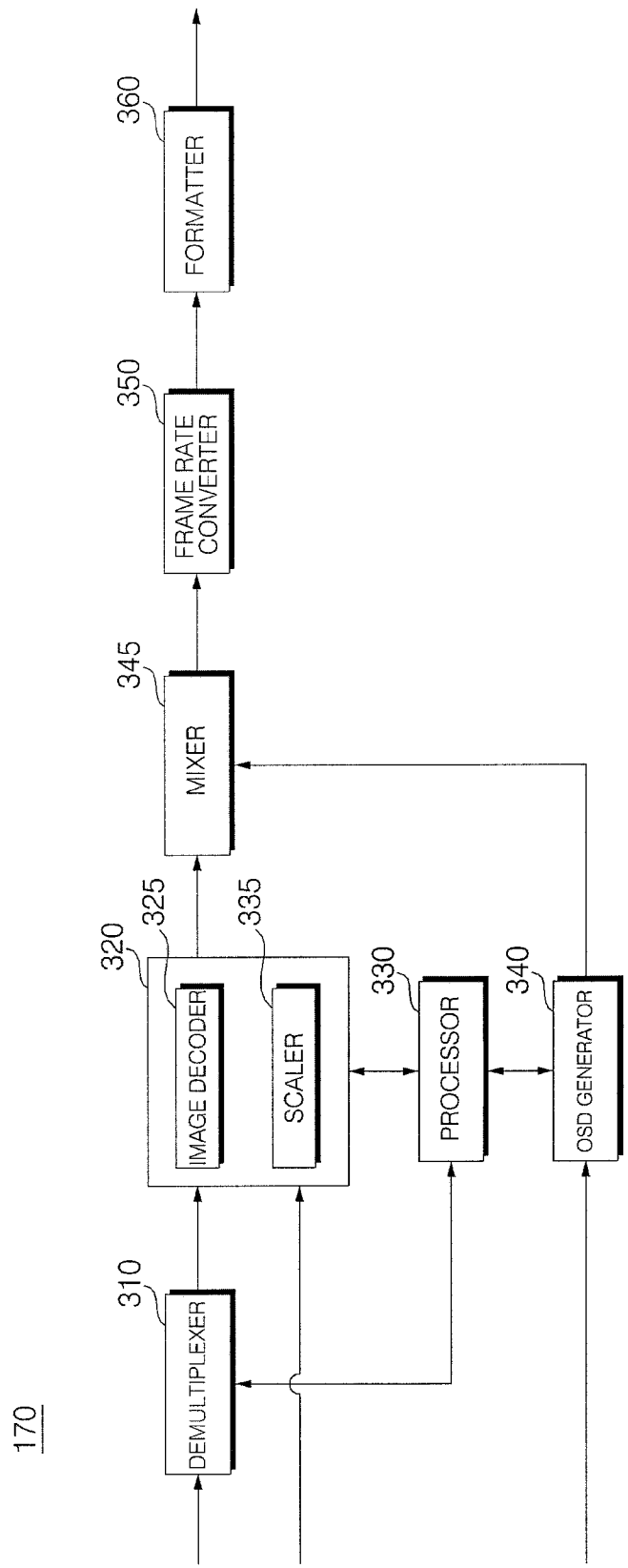

FIG. 7F
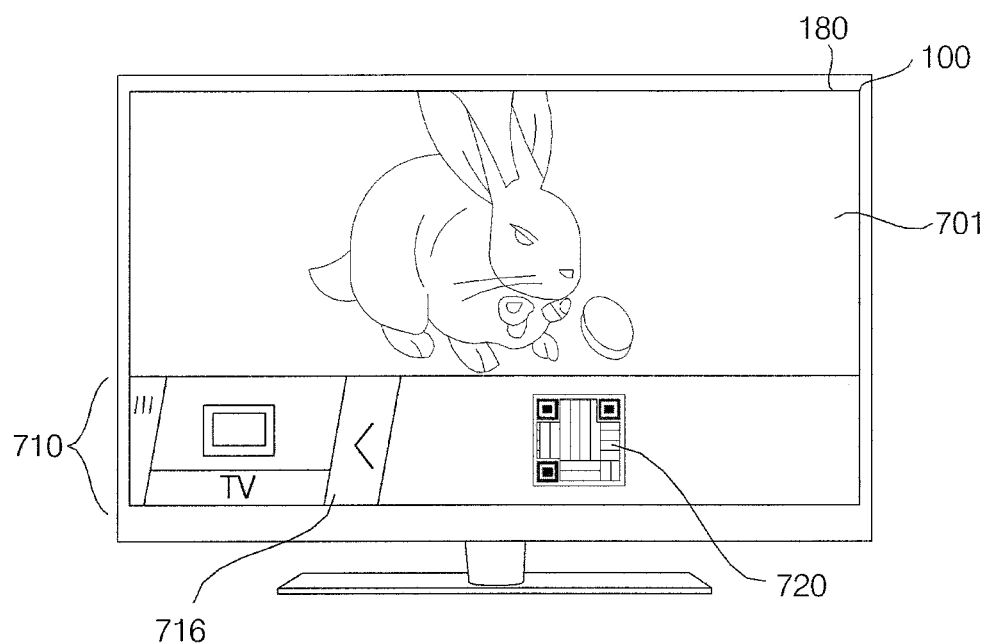
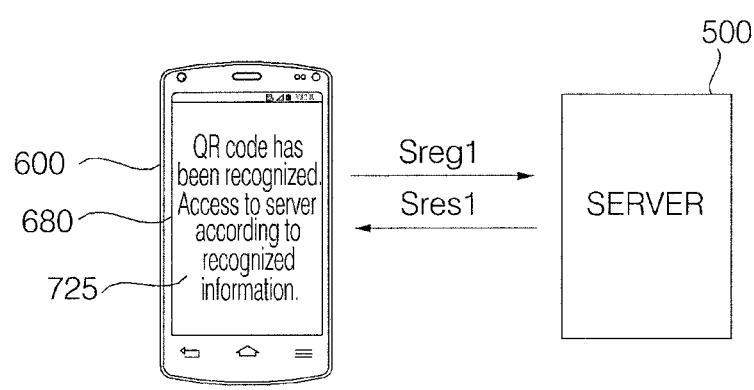

FIG. 7G
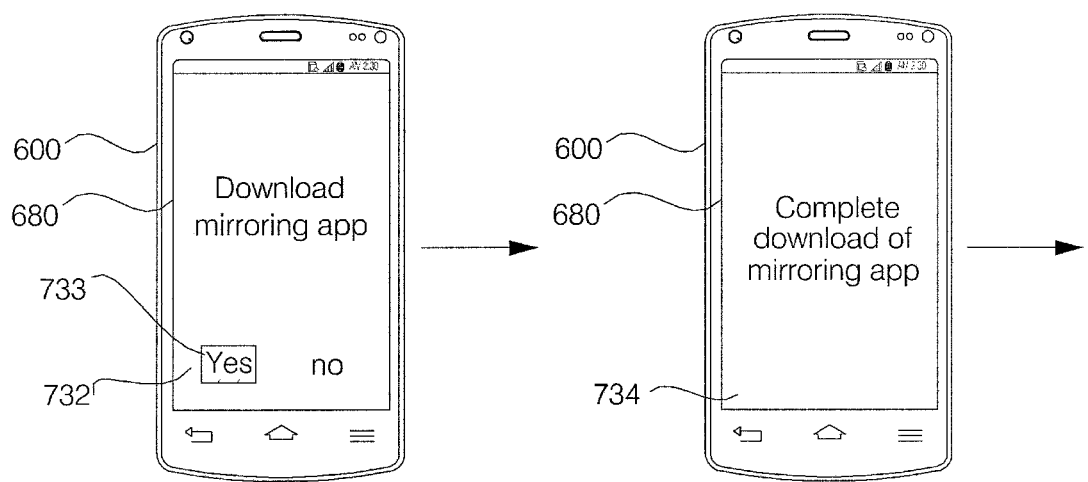
(a)    (b)
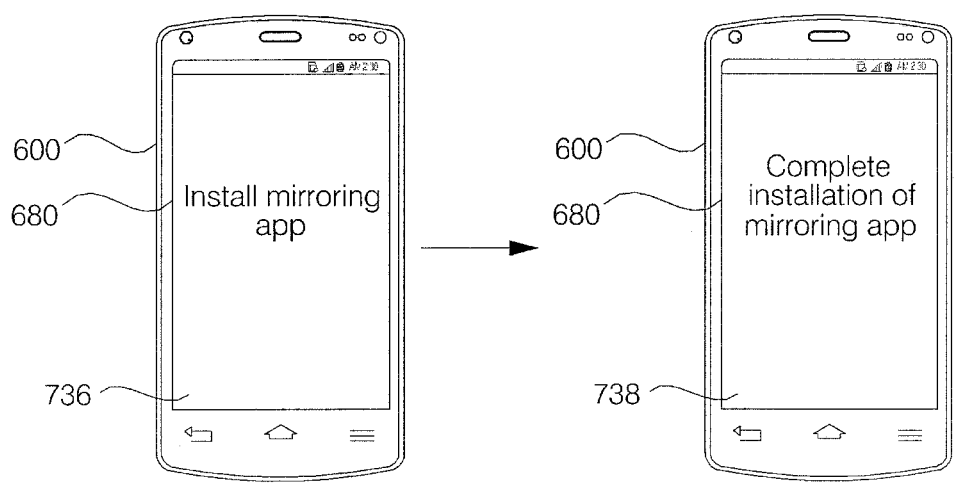
(c)    (d)

FIG. 9B
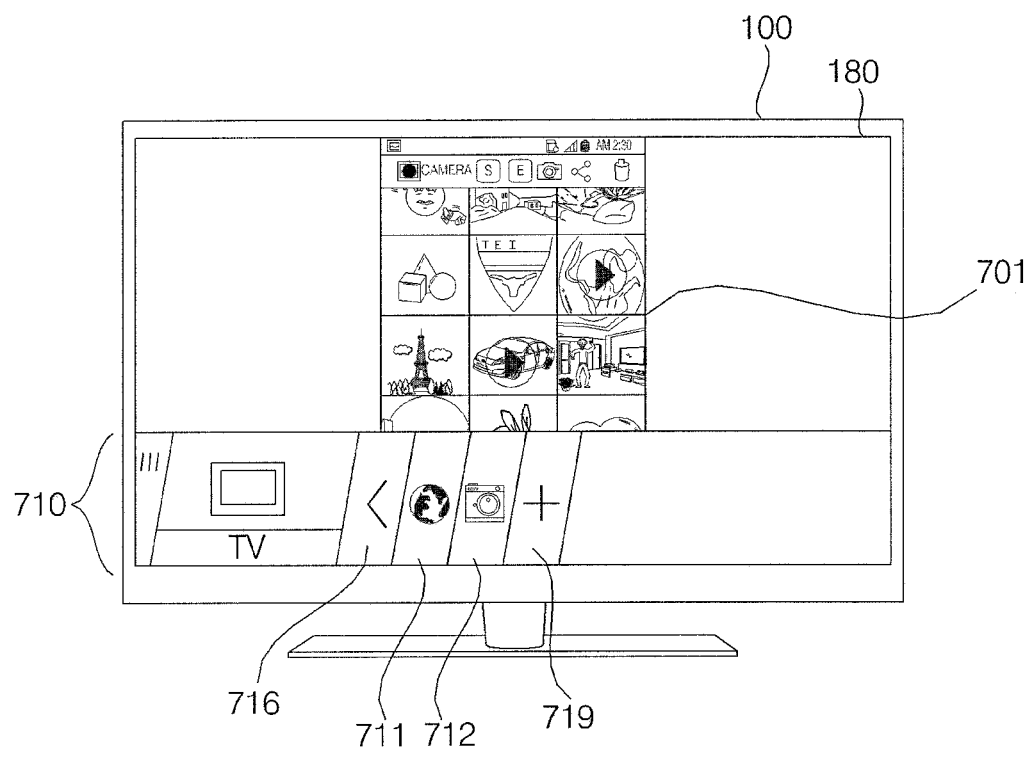
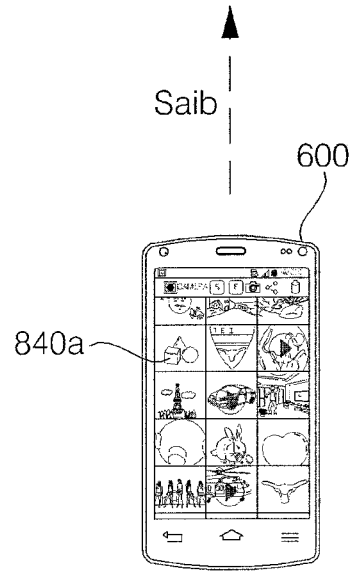

FIG. 13C
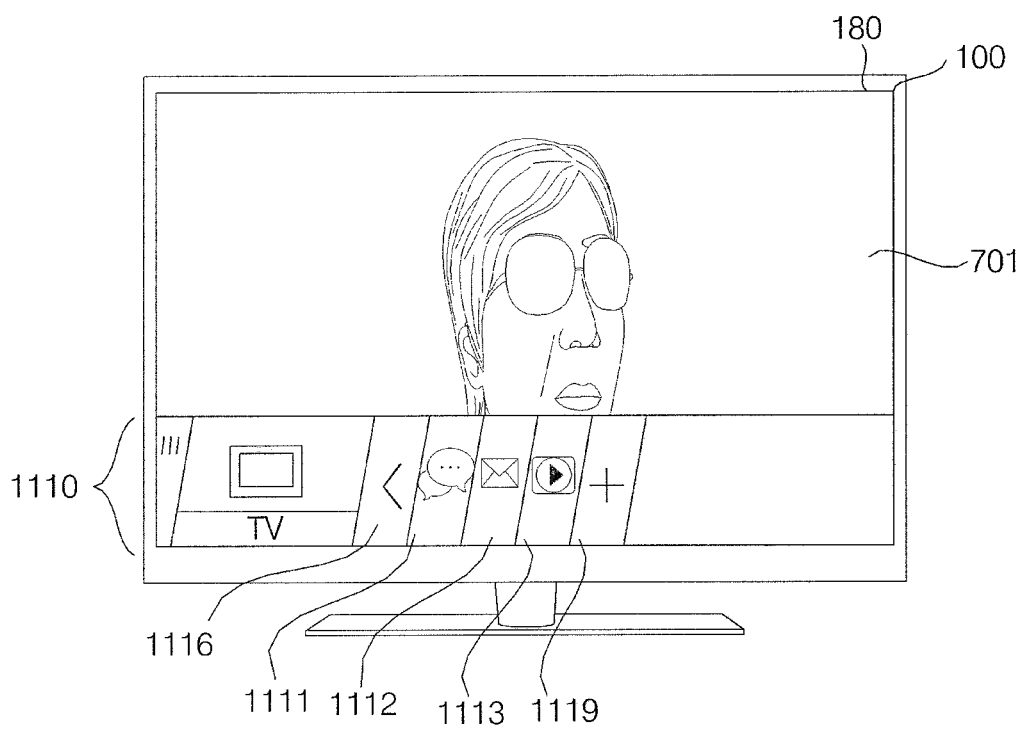
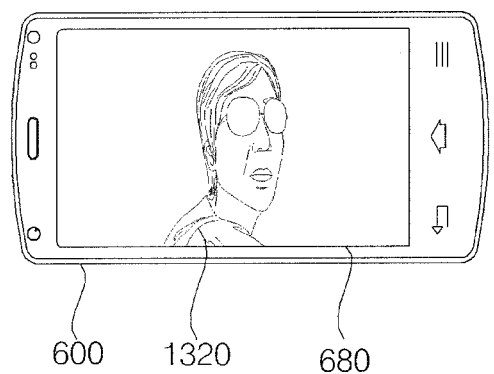

FIG. 14D
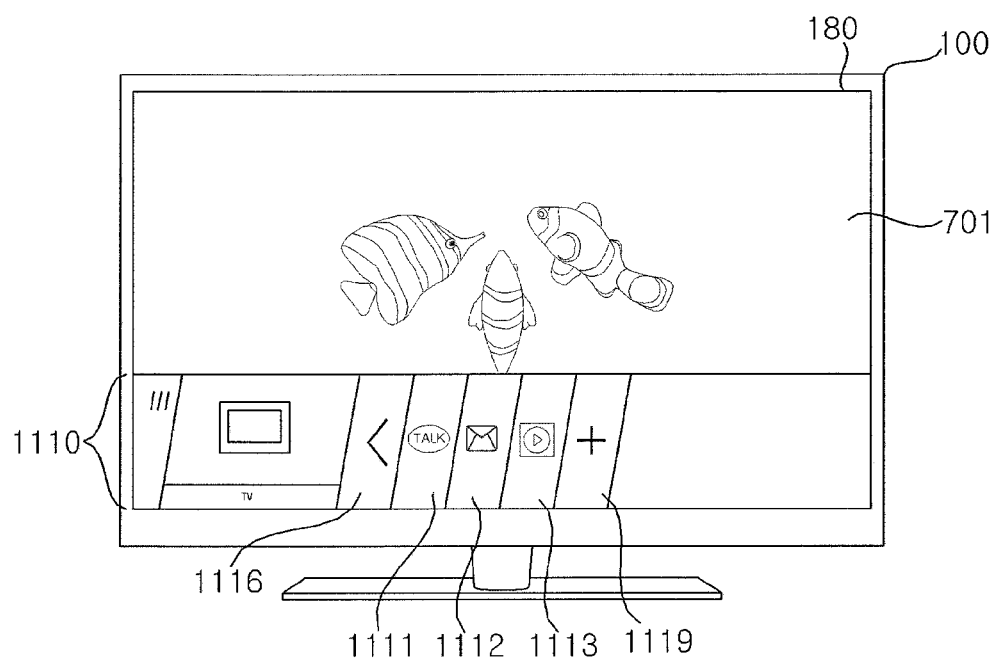
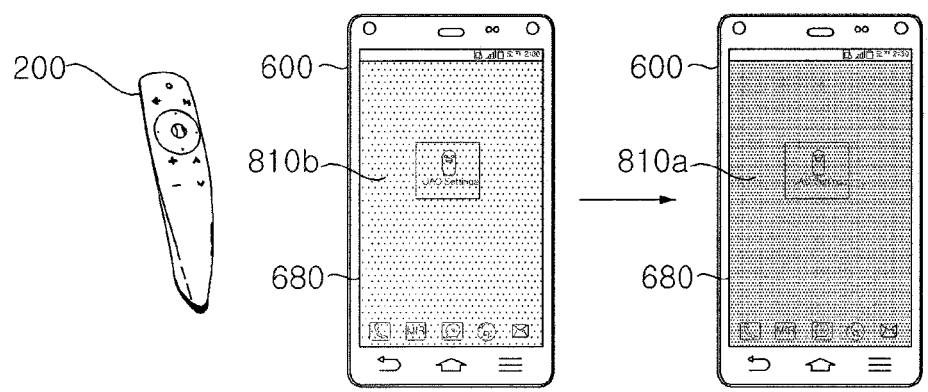

IMAGE DISPLAY APPARATUS AND MOBILE TERMINAL

CROSS REFERENCE TO RELATED APPLICATIONS

This application is the National Phase of PCT/KR2015/007547 filed on Jul. 21, 2015, which claims priority under 35 U.S.C. § 119(a) to Patent Application Nos. 10-2015-0094881 and 10-2015-0094883 filed in the Republic of Korea on Jul. 2, 2015, all of which are hereby expressly incorporated by reference into the present application.

TECHNICAL FIELD

The present invention relates to an image display apparatus or a mobile terminal and, more particularly, to an image display apparatus or a mobile terminal, for easily installing and displaying a mirroring application item from the mobile terminal.

BACKGROUND ART

An image display apparatus has a function of providing an image that a viewer is capable of viewing. The user may view broadcasts through an image display apparatus. An image display apparatus provides a broadcast selected by a user among broadcast signals transmitted from a broadcaster and displays the broadcast image. In accordance with current trends, current broadcasting has been converted into digital broadcasting from analog broadcasting around the world.

Digital broadcasting transmits a digital image and a voice signal. Digital broadcasting has low data loss due to high robustness to external noise, is advantageous for error correction, has high resolution, and provides a clear image, compared to analog broadcasting. In addition, digital broadcasting is able to provide an interactive service compared to analog broadcasting.

DISCLOSURE

Technical Problem

An object of the present invention devised to solve the problem lies in an image display apparatus for easily installing and displaying a mirroring application item from a mobile terminal.

Another object of the present invention devised to solve the problem lies in an image display apparatus for easily performing mirroring between a mobile terminal and an image display apparatus.

Technical Solution

The object of the present invention can be achieved by providing an image display apparatus including a display, an interface unit to exchange data with a mobile terminal, and a controller to perform control to display a mirroring related menu including mirroring related server information or content associated with server information based on user input, to receive a mirroring application item from the mobile terminal through the interface unit, and to perform control to display the received mirroring application item in the mirroring related menu.

In another aspect of the present invention, provided herein is an image display apparatus including a display, an interface unit to exchange data with a mobile terminal, and a controller to perform control to display a mirroring related menu based on user input, to perform control to transmit a pairing request signal to the mobile terminal in response to a first user item or an item of a first mirroring application in the mirroring related menu being selected, to receive an image of the first mirroring application from the mobile terminal or a first user mobile terminal through the interface unit, and to perform control to display the received image of the first mirroring application.

In another aspect of the present invention, provided herein is a mobile terminal including a display, a communication unit to exchange data with an image display apparatus or a server, and a controller to recognize mirroring related server information output by the image display apparatus, to perform control to access the server based on the recognized server information, to receive and execute a mirroring setting application from the server, and to perform control to transmit information associated with a selected mirroring application item to the image display apparatus through the executed mirroring setting application.

In another aspect of the present invention, provided herein is a mobile terminal including a display, a communication unit to exchange data with an image display apparatus or a server, and a controller to receive pairing request signal from the image display apparatus, to transmit a pairing response signal to the image display apparatus based on the received pairing request signal, and to execute a first mirroring application and to perform control to transmit an image of the first mirroring application to the image display image upon receiving execution request information of the first mirroring application in a state in which access to the image display apparatus is maintained.

Advantageous Effects

An image display apparatus according to an embodiment of the present invention may include a display, an interface unit to exchange data with a mobile terminal, and a controller to perform control to display a mirroring related menu including mirroring related server information or content associated with server information based on user input, to receive a mirroring application item from the mobile terminal through the interface unit, and to perform control to display the received mirroring application item in the mirroring related menu and, accordingly, may easily install and display a mirroring application item from a mobile terminal.

In particular, a code image including server information as content associated with the server information may be displayed to easily guide access to a server through a mobile terminal.

When a first mirroring application item is selected among mirroring application items displayed in a mirroring related menu, a first mirroring application execution image may be received from a mobile terminal through a network interface unit after pairing with the mobile terminal and the received first mirroring application image may be displayed on a display to easily perform mirroring between the mobile terminal and the image display apparatus.

An image display apparatus according to another embodiment of the present invention may include a display, an interface unit to exchange data with a mobile terminal, and a controller to perform control to display a mirroring related menu based on user input, to perform control to transmit a pairing request signal to the mobile terminal in response to an item of a first mirroring application in the mirroring related menu being selected, to receive an image of the first mirroring application from the mobile terminal through the interface unit, and to perform control to display the received image of the first mirroring application and, accordingly, may easily perform mirroring between the mobile terminal and the image display apparatus.

An image display apparatus according to another embodiment of the present invention may include a display, an interface unit to exchange data with a mobile terminal, and a controller to perform control to display a mirroring related menu based on user input, to perform control to transmit a pairing request signal to the mobile terminal in response to a first user item of a first mirroring application in the mirroring related menu being selected, to receive an image of the first mirroring application from a first user mobile terminal through the interface unit, and to perform control to display the received image of the first mirroring application and, accordingly, may easily perform mirroring between the mobile terminal and the image display apparatus.

A mobile terminal according to an embodiment of the present invention may include a display, a communication unit to exchange data with an image display apparatus or a server, and a controller to recognize mirroring related server information output by the image display apparatus, to perform control to access the server based on the recognized server information, to receive and execute a mirroring setting application from the server, and to perform control to transmit information associated with a selected mirroring application item to the image display apparatus through the executed mirroring setting application and, accordingly, may easily install and display a mirroring application item from an image display apparatus.

In particular, when a code image including server information is displayed on the image display apparatus, mirroring related server information may be extracted from an image captured by a camera to easily access a server and to receive a mirroring setting application.

When first mirroring application execution request information is received from an image display apparatus, the first mirroring application may be executed and an image of the executed first mirroring application may be transmitted to the image display apparatus to easily perform mirroring between the mobile terminal and the image display apparatus.

A mobile terminal according to another embodiment of the present invention may include a display, a communication unit to exchange data with an image display apparatus or a server, and a controller to receive pairing request signal from the image display apparatus, to transmit a pairing response signal to the image display apparatus based on the received pairing request signal, and to execute a first mirroring application and to perform control to transmit an image of the first mirroring application to the image display image upon receiving execution request information of the first mirroring application in a state in which access to the image display apparatus is maintained and, accordingly, may easily perform mirroring between the mobile terminal and the image display apparatus.

In particular, information associated with at least one selected application item may be transmitted to an image display apparatus based on a mirroring setting application image and, accordingly, the mirroring application item may be easily installed and displayed on the image displayed device.

Notification setting, password setting, or user setting may be performed based on a mirroring setting application image and information on the set notification setting, password setting, or user setting may be easily transmitted to the image display apparatus. Accordingly, various operations in mirroring may be enabled.

DESCRIPTION OF DRAWINGS

FIG. 3 is an internal block diagram of an example of a controller of FIG. 2.

BEST MODE

Exemplary embodiments of the present invention will be described with reference to the attached drawings.

In addition, the suffixes "module" and "unit" of elements herein are used for convenience of description and do not have any distinguishable meanings or functions. Accordingly, "module" and "unit" can be used interchangeably.

Figure 1:
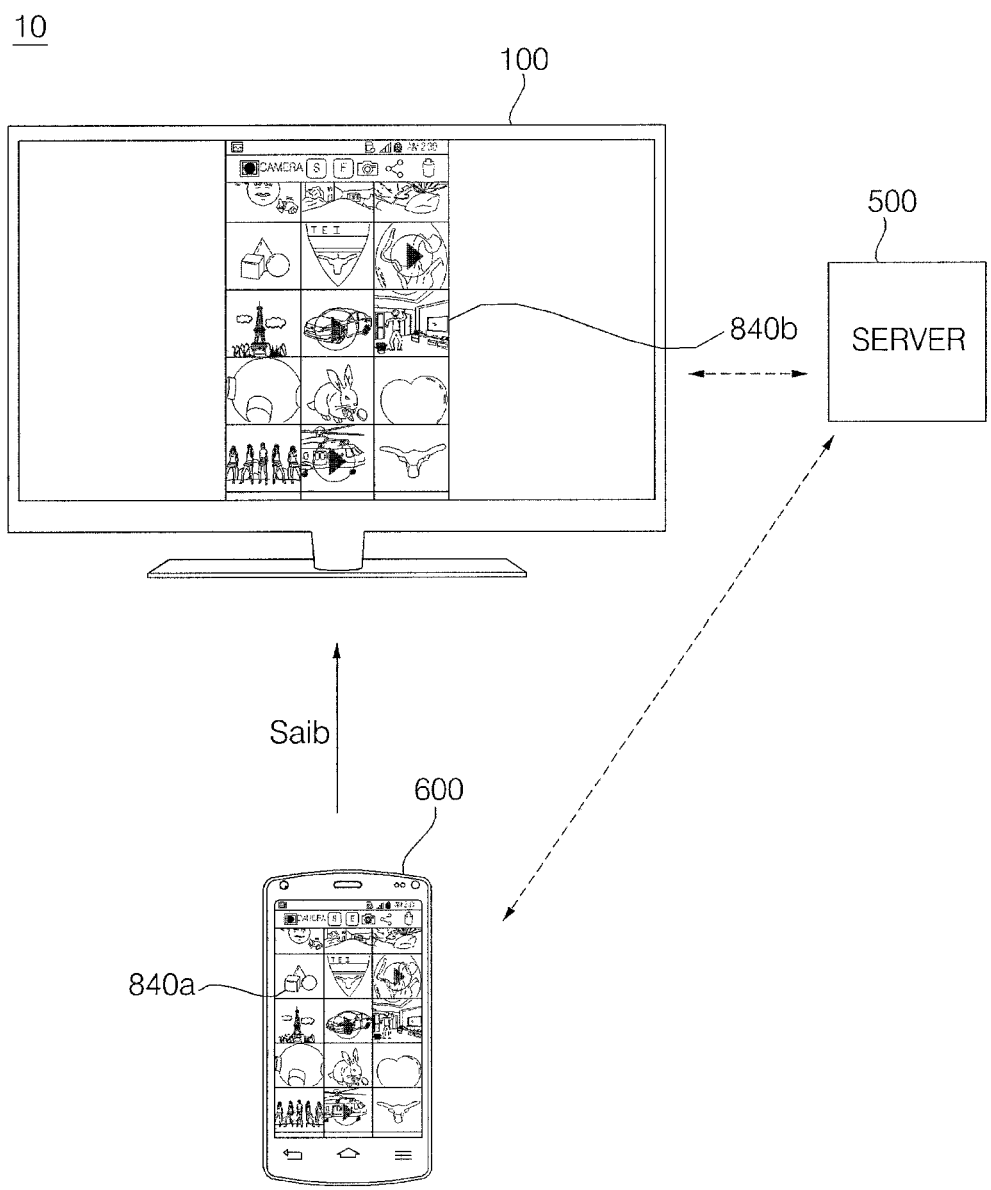
FIG. 1 is a diagram showing an image display system for mirroring according to an embodiment of the present invention.

FIG. 1 is a diagram showing an image display system for mirroring according to an embodiment of the present invention.

Referring to the drawing, an image display system 10 for mirroring may include an image display apparatus 100, a mobile terminal 600, and a server 500.

Thereamong, the image display apparatus 100 and the mobile terminal 600 may perform mirroring.

The present invention proposes a method of easily installing and displaying a mirroring application item from the mobile terminal 600 in the image display apparatus 100 for convenience of mirroring between the image display apparatus 100 and the mobile terminal 600.

To this end, the image display apparatus 100 may display a mirroring related menu including mirroring related server information or content associated with the server information, based on user input.

In this case, the mirroring related server information or the content associated with the server information may be information provided by a manufacturer of the image display apparatus 100.

The mobile terminal 600 may receive the mirroring related server information or the content associated with the server information, displayed in the mirroring related menu, and access the server 500 based on the received information.

The mobile terminal 600 may receive a mirroring-related application from the server 500 and may install and execute the mirroring-related application in the mobile terminal 600.

In addition, upon selecting an application item as a mirroring target through the executed mirroring-related application, the mobile terminal 600 may transmit the selected mirroring application item to the image display apparatus.

The image display apparatus 100 may receive the mirroring application item from the mobile terminal 600 through an interface unit 130 or 135 and may display the received mirroring application item in the mirroring related menu.

Accordingly, the mirroring application item may be easily installed and displayed on the image display apparatus 100.

The present invention proposes a method of easily mirroring and displaying a first mirroring application execution image when a first mirroring application item is selected while the mirroring application item from the mobile terminal 600 is installed and displayed on the image display apparatus 100.

To this end, when the first mirroring application item is selected among the mirroring application items displayed in the mirroring related menu, the image display apparatus 100 may transmit pairing information or first mirroring application execution request information to the mobile terminal 600, receive the first mirroring application execution image from the mobile terminal 600 through the network interface unit 135 or 135, and display the first mirroring application execution image on a display 180.

The drawing illustrates an example in which a radio signal Saib of a gallery image 840a of a gallery application executed in the mobile terminal 600 is transmitted to the image display apparatus 100 via mirroring between the image display apparatus 100 and the mobile terminal 600 and a gallery image 840b that is enlarged to correspond to a gallery application is displayed on the image display apparatus 100.

A size of the display 180 of the image display apparatus 100 is much larger than a size of a display 680 (refer to FIG. 5) of the mobile terminal 600 and, thus, a user may view an enlarged image via mirroring.

As an example of a mirroring method, when a mirroring mode is selected in the image display apparatus 100, the image display apparatus 100 may wirelessly transmit a pairing signal to the mobile terminal 600 and the mobile terminal 600 may transmit a pairing response signal in response to the pairing signal and, accordingly, the mobile terminal 600 and the image display apparatus 100 may access each other.

In this case, the pairing signal and the pairing response signal may be a Bluetooth-based Bluetooth low energy (BLE) signal.

In this case, the image display apparatus 100 may further transmit device information including a device ID as well as the pairing signal to the mobile terminal 600.

As another example of the mirroring method, when the mirroring mode is selected in the mobile terminal 600, the mobile terminal 600 may wirelessly transmit a pairing signal to the image display apparatus 100 and the image display apparatus 100 may transmit a pairing response signal in response to the pairing signal and, accordingly, the mobile terminal 600 and the image display apparatus 100 may access each other.

After access, the mobile terminal 600 may wirelessly transmit an application image related to execution of mirroring to the image display apparatus 100. For example, the mobile terminal 600 may wirelessly transmit the application image to the image display apparatus 100 via Wi-Fi using a Miracast method.

According to the present invention, for convenience of user use, a mirroring mode may be executed based on the image display apparatus 100.

The aforementioned various operation methods of the image display apparatus 100 and the mobile terminal 600 will be described in more detail with reference to FIG. 6 and drawings subsequent thereto.

The image display apparatus 100 of FIG. 1 may be a monitor, a TV, a tablet PC, or the like.

Figure 2:
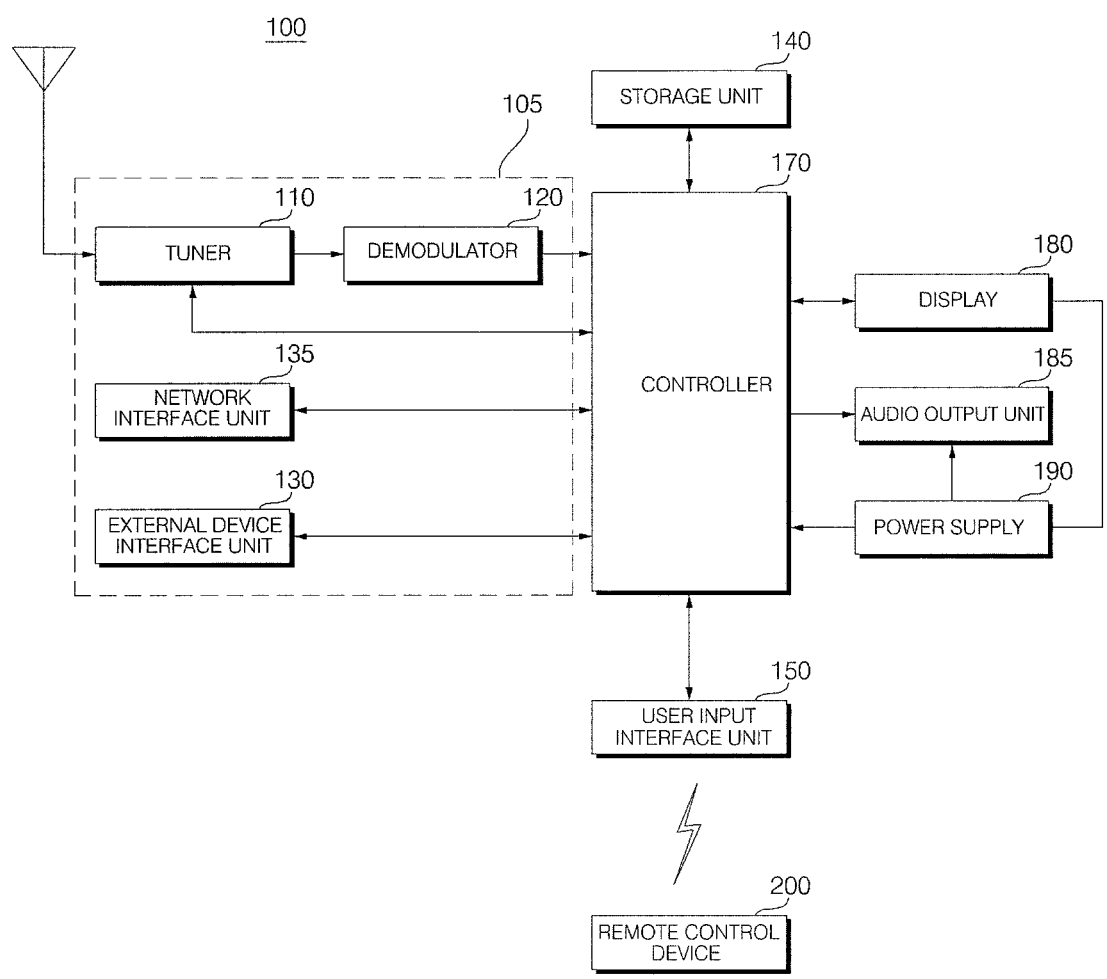
FIG. 2 is an internal block diagram of an example of the image display apparatus of FIG. 1.

FIG. 2 is an internal block diagram of an example of the image display apparatus of FIG. 1.

Referring to FIG. 2, the image display apparatus 100 according to an embodiment of the present invention may include a broadcast receiver 105, the external device interface unit 130, a memory 140, a user input interface unit 150, a sensor (not shown), a controller 170, the display 180, and an audio output unit 185.

The broadcast receiver 105 may include a tuner 110, a demodulator 120, a network interface unit 135, and an external device interface unit 130.

Differently from the drawing, the broadcast receiver 105 may include only the tuner 110, the demodulator 120, and the external device interface unit 130. That is, the broadcast receiver 105 may not include the network interface unit 135.

The tuner 110 may tune to a radio frequency (RF) broadcast signal corresponding to a channel selected by a user or all pre-stored channels among RF broadcast signals received through an antenna (not shown). In addition, the selected RF broadcast signal may be converted into an intermediate frequency signal, a baseband image, or a voice signal.

For example, the selected RF broadcast signal may be converted into a digital IF (DIF) signal in the case of a digital broadcast signal and converted into an analog baseband image or a voice signal (CVBS/SIF) in the case of an analog broadcast signal. That is, the tuner 110 may process the digital broadcast signal or the analog broadcast signal. The analog baseband image or the voice signal (CVBS/SIF) output from the tuner 110 may be input directly to the controller 170.

The tuner 110 may sequentially select RF broadcast signals of all broadcast channels stored via a channel recording function among RF broadcast signals received through an antenna and may convert the RF broadcast signals into an intermediate frequency signal, a baseband image, or a voice signal.

To receive broadcast signals of a plurality of channels, the tuner 110 may include a plurality of tuners. Alternatively, the tuner 110 may include a single tuner for simultaneously receiving the broadcast signals of the plurality of channels.

The demodulator 120 may receive the digital IF (DIF) signal converted by the tuner 110 and demodulate the DIF signal.

The demodulator 120 may output a stream signal TS after demodulation and channel decoding. In this case, the stream signal may be obtained by multiplexing an image signal, a voice signal, or a data signal.

The stream signal output from the demodulator 120 may be input to the controller 170. The controller 170 may perform demultiplexing and image/voice signal processing to output an image to the display 180 and to output voice to the audio output unit 185.

The external device interface unit 130 may transmit or receive data to and from a connected external device (not shown), for example, a set-top box 50. To this end, the external device interface unit 130 may include an audio/video (A/V) input and output unit (not shown).

The external device interface unit 130 may be connected by wire/wirelessly to an external device such as a digital versatile disc (DVD) player, a Blu-ray player, a game console, a camera, a camcorder, a computer (notebook computer), a set-top box, and so on, and may perform an input/output operation with an external device.

The A/V input and output unit may receive an image and voice signal of the external device. A wireless communication unit (not shown) may perform short-range communication with other electronic devices.

The external device interface unit 130 may exchange data with the mobile terminal 600 adjacent thereto through the wireless communication unit (not shown). In particular, the external device interface unit 130 may receive device information, executed application information, an application image, and so on from the mobile terminal 600 in a mirroring mode.

The network interface unit 135 may provide an interface for connecting the image display apparatus 100 to a wireless/wired network including the Internet. For example, the network interface unit 135 may receive content or data provided by the Internet, a content provider, or a network operator through a network.

The network interface unit 135 may include a wireless communication unit (not shown).

The memory 140 may store a program for processing and controlling each signal in the controller 170 and store the signal-processed image, voice, or data signals.

The memory 140 may temporally store the image, voice, or data signals input to the external device interface unit 130. In addition, the memory 140 may store information about a predetermined broadcast channel through a channel recording function such as a channel map.

Although FIG. 2 illustrates the case in which the memory 140 is included separately from the controller 170, the scope of the present invention is not limited thereto. The memory 140 may be included in the controller 170.

The user input interface unit 150 may forward a signal input by a user or forward a signal from the controller 170 to the user.

For example, the user input interface unit 150 may transmit/receive a user input signal such as power on/off, channel selection, and image setting to and from a remote controller 200, forward a user input signal input via a local key (not shown) such as a power key, a channel key, a volume key, and a setting key to the controller 170, forward a user input signal input from a sensor (not shown) for setting a user gesture to the controller 170, or transmit a signal from the controller 170 to a sensor (not shown).

The controller 170 may demultiplex a stream input through the tuner 110, the demodulator 120, the network interface unit 135, or the external device interface unit 130 or process demultiplexed signals to generate and output signals for output of an image or voice.

The image signal that is image-processed by the controller 170 may be input to the display 180 and may be displayed as an image corresponding to the corresponding image signal. In addition, the image signal that is image-processed by the controller 170 may be input to an external output device through the external device interface unit 130.

A voice processed by the controller 170 may be audibly output to the audio output unit 185. The voice signal processed by the controller 170 may be input to an external output device through the external device interface unit 130.

Although not shown in FIG. 2, the controller 170 may include a demultiplexer, an image processor, and so on, which will be described below with reference to FIG. 3.

In addition, the controller 170 may control an overall operation of the image display apparatus 100. For example, the controller 170 may control the tuner 110 to tune to RF broadcast corresponding to a channel selected by a user or a pre-stored channel.

In addition, the controller 170 may control the image display apparatus 100 according to an internal program or a user command input through the user input interface unit 150.

The controller 170 may control the display 180 to display an image. In this case, the image displayed on the display 180 may be a still image or a video image and may be a 2D image or a 3D image.

The controller 170 may display a predetermined 2D object in the image displayed on the display 180. For example, the object may be at least one of an accessed web image (a newspaper and a magazine), electronic program guide (EPG), various menus, widgets, an icon, a still image, a video image, and text.

The controller 170 may recognize a user position based on an image captured by a photographing unit (not shown). For example, the controller 170 may recognize a distance (z-axis coordinates) between a user and the image display apparatus 100. In addition, the controller 170 may recognize x-axis coordinates and y-axis coordinates on the display 180, which correspond to the user position.

The display 180 may convert an image signal, a data signal, an OSD signal, or a control signal, which is processed by the controller 170, an image signal, a data signal, or a control signal, which is received by the external device interface unit 130, or the like to generate a driving signal.

The display 180 may be a PDP, an LCD, an OLED, a flexible display, or the like and may be a 3D display. The 3D display 180 may be classified into a glassless mode and a glasses mode.

The display 180 may be configured as a touchscreen to be used as an input device as well as an output device.

The audio output unit 185 may receive the audio signal that is signal-processed by the controller 170 to output a corresponding sound.

The photographing unit (not shown) may photograph a user. The photographing unit (not shown) may include, but is not limited to, one camera and may include a plurality of cameras. The photographing unit (not shown) may be embedded in the image display apparatus 100 above the display 180 or may be separately disposed from the image display apparatus 100. Image information obtained by the photographing unit (not shown) may be input to the controller 170.

The controller 170 may detect a user gesture based on an image captured by the photographing unit (not shown), each signal detected from the sensor (not shown), or a combination thereof.

A power supply unit 190 may supply power to the image display apparatus 100. In particular, the power supply unit 190 may supply power to the controller 170 embodied in the form of a system on chip (SoC), the display 180 for image display, and the audio output unit 185 for audio output.

In detail, the power supply unit 190 may include a converter for converting alternating current (AC) power into direct current (DC) power and a DC/DC converter for changing a level of the DC power.

The remote controller 200 may transmit user input to the user input interface unit 150. To this end, the remote controller 200 may use Bluetooth, radio frequency (RF) communication, infrared (IR) communication, ultra-wideband (UWB), ZigBee, and so on. In addition, the remote controller 200 may receive image, voice, or data signals output from the user input interface unit 150 and display the signals or output voice through the remote controller 200.

The aforementioned image display apparatus 100 may be a stationary or mobile digital broadcast receiver that is capable of receiving digital broadcasts.

The block diagram of the image display apparatus 100 of FIG. 2 is a block diagram of an embodiment of the present invention. Components of the block diagram may be integrated, added, or omitted according to the specifications of the image display apparatus 100 that is actually embodied. That is, as necessary, two or more components may be integrated as one component or one component may be divided into two or more components. In addition, a function performed by each block is merely an embodiment of the present invention, and the scope of the present invention is not limited by a detailed operation or device.

FIG. 3 is an internal block diagram of an example of the controller of FIG. 2.

Referring to the drawing, the controller 170 according to an embodiment of the present invention may include a demultiplexer 310, an image processor 320, a processor 330, an OSD generator 340, a mixer 345, a frame rate converter 350, and a formatter 360. In addition, the controller 170 may further include an audio processor (not shown) and a data processor (not shown).

The demultiplexer 310 may demultiplex an input stream. For example, when MPEG-2 TS is input, the MPEG-2 TS may be demultiplexed to extract image, voice, and data signals. Here, the stream signal input to the demultiplexer 310 may be a stream signal output from the tuner 110, the demodulator 120, or the external device interface unit 130.

The image processor 320 may image-process the demultiplexed image signal. To this end, the image processor 320 may include an image decoder 325 and a scaler 335.

The image decoder 325 may decode the demultiplexed image signal and the scaler 335 may scale the resolution of the decoded image signal to output the image signal through the display 180.

The image decoder 325 may include various standards of decoders. For example, the image decoder 325 may include MPEG-2, and H. 264 decoders, a 3D image decoder of a color image and a depth image, a decoder of an image of a plurality of viewpoints, and so on.

The processor 330 may control an operation of the image display apparatus 100 or the controller 170. For example, the processor 330 may control the tuner 110 to tune to an RF broadcast corresponding to a channel selected by a user or a pre-stored channel.

The processor 330 may control the image display apparatus 100 according to an internal program or a user command input through the user input interface unit 150.

The processor 330 may control data transmission through the network interface unit 135 or the external device interface unit 130.

In addition, the processor 330 may control operations of the demultiplexer 310, the image processor 320, the OSD generator 340, and so on in the controller 170.

The OSD generator 340 may generate an OSD signal according to user input or autonomously. For example, the OSD generator 340 may generate a signal for displaying various information items as graphics or text on a monitor of the display 180 based on a user input signal. The generated OSD signal may include various data items such as a user interface image, various menu images, widgets, icons, and so on of the image display apparatus 100. In addition, the generated OSD signal may include a 2D object or a 3D object.

In addition, the OSD generator 340 may generate a pointer displayable on a display based on a pointing signal input from the remote controller 200. In particular, the pointer may be generated by a pointing signal processor, and the OSD generator 340 may include the pointing signal processor (not shown). Needless to say, the pointing signal processor (not shown) may not be disposed in the OSD generator 340 and may be separately provided from the OSD generator 340.

The mixer 345 may mix the OSD signal generated by the OSD generator 340 and the decoded image signal that is image-processed by the image processor 320. The mixed image signal may be provided to the frame rate converter 350.

The frame rate converter (FRC) 350 may convert a frame rate of an input image. The frame rate converter 350 may output the input image without change and without separate frame conversion.

The formatter 360 may arrange a left-eye image frame and a right-eye image frame of the 3D image with the converted frame rate. In addition, the formatter 360 may output a synchronization signal Vsync for opening a left-eye glass and a right-eye glass of a 3D viewing apparatus (not shown).

The formatter 360 may convert format of the input image signal into an image signal to be displayed on a display and may output the image signal.

The formatter 360 may change the format of a 3D image signal. For example, the format of a 3D image signal may be changed to any one of various 3D formats such as side by side format, top/down format, frame sequential format, interlaced format, and checker box format.

The formatter 360 may convert a 2D image signal into a 3D image signal. For example, according to a 3D image generation algorithm, an edge or a selectable object may be detected from the 2D image signal, and an object according to the detected edge or the selectable object may be extracted and generated as a 3D image signal. In this case, as described above, the generated 3D image signal may be separated into a left image signal L and a right image signal R and the left image signal L and the right image signal R may be arranged.

Although not shown, after the formatter 360, a 3D processor (not shown) for 3-dimensional (3D) effect signal processing may be further disposed. The 3D processor (not shown) may adjust the brightness, tint, and color of the image signal to enhance the 3D effect. For example, signal processing and so on may be performed to make a short distance be in focus and to make a long distance be out of focus. The function of the 3D processor may be integrated with the formatter 360 or the image processor 320.

The audio processor (not shown) in the controller 170 may voice-process the demultiplexed voice signal. To this end, the audio processor (not shown) may include various decoders.

The audio processor (not shown) in the controller 170 may adjust base, treble, volume, and so on.

The data processor (not shown) in the controller 170 may data-process the demultiplexed data signal. For example, when the demultiplexed data signal is an encoded data signal, the encoded data signal may be decoded. The encoded data signal may be electronic program guide (EPG) information including broadcast information such as start time and finish time of a broadcast program that is broadcast on each channel.

The block diagram of the controller 170 of FIG. 3 is a block diagram of an embodiment of the present invention. Components of the block diagram may be integrated, added, or omitted according to the specifications of the controller 170 that is actually embodied.

In particular, the frame rate converter 350 and the formatter 360 may not be disposed in the controller 170 but may be separately disposed from the controller 170 or may be provided as one module.

Figure 4A:
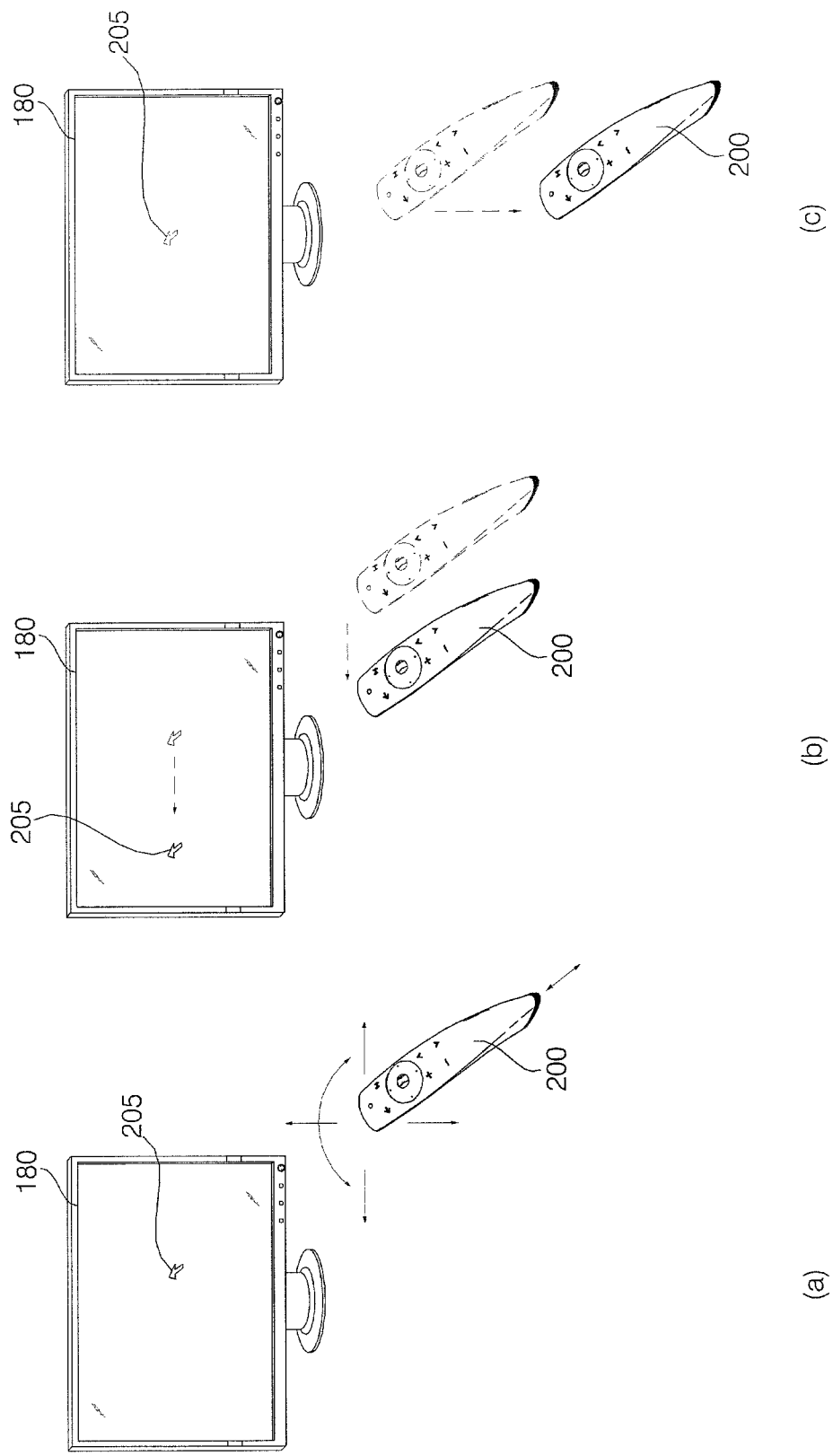
FIG. 4A is a diagram showing a control method of a remote controller of FIG. 2.

FIG. 4A is a diagram showing a control method of the remote controller of FIG. 2.

FIG. 4A(a) illustrates the case in which a pointer 205 corresponding to the remote controller 200 is displayed on the display 180.

A user may move or rotate the remote controller 200 up and down, right and left (FIG. 4A(b)), and forward and backward (FIG. 4A(c)). The pointer 205 displayed on the display 180 of the image display apparatus may correspond to movement of the remote controller 200. As shown in the drawing, the corresponding pointer 205 is moved and displayed according to movement in a 3D space and, thus, the remote controller 200 may be referred to as a spatial remote controller or a 3D pointing device.

FIG. 4A(b) illustrates the case in which, when a user moves the remote controller 200 to the left, the pointer 205 displayed on the display 180 of the image display apparatus is also moved to the left in response to the movement of the remote controller.

Information about movement of the remote controller 200, detected through the sensor of the remote controller 200, may be transmitted to the image display apparatus. The image display apparatus may calculate coordinates of the pointer 205 from the information about the movement of the remote controller 200. The image display apparatus may display the pointer 205 to correspond to the calculated coordinates.

FIG. 4A(c) illustrates the case in which a user moves the remote controller 200 away from the display 180 while pushing a specific button of the remote controller 200. Accordingly, a selected area of the display 180, corresponding to the pointer 205, may be zoomed in to be enlarged and displayed. On the other hand, when the user moves the remote controller 200 close to the display 180, the selected area of the display 180, corresponding to the pointer 205, may be zoomed out to be reduced and displayed. When the remote controller 200 is moved away from the display 180, the selected area may be zoomed out, and when the remote controller 200 becomes close to the display 180, the selected area may be zoomed in.

When a specific button of the remote controller 200 is pushed, recognition of up/down and right/left may be excluded. That is, when the remote controller 200 is moved away from or close to the display 180, up/down and right/left movement may not be recognized and only forward and backward movement may be recognized. When a specific button of the remote controller 200 is not pushed, only the pointer 205 may be moved according to up/down and right/left movement of the remote controller 200.

The moving speed or moving direction of the pointer 205 may correspond to the moving speed or moving direction of the remote controller 200.

Figure 4B:
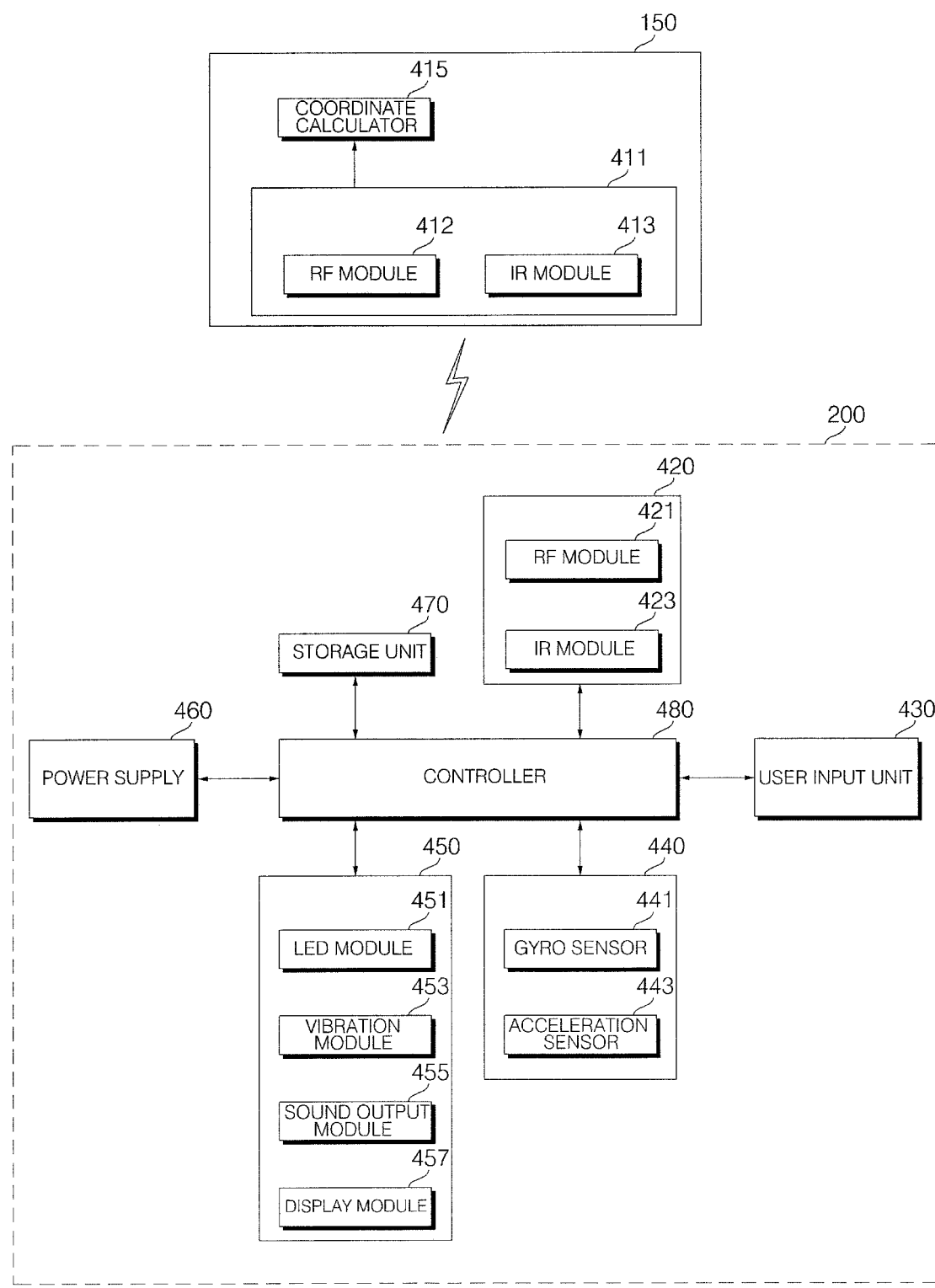
FIG. 4B is an internal block diagram of the remote controller of FIG. 2.

FIG. 4B is an internal block diagram of the remote controller of FIG. 2.

Referring to the drawing, the remote controller 200 may include a wireless communication unit 425, a user input unit 435, a sensor unit 440, an output unit 450, a power supply unit 460, a memory 470, and a controller 480.

The wireless communication unit 425 may transmit and receive a signal to and from any one of image display apparatus according to the aforementioned embodiments of the present invention. Among the image display apparatus according to embodiments of the present invention, an example of the image display apparatus 100 will be described.

According to the embodiment, the remote controller 200 may include an RF module 421 that is capable of transmitting and receiving a signal to and from the image display apparatus 100 according to RF communication standards. In addition, the remote controller 200 may include an IR module 423 that is capable of transmitting and receiving a signal to and from the image display apparatus 200 according to IR communication standards.

According to the embodiment, the remote controller 200 may transmit a signal including information about movement of the remote controller 200 to the image display apparatus 100 through the RF module 421.

In addition, the remote controller 200 may receive the signal transmitted from the image display apparatus 100 through the RF module 421. As necessary, the remote controller 200 may transmit a command about power on/off, channel change, volume control, and so on to the image display apparatus 100 through the IR module 423.

The user input unit 435 may include a keypad, a button, a touchpad, a touchscreen, or the like. A user may manipulate the user input unit 435 to input a command associated with the image display apparatus 100 to the remote controller 200. When the user input unit 435 includes a hard key button, the user may input a command associated with the image display apparatus 100 to the remote controller 200 through a push operation of the hard key button. When the user input unit 435 includes a touchscreen, the user may touch a soft key of the touchscreen to input a command associated with the image display apparatus 100 to the remote controller 200. In addition, the user input unit 435 may include various types of input elements that the user is capable of manipulating, such as a scroll key or a jog key, and the present embodiment does not limit the scope of the present invention.

The sensor unit 440 may include a gyro sensor 441 or an acceleration sensor 443. The gyro sensor 441 may sense information about movement of the remote controller 200.

For example, the gyro sensor 441 may sense information about an operation of the remote controller 200 based on the x, y, and z-axes. The acceleration sensor 443 may sense information about the moving speed of the remote controller 200. The sensor unit 440 may further include a distance measuring sensor to sense a distance from the display 180.

The output unit 450 may output an image or voice signal which corresponds to manipulation of the user input unit 435 or a signal transmitted from the image display apparatus 100. The user may recognize whether the user input unit 435 is manipulated or the image display apparatus 100 is controlled, through the output unit 450.

For example, the output unit 450 may include an LED module 451, a vibration module 453, a sound output module 455, or a display module 457, and here the LED module 451 is driven, the vibration module 453 generates vibration, the sound output module 455 outputs sound, or the display module 457 outputs an image when the user input unit 435 is manipulated or a signal is transmitted and received to and from the image display apparatus 100 through the wireless communication unit 425.

The power supply unit 460 may supply power to the remote controller 200. When the remote controller 200 is not moved for a predetermined time, the power supply unit 460 may stop power supply to reduce power waste. The power supply unit 460 may restart power supply when a predetermined key included in the remote controller 200 is manipulated.

The memory 470 may store various types of programs and application data items required to control or operate the remote controller 200. When the remote controller 200 wirelessly transmits and receives a signal to and from the image display apparatus 100 through the RF module 421, the remote controller 200 and the image display apparatus 100 may transmit and receive the signal through a predetermined frequency band. The controller 480 of the remote controller 200 may store information about a frequency band, or the like for wirelessly transmitting and receiving a signal to and from the image display apparatus 100 paired with the remote controller 200 in the memory 470 and may refer to the information.

The controller 480 may control overall information associated with control of the remote controller 200. The controller 480 may transmit a signal corresponding to predetermined key manipulation of the user input unit 435 or a signal corresponding to movement of the remote controller 200 sensed by the sensor unit 440 to the image display apparatus 100 through the wireless communication unit 425.

The user input interface unit 150 of the image display apparatus 100 may include a wireless communication unit 151 for wirelessly transmitting and receiving a signal to and from the remote controller 200, and a coordinates value calculator 415 for calculating a coordinates value of a pointer corresponding to an operation of the remote controller 200.

The user input interface unit 150 may wirelessly transmit and receive a signal to and from the remote controller 200 through an RF module 412. In addition, the user input interface unit 150 may receive a signal that is transmitted from the remote controller 200 according to IR communication standards, through an IR module 413.

The coordinates value calculator 415 may compensate for hand tremor or errors in a signal corresponding to an operation of the remote controller 200, received through the wireless communication unit 151, to calculate a coordinates value (x, y) of a pointer 205 to be displayed on a display 180.

A signal transmitted from the remote controller 200, which is input to the image display apparatus 100 through the user input interface unit 150, may be transmitted to a controller 170 of the image display apparatus 100. The controller 170 may identify information about the operation and key manipulation of the remote controller 200 from the signal transmitted from the remote controller 200 and may control the image display apparatus 100 in response to the information.

As another example, the remote controller 200 may calculate a pointer coordinates value corresponding to the operation and output the pointer coordinates value to the user input interface unit 150 of the image display apparatus 100. In this case, the user input interface unit 150 of the image display apparatus 100 may transmit information about the received pointer coordinates value to the controller 170 without separate compensation for hand tremor or error.

As another example, compared to the drawing, the coordinates value calculator 415 may be included in the controller 170, but not in the user input interface unit 150.

Figure 5:
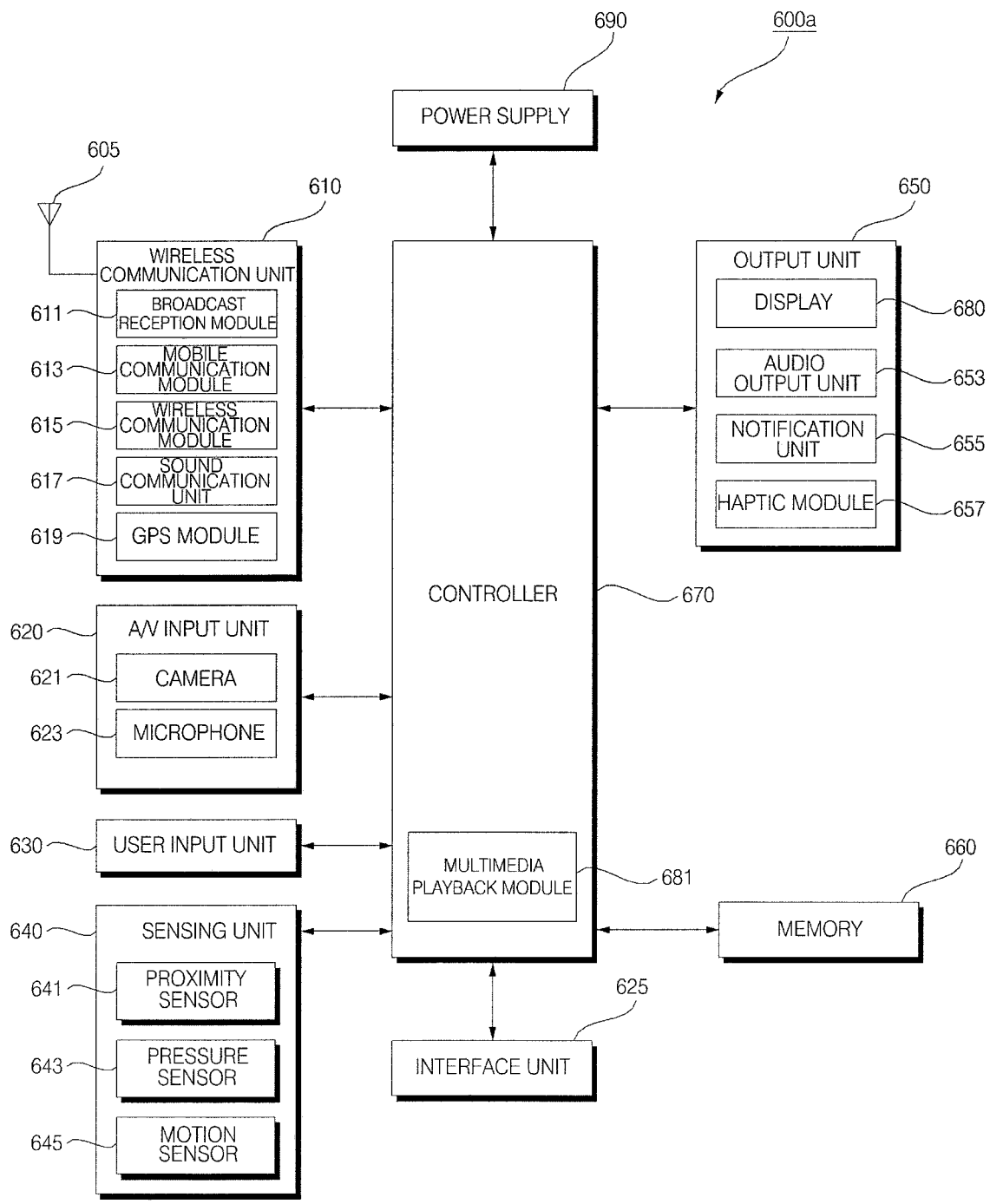
FIG. 5 is an internal block diagram of the mobile terminal of FIG. 1.

FIG. 5 is an internal block diagram of the mobile terminal of FIG. 1.

Referring to the drawing, the mobile terminal 600 may include a wireless communication unit 610, an audio/video (A/V) input unit 620, a user input unit 630, a sensor unit 640, an output unit 650, a memory 660, an interface unit 625, a controller 670, and a power supply unit 690.

The wireless communication unit 610 may include a broadcast receiving module 611, a mobile communication module 613, a wireless Internet module 615, a sound communication unit 617, a global positioning system (GPS) module 619, and so on.

The broadcast receiving module 611 may receive at least one of a broadcast signal or broadcast related information from an external broadcast management server through a broadcast channel. In this case, the broadcast channel may include a satellite channel, a terrestrial channel, and so on.

The broadcast signal and/or broadcast related information received through the broadcast receiving module 611 may be stored in the memory 660.

The mobile communication module 613 may transmit and receive a radio signal to and from at least one of a base station, an external terminal, and a server in a mobile communication network. Here, the radio signal may include various types of data based on transmission and reception of a voice call signal, a videotelephony call signal, or a text/multimedia message.

The wireless Internet module 615 may refer to a module for wireless access to the Internet and may be installed inside or outside the mobile terminal 600. For example, the wireless Internet module 615 may perform Wi-Fi-based wireless communication or Wi-Fi direct-based wireless communication.

The sound communication unit 617 may perform sound communication. The sound communication unit 617 may add predetermined information data to audio data to be output to output sound in a sound communication mode. The sound communication unit 617 may extract predetermined information data from externally received sound in the sound communication mode.

In addition, as a short-range communication technology, Bluetooth, radio frequency identification (RFID), infrared data association (IrDA), ultra-wideband (UWB), ZigBee, or the like may be used.

The global positioning system (GPS) module 619 may receive position information from a plurality of GPS satellites.

The A/V input unit 620 may be used to input an audio signal or a video signal and may include a camera 621, a microphone 623, and so on.

The user input unit 630 may generate key input data that is input for control of an operation of a terminal by a user. To this end, the user input unit 630 may include a keypad, a dome switch, a touch pad (static pressure/electrostatic), and so on. In particular, when the touch pad configures an interlayer structure with a display 680, this may be referred to as a touchscreen.

The sensor unit 640 may detect a current state of the mobile terminal 600, for example, an opening and closing state of the mobile terminal 600, a position of the mobile terminal 600, and whether a user touches the mobile terminal 600 to generate a sensing signal for control of an operation of the mobile terminal 600.

The sensor unit 640 may include a detection sensor 641, a pressure sensor 643, a motion sensor 645, and so on. The motion sensor 645 may detect the motion, position, and so on of the mobile terminal 600 using an acceleration sensor, a gyro sensor, a gravity sensor, and so on. In particular, the gyro sensor may be a sensor for measuring angular velocity and may detect a rotating direction (rotating angle) based on a reference direction.

The output unit 650 may include the display 680, an audio output unit 653, a notification unit 655, a haptic module 657, and so on.

The display 680 may display and output information processed by the mobile terminal 600.

As described above, when the display 680 and a touchpad configure an interlayer structure to form a touchscreen, the display 680 may also be used as an input device to which information is capable of being input through user input in addition to an output device.

The audio output unit 653 may receive output audio data that is received from the wireless communication unit 610 or is stored in the memory 660. The audio output unit 653 may include a speaker, a buzzer, or the like.

The notification unit 655 may output a signal for indicating event occurrence of the mobile terminal 600. For example, the notification unit 655 may output a signal in the form of vibration.

The haptic module 657 may generate various haptic effects that a user is capable of feeling. A representative example of the haptic effect generated by the haptic module 657 may include a vibration effect.

The memory 660 may store a program for processing and control of the controller 670 and may also temporally store input or output data (e.g., a phonebook, messages, still images, and video images).

The interface unit 625 may interface with all external devices connected to the mobile terminal 600. The interface unit 625 may receive data or power from an external device and may transmit the data and power to each component inside the mobile terminal 600 or may enable data inside the mobile terminal 600 to be transmitted to an external device.

In general, the controller 670 may control an operation of each of the aforementioned components to control an overall operation of the mobile terminal 600. For example, the controller 670 may perform control and processing that are related to voice call, data communication, videotelephony, and so on. In addition, the controller 670 may include a multimedia reproduction module 681 for multimedia reproduction. The multimedia reproduction module 681 may be configured as hardware in the controller 670 or may be configured separately from the controller 670.

The power supply unit 690 may receive external and internal power and may supply power required for an operation of each component under control of the controller 670.

The block diagram of the mobile terminal 600 shown in FIG. 5 is a block diagram of an embodiment of the present invention. Components of the block diagram may be integrated, added, or omitted according to the specifications of the mobile terminal 600 that is actually embodied. That is, as necessary, two or more components may be integrated into one component or one component may be divided into two or more components. In addition, a function performed by each block is merely an embodiment of the present invention, and the scope of the present invention is not limited by a detailed operation or device.

Figure 6:
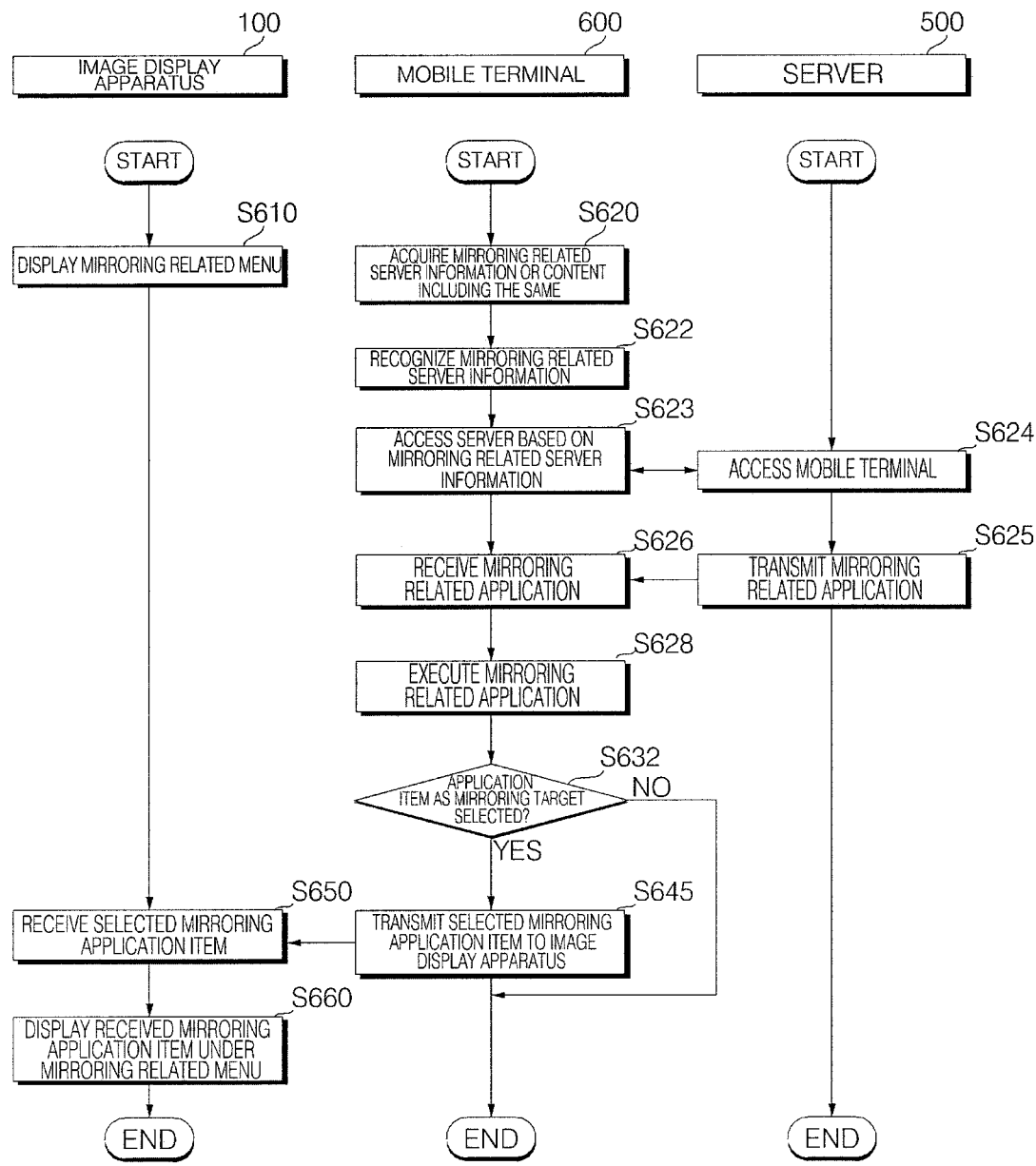
FIG. 6 is a flowchart showing an example of an operation method of an image display apparatus and a mobile terminal according to an embodiment of the present invention.

FIG. 6 is a flowchart showing an example of an operation method of an image display apparatus and a mobile terminal according to an embodiment of the present invention. FIGS. 7A to 11C are diagrams for explanation of the operation method of FIG. 6.

First, referring to FIG. 6, the controller 170 of the image display apparatus 100 may perform control to display a mirroring related menu including mirroring related server information or content associated with the server information based on user input (S610).

For example, in response to a specific key of the remote controller 200 being input, the controller 170 of the image display apparatus 100 may perform control to display a mirroring related menu including mirroring related server information or content associated with the server information.

For example, the content related to the server information may include a code image including the server information. In more detail, the content may include a QR code image including the server information.

As another example, the content associated with the server information may be output as a predetermined sound.

Then, the controller 670 of the mobile terminal 600 may acquire the mirroring related server information or the content associated with the server information, displayed on the image display apparatus 100 (S620). Then, the controller 670 of the mobile terminal 600 may recognize the mirroring related server information (S625).

For example, the mobile terminal 600 may capture a code image displayed on the image display apparatus 100 through the camera 621. The controller 670 of the mobile terminal 600 may extract the server information from the captured code image and may recognize the extracted server information.

As another example, the mobile terminal 600 may extract server information from a sound received through the microphone 623 to recognize the extracted server information.

Then, the controller 670 of the mobile terminal 600 may perform control to access a corresponding server based on the recognized mirroring related server information (S623). In response thereto, the server 500 may access the mobile terminal 600 (S624).

For example, the server 500 may be a server that is managed by a manufacturer of the image display apparatus 100 and may be a server corresponding to mirroring related server information, which is installed during manufacture of the image display apparatus 100.

As such, a user of the mobile terminal 600 may easily access the server 500 through mirroring related server information or content associated with the server information, displayed on the image display apparatus 100.

The server 500 may transmit a mirroring-related application to the mobile terminal 600 while accessing the mobile terminal 600 (S625).

In response thereto, the controller 670 of the mobile terminal 600 may receive the mirroring-related application from the server 500 through the communication unit 610 or the like (S626) and may install the mirroring-related application. In addition, the controller 670 may execute the installed mirroring-related application (S628).

Accordingly, the mirroring-related application may be easily installed and executed in the mobile terminal 600.

Then, the controller 670 of the mobile terminal 600 may determine whether an application item as a mirror target is selected (S632) and, upon determining that the application item is selected, the controller 670 may perform control to transmit the selected application item to the image display apparatus 100 (S645).

For example, the controller 670 of the mobile terminal 600 may select an application item as a mirror target with the image display apparatus 100 among a plurality of applications installed in the mobile terminal 600, through the mirroring-related application.

At least one application item may be selected and, in this case, the controller 670 of the mobile terminal 600 may transmit information on the selected at least one application item to the image display apparatus 100.

In particular, the controller 670 of the mobile terminal 600 may transmit title information, application image information, user information, application version information, and the like of the selected at least one application item to the image display apparatus 100.

Then, the controller 170 of the image display apparatus 100 may receive the selected mirroring application item from the mobile terminal 600 through a network interface unit 135 or 145 (S650).

The controller 170 of the image display apparatus 100 may perform control to install the received mirroring application item in the image display apparatus 100 and, in particular, to display the received and selected mirroring application item in the mirroring related menu (S660). Accordingly, the mirroring application item from the mobile terminal may be easily installed and displayed in the image display apparatus 100.

Hereinafter, the operation method of FIG. 6 will be described with reference to FIGS. 7A to 11C.

Figure 7A:
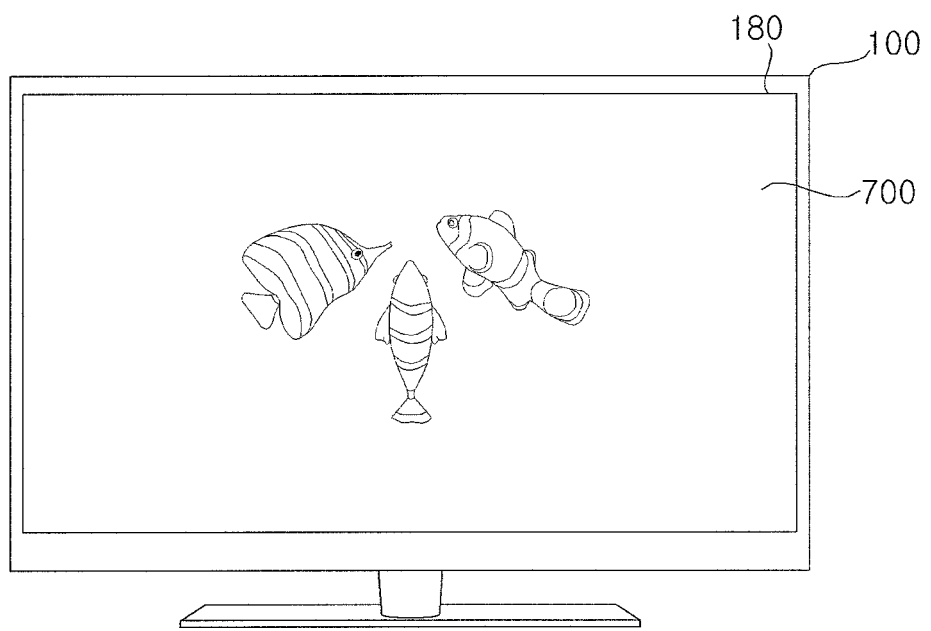
FIGS. 7A to 11C are diagrams for explanation of the operation method of FIG. 6.

The controller 170 of the image display apparatus 100 may perform control to display a broadcast image 700 based on a broadcast signal received by the broadcast receiver 105 on the display 180, as shown in FIG. 7A.

Figure 7B:
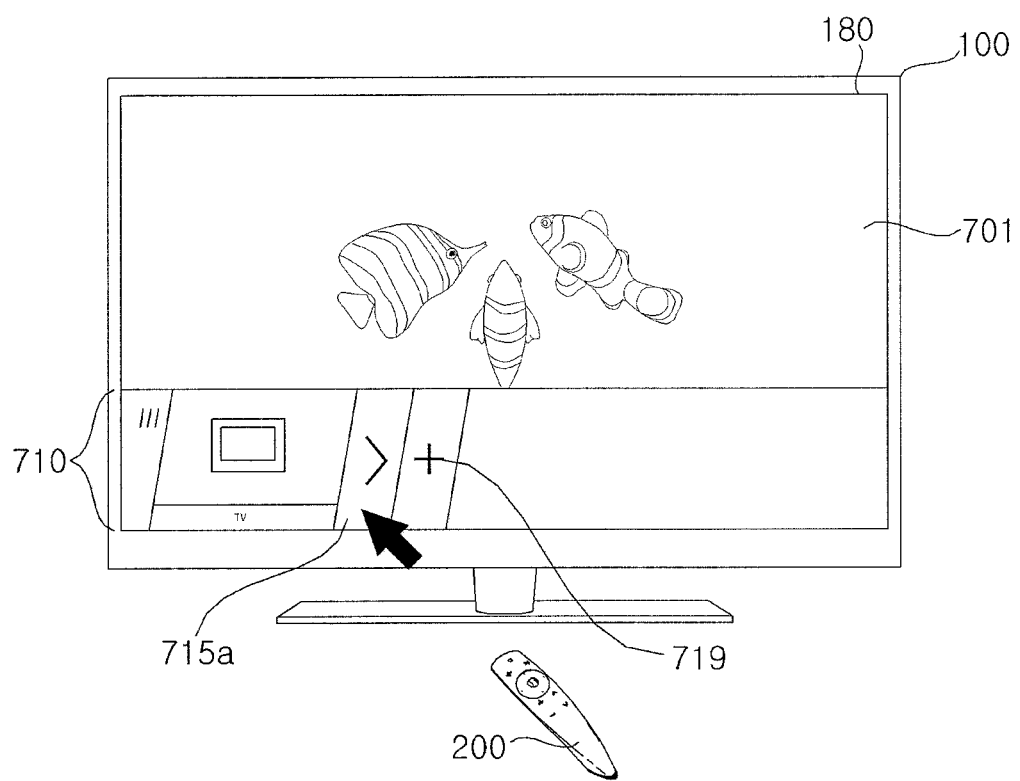

In this case, when there is a specific key input of the remote controller 200, the controller 170 of the image display apparatus 100 may perform control to display a broadcast image 701 corresponding to a broadcast signal with an application list 710, as shown in FIG. 7B.

The controller 170 of the image display apparatus 100 may perform control to display the application list 710 to overlap on the broadcast image 701, as shown in FIG. 7B.

The application list 710 may include a mirroring item 715*a*, an additional view item 719, an application item, or the like.

Figure 7C:
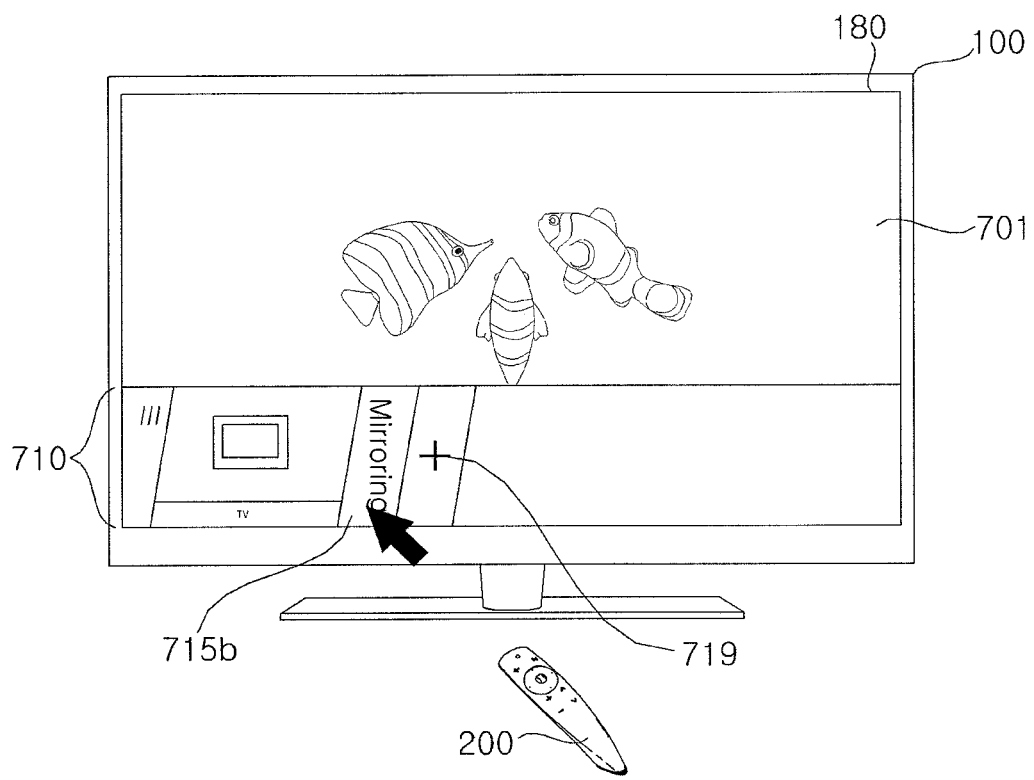

Differently from FIG. 7B, FIG. 7C shows an example of a case in which a mirroring item 715*b* is displayed in the application list 710. For convenience of recognition of a user, the mirroring item 715*b* may be displayed as an object indicating mirroring.

Figure 7D:
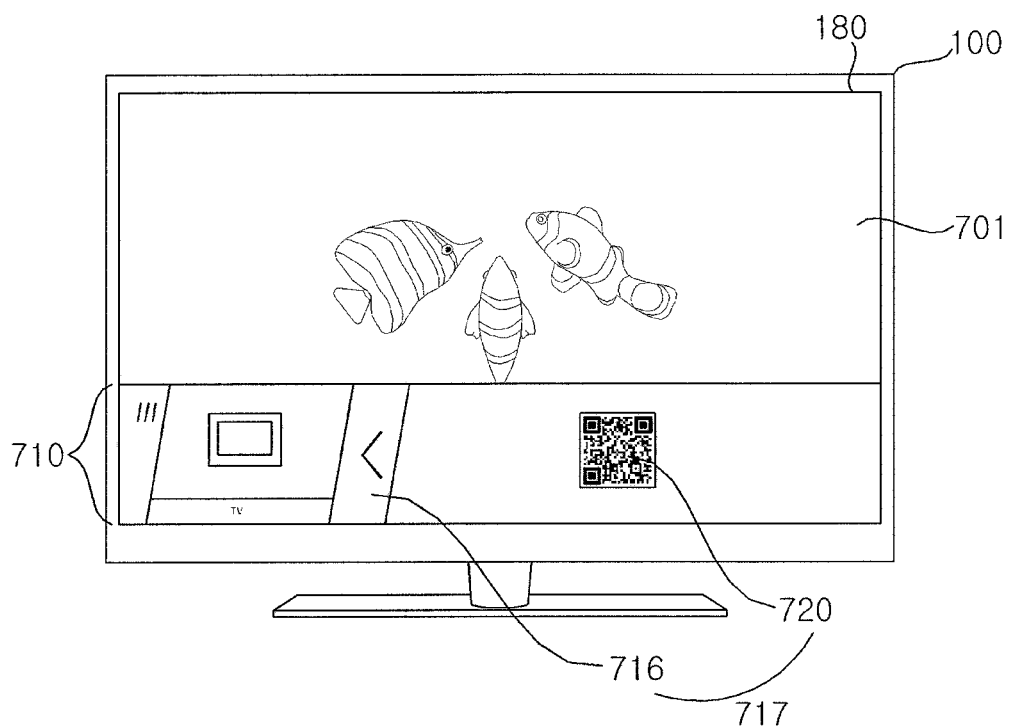

When the mirroring item 715*a* or 715*b* is selected, the controller 170 of the image display apparatus 100 may perform control to display a mirroring related menu 717 including mirroring related server information or content 720 associated with the server information, as shown in FIG. 7D.

The mirroring related menu 717 may be displayed to be spread in a right direction according to selection of the mirroring item 715*a* or 715*b*.

The mirroring related menu 717 may further include a restoration item 716 for restoration to the mirroring item 715*a* or 715*b*.

The content 720 associated with the server information may include a code image including the server information. For example, the content 720 associated with the server information may include a QR code image including the server information, as shown in FIG. 7D.

Figure 7E:
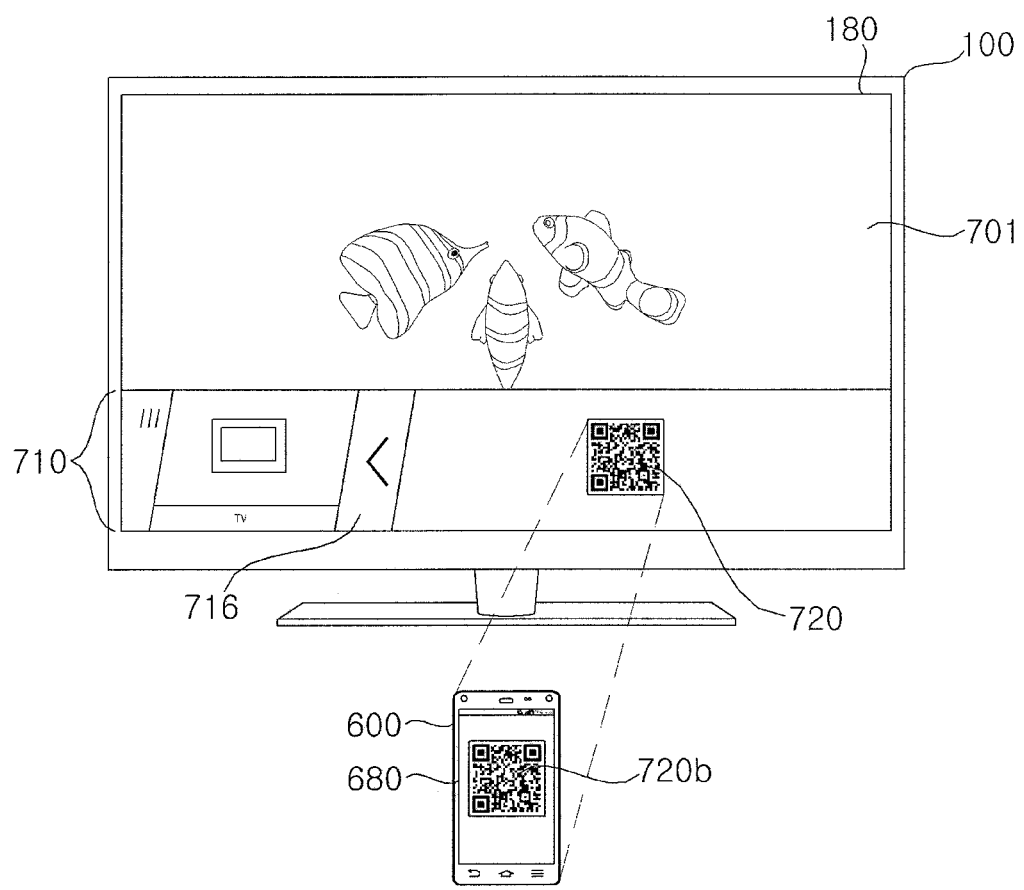

In a state in which the content 720 associated with the server information is displayed on the image display apparatus 100, the camera 621 of the mobile terminal 600 may capture an image of the content 720 associated with the server information, as shown in FIG. 7E.

In addition, the controller 670 of the mobile terminal 600 may receive and recognize a captured content image 720*b*. In this case, the controller 670 of the mobile terminal 600 may perform control to display the captured content image 720*b* associated with the server information on the display 180.

The controller 670 of the mobile terminal 600 may extract server information from the captured content image 720*b*.

In addition, the controller 670 of the mobile terminal 600 may perform control to access the corresponding server 500 based on the extracted server information.

For example, for access to the corresponding server 500, the controller 670 of the mobile terminal 600 may transmit an access request signal Sreg1 to the server 500 and may receive an access response signal Sres1 from the server 500, as shown in FIG. 7F.

Then, the controller 670 of the mobile terminal 600 may receive a mirroring-related application from the server 500, as shown in FIG. 7G.

In more detail, the controller 670 of the mobile terminal 600 may perform control to display an image 732 for downloading a mirroring application, as shown in FIG. 7G(a).

In addition, when a download item 732 is selected by user touch input or the like, the controller 670 of the mobile terminal 600 may download a mirroring application and, when the download is completed, the controller 670 of the mobile terminal 600 may perform control to display a download completion image 734, as shown in FIG. 7G(b).

Then, the controller 670 of the mobile terminal 600 may install a downloaded mirroring setting application. In this case, the controller 670 of the mobile terminal 600 may perform control to display an installation image 736, as shown in FIG. 7G(c).

When installation is completed, the controller 670 of the mobile terminal 600 may perform control to display an installation completion image 738, as shown in FIG. 7G(d).

Then, the controller 670 of the mobile terminal 600 may execute the mirroring setting application that is completely installed.

This will be described with reference to FIGS. 8A to 8I.

Figure 8A:
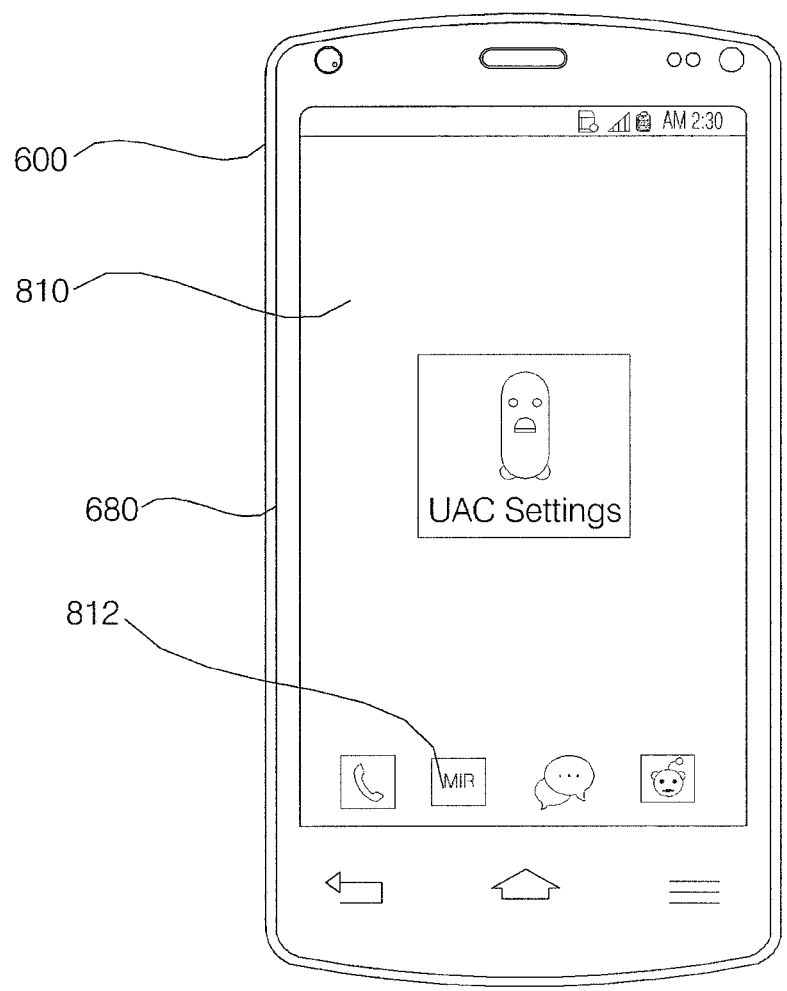

First, FIG. 8A shows an example of a standby image 810 or a home image 810 of the mobile terminal 600. The standby image 810 or the home image 810 may be displayed on the display 680. A plurality of application items may be displayed on a lower part of a screen. The drawing shows an example of a case in which a mirroring application item 812 among a plurality of application items is displayed.

In the standby image 810 or the home image 810 of the mobile terminal 600 in FIG. 8A, when the mirroring application item 812 is selected or a mirroring application in FIG. 7G is completely downloaded, the mirroring application may be automatically executed.

Figure 8B:
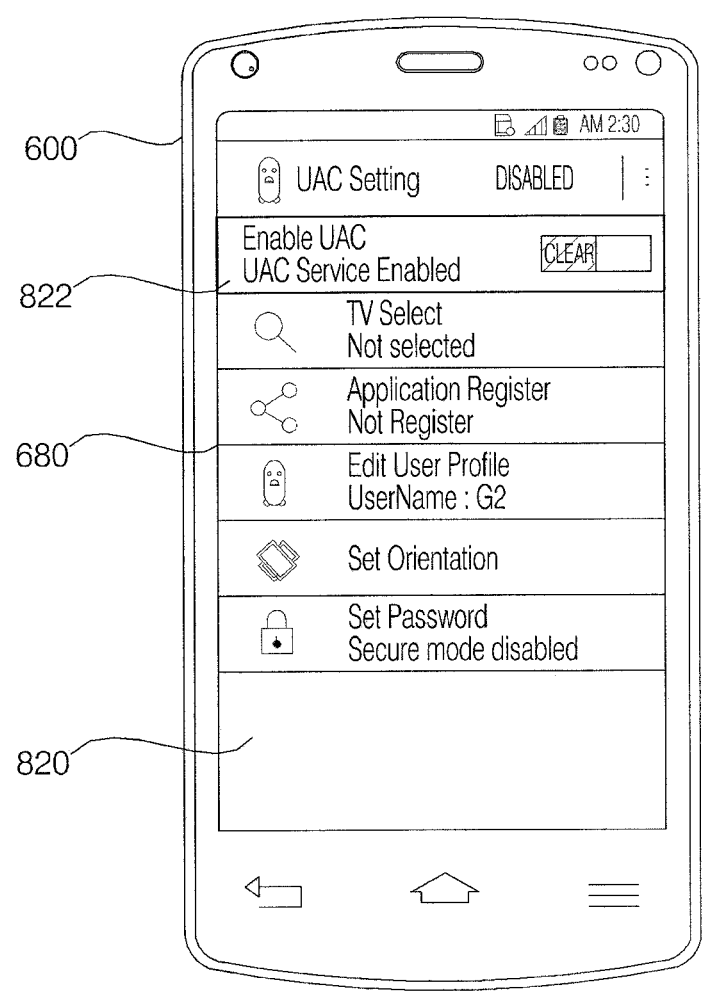

The controller 670 of the mobile terminal 600 may perform control to display a mirroring setting application image 820 during execution of a mirroring application, as shown in FIG. 8B.

The mirroring setting application image 820 may include a setting available item 822, a television (TV) selection item 824, an application registration item 826, a user information edit item 823, a horizontal and vertical view setting item 813, a password item 814, and so on.

Figure 8C:
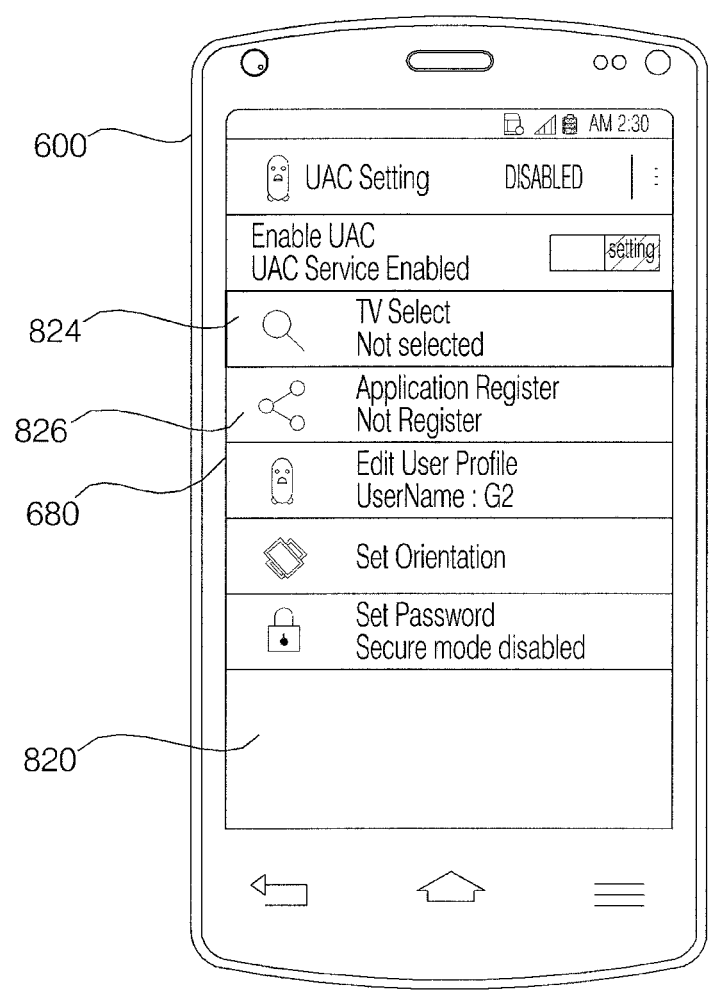

When the setting available item 822 is selected and activated, the controller 670 of the mobile terminal 600 may perform control to display the TV selection item 824, the application registration item 826, the user information edit item 823, the horizontal and vertical view setting item 813, the password item 814, and so on to be activated, as shown in FIG. 8C. Accordingly, various setting, etc. may be performed.

Figure 8D:
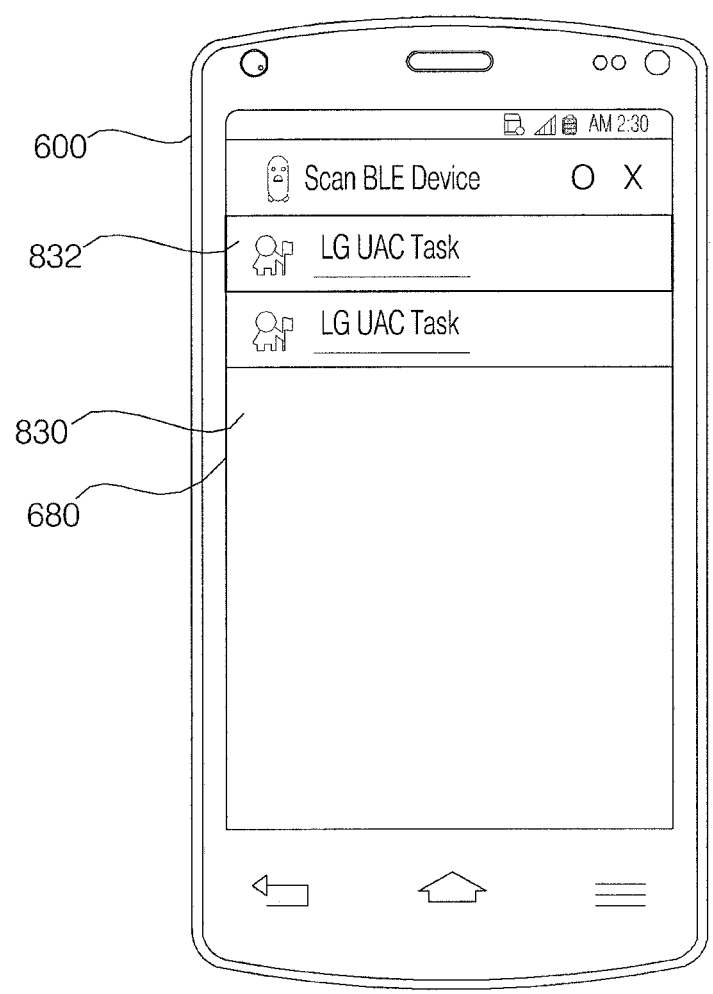

When the TV selection item 824 is selected, the controller 670 of the mobile terminal 600 may search for a surrounding TV and may perform control to display a TV list image 830 including at least one TV item as searching is completed, as shown in FIG. 8D. In the drawing, two TV items are shown by way of example.

Figure 8E:
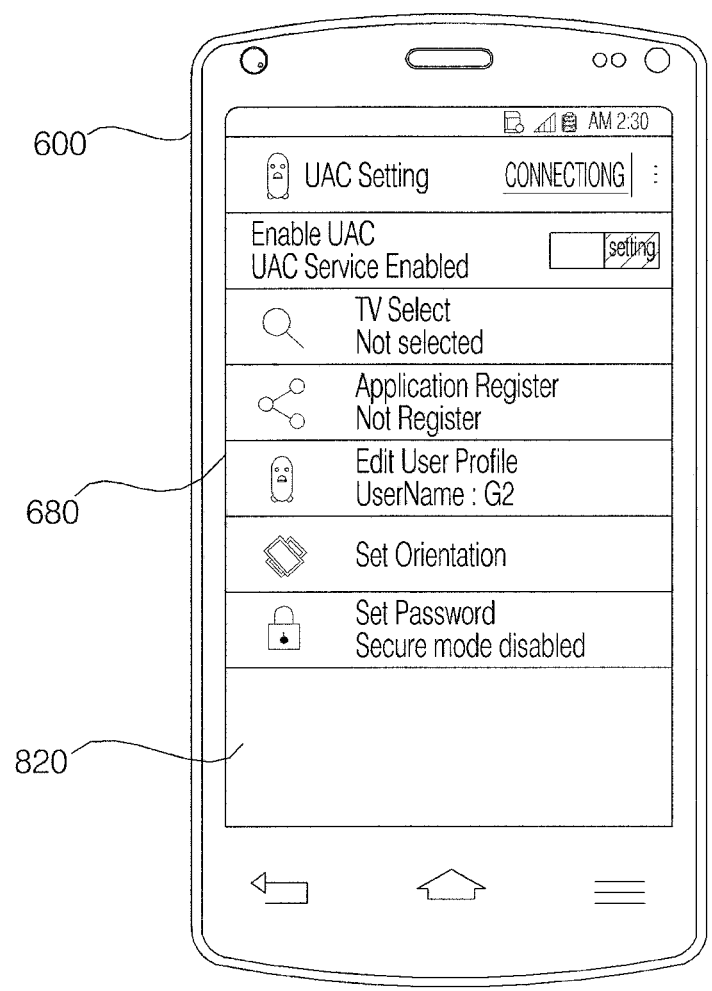

Thereamong, when a first TV item 832 is selected, the controller 670 of the mobile terminal 600 may completely perform setting for mirroring with the selected first TV item 832 and, after setting is completed, the controller 670 of the mobile terminal 600 may perform control to re-display the mirroring setting application image 820, as shown in FIG. 8E.

Figure 8F:
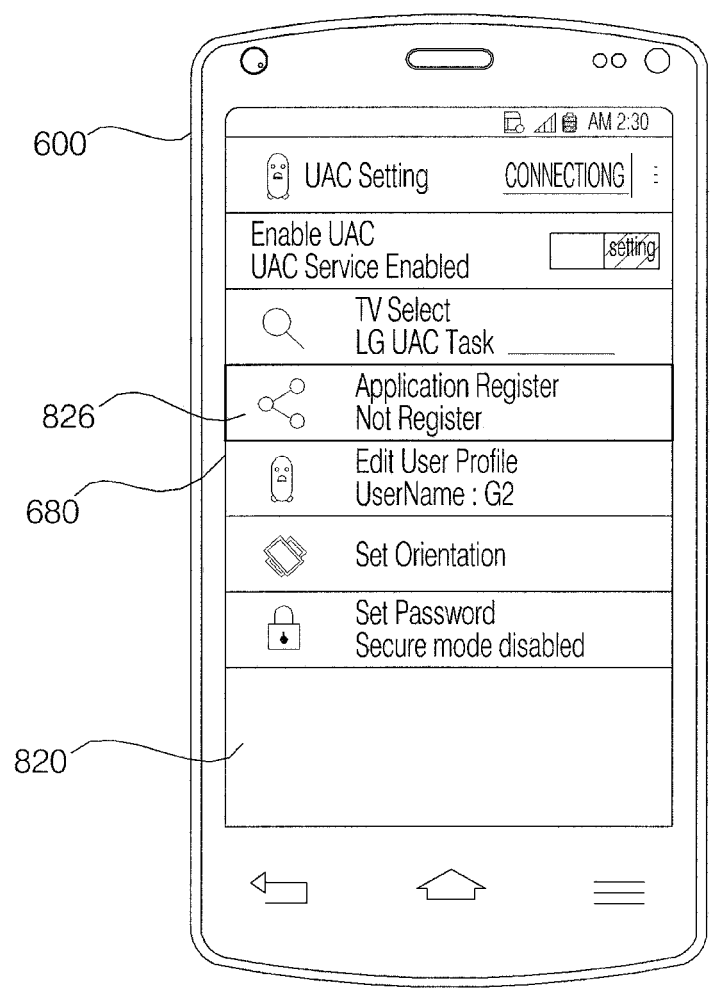
Figure 8G:
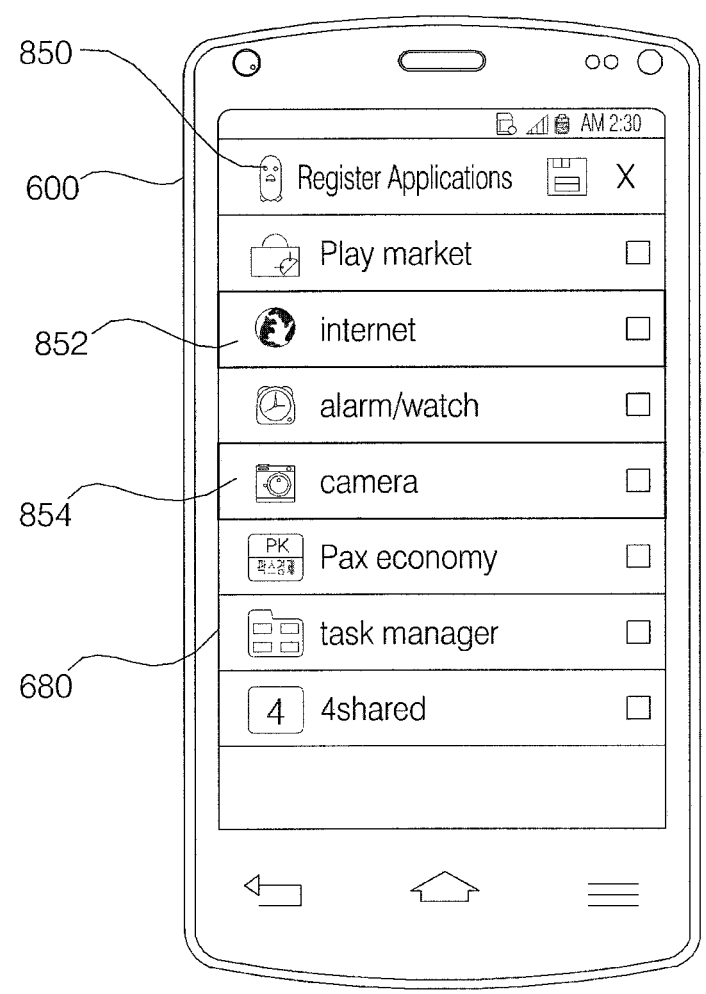

Then, in a state in which the mirroring setting application image 820 is displayed, when the application registration item 826 is selected, as shown in FIG. 8F, the controller 670 of the mobile terminal 600 may perform control to display an application list 850 including an application item installed in the mobile terminal 600, as shown in FIG. 8G.

Figure 8H:
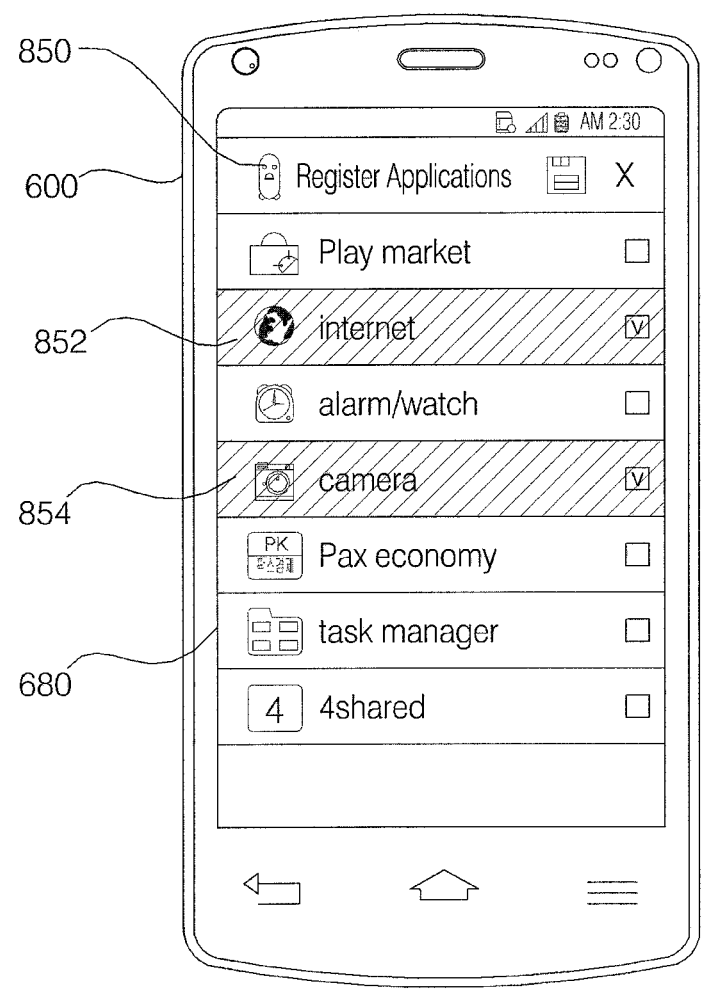

When a plurality of application items in the application list 850, for example, an Internet application item 852 and a camera application item 854 are selected, the controller 670 of the mobile terminal 600 may perform control to highlight the Internet application item 852 and the camera application item 854, as shown in FIG. 8H.

Figure 8I:
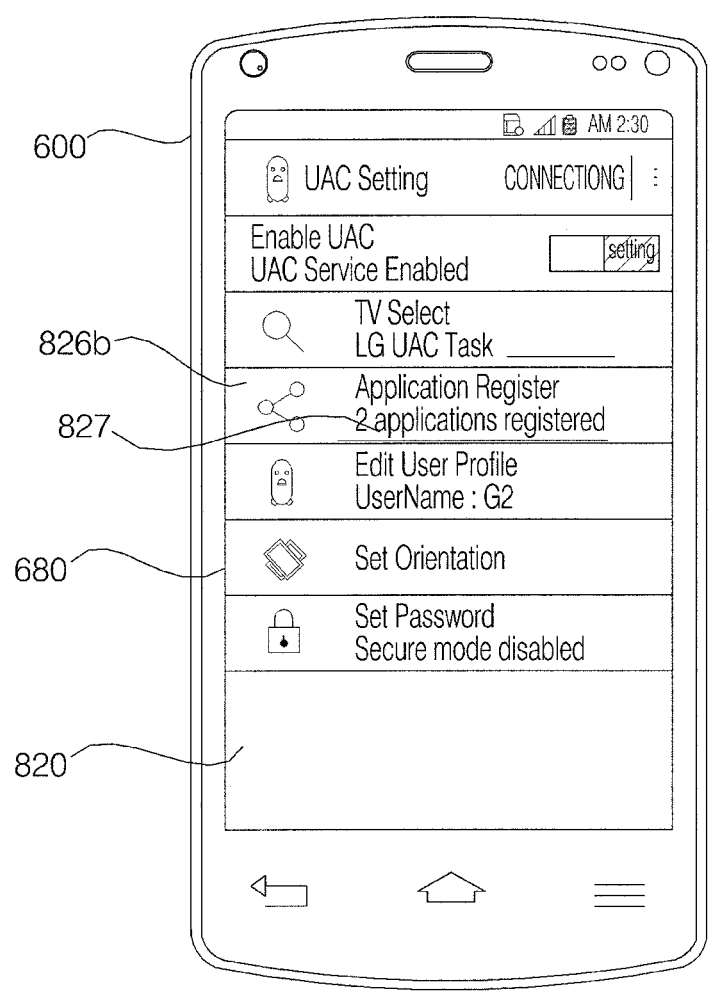

When a storage item or the like is selected, the controller 670 of the mobile terminal 600 may perform control to re-display the mirroring setting application image 820, as shown in FIG. 8I. In this case, an application registration item 826b may include two selected application related information items 827.

Figure 8J:
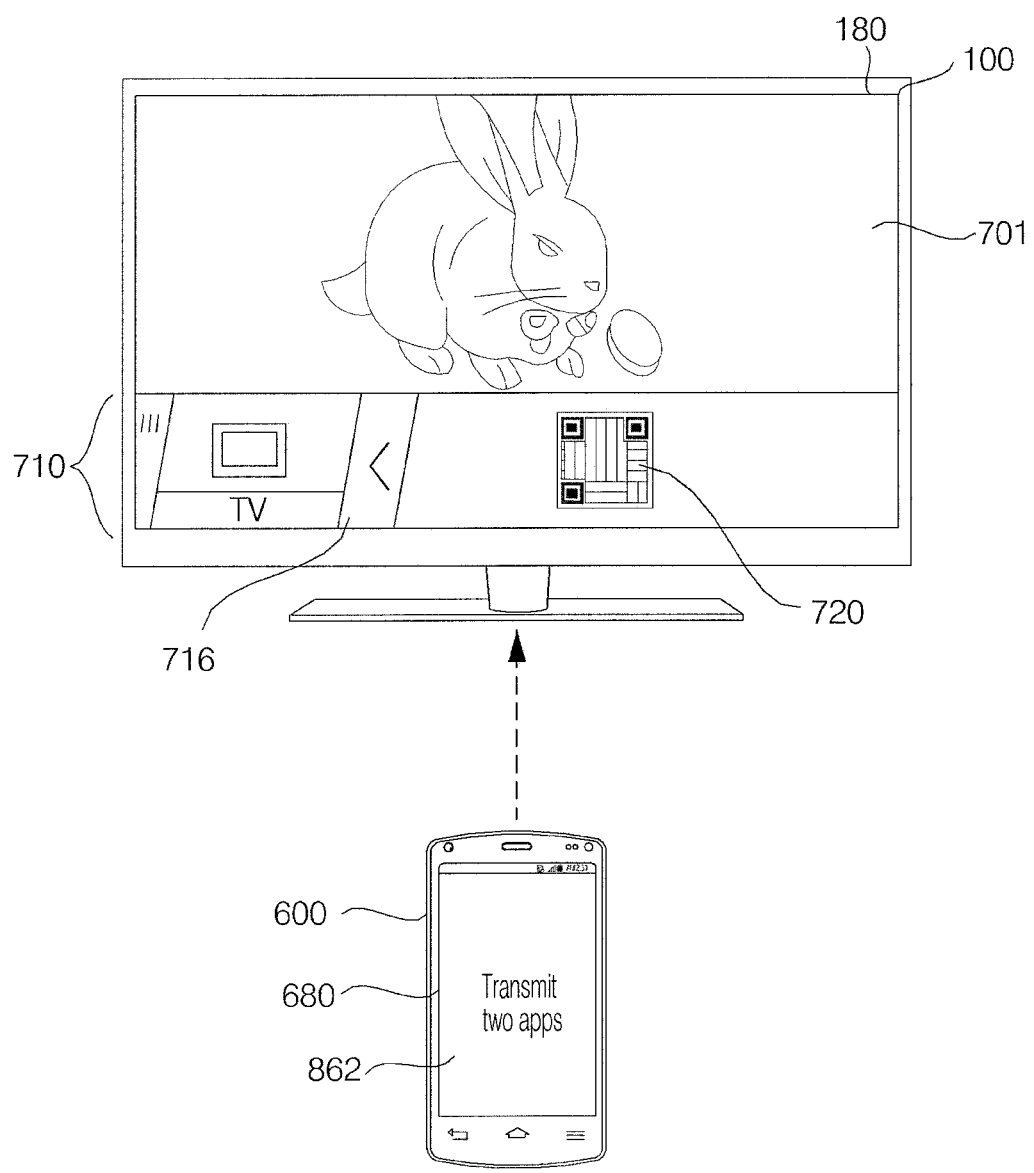

Then, the controller 670 of the mobile terminal 600 may perform control to transmit information related to two selected application items to the image display apparatus 100, as shown in FIG. 8J. In this case, the controller 670 of the mobile terminal 600 may perform control to display two application transmission information items on the display 680.

The image display apparatus 100 may receive information related to two application items as a mirror target, through the interface unit 130 or 135.

Figure 8K:
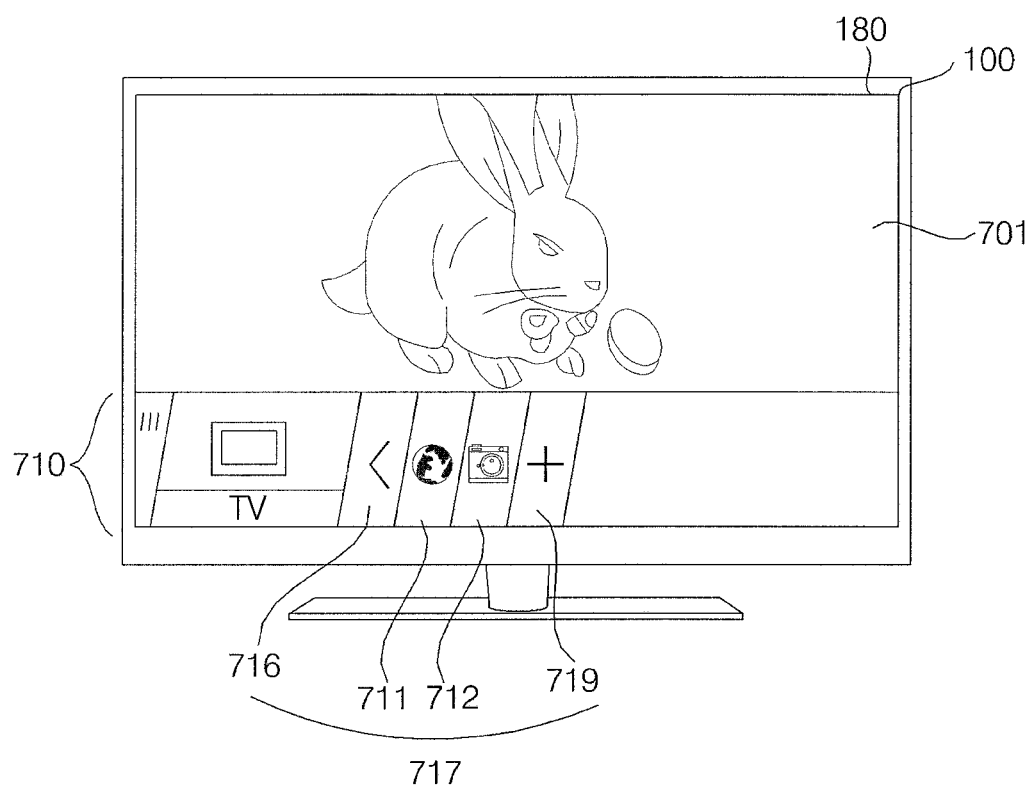

The controller 170 of the image display apparatus 100 may perform control to install the received mirroring application item on the image display apparatus 100 and, in particular, may perform control to display the received mirroring application item in the mirroring related menu 717, as shown in FIG. 8K.

The controller 170 of the image display apparatus 100 may select a first mirroring application item among mirroring application items displayed in the mirroring related menu 717.

For example, the first mirroring application item may be selected using a direction key and a check key of the remote controller 200.

As another example, a pointer may be displayed based on a pointing signal included in an RF signal of the remote controller 200 and the first mirroring application item may be selected by the pointer.

The controller 170 of the image display apparatus 100 may perform control to transmit pairing information or first mirroring application execution request information to the mobile terminal 600 when the first mirroring application item is selected among mirroring application items displayed in the mirroring related menu 717, may receive a first mirroring application execution image from the mobile terminal 600 through the network interface unit 135 or 135, and may perform control to display the received first mirroring application execution image on the display 180.

Figure 9A:
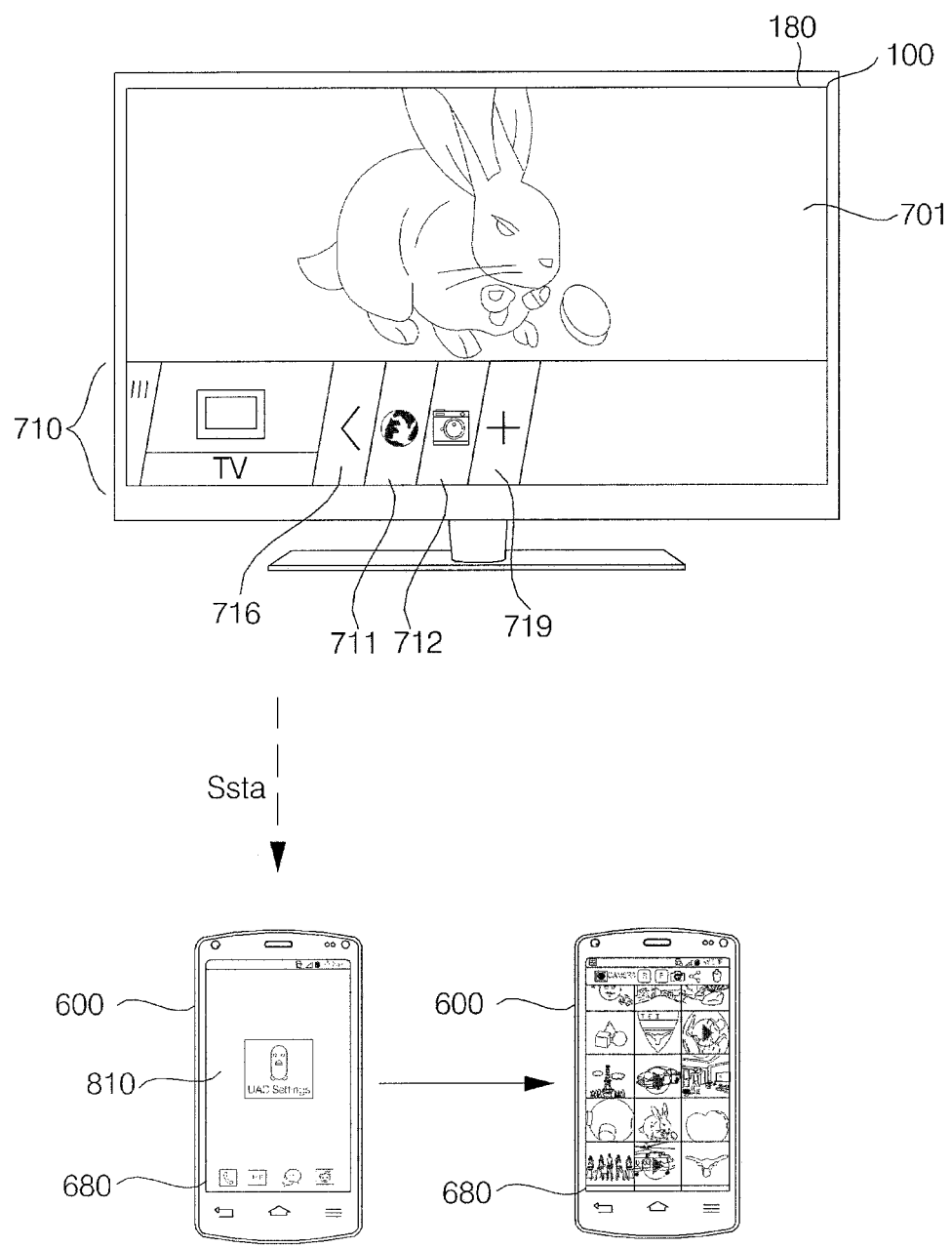

FIG. 9A shows an example of a case in which a camera application item 712 is selected among mirroring application items 711 and 712 displayed in the mirroring related menu 717 and, accordingly, shows an example of a case in which camera application execution request information Ssta is transmitted to the mobile terminal 600 from the image display apparatus 100.

The controller 670 of the mobile terminal 600 may perform control to execute a camera application and may perform control to convert a display home image or the standby image 810 into a camera application image upon receiving the camera application execution request information Ssta, as shown in FIG. 9A.

The controller 670 of the mobile terminal 600 may enter a mirroring mode and may perform control to transmit an image Saib corresponding to a camera application image 840a to the image display apparatus 100, as shown in FIG. 9B.

Accordingly, the controller 170 of the image display apparatus 100 may perform to receive the image Saib corresponding to the camera application image 840a through the interface unit 130 or 135, to perform signal processing such as scaling, and to display an image 701 corresponding to the camera application image 840a on the display 180.

Although FIG. 9B shows an example in which the mirrored camera application image 840b is displayed with the application list 710, differently from FIG. 9B, the application list 710 may disappear and only the mirrored camera application image 840b may be displayed on the display 180, as shown in FIG. 1.

The controller 170 may perform control to use different communication methods in the case of a pairing signal request and mirroring application image transmission.

For example, the controller 170 may perform control to perform communication with a pairing signal or a pairing request signal as a Bluetooth-based Bluetooth low energy (BLE) signal and may perform control to use a Wi-Fi communication method via Miracast with a wide bandwidth during transmission of a mirroring application image.

FIGS. 10A to 10D show another example for installation of a mirroring application in the image display apparatus 100 using the mobile terminal 600, differently from FIGS. 8F to 8I.

Figure 10A:
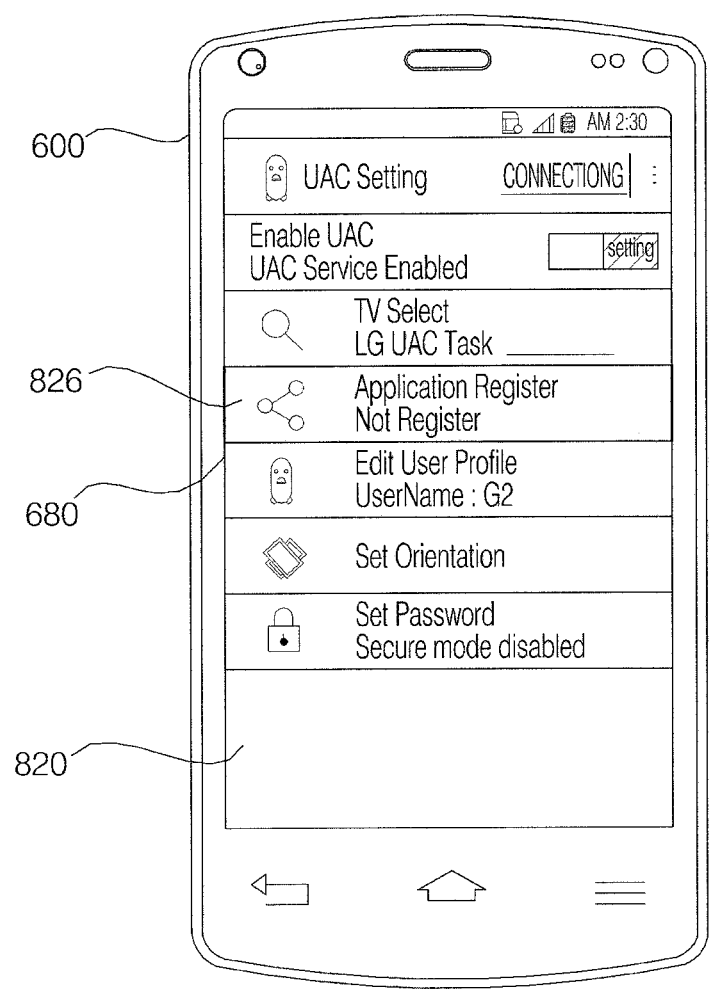
Figure 10B:
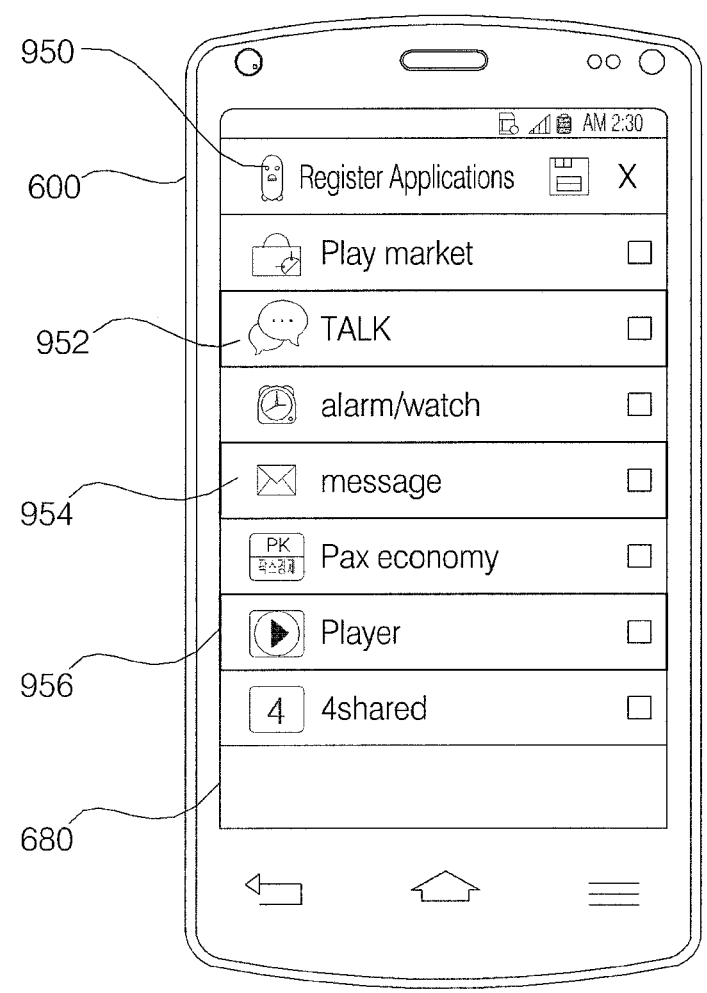

In a state in which the mirroring setting application image 820 is displayed on the mobile terminal 600, when the application registration item 826 is selected as shown in FIG. 10A, the controller 670 of the mobile terminal 600 may perform control to display an application list 950 including an application item installed in the mobile terminal 600, as shown in FIG. 10B.

Figure 10C:
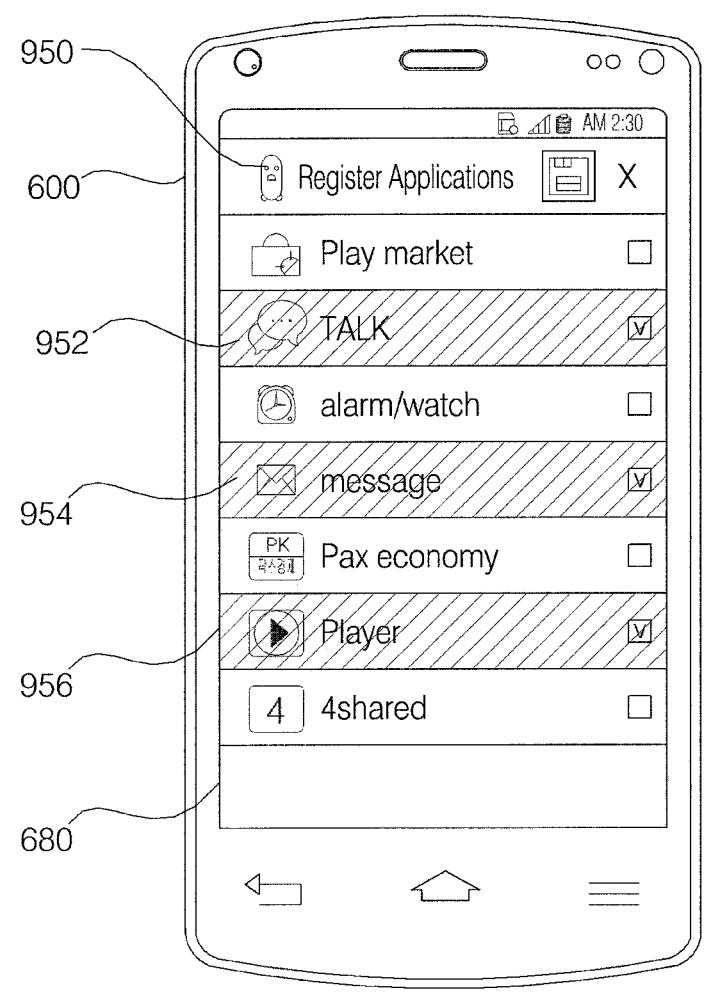

When a plurality of application items in the application list 950, for example, a messenger application item 952, a message application item 954, and a player item 956 for multimedia data reproduction is selected, the controller 670 of the mobile terminal 600 may perform control to highlight the messenger application item 952, the message application item 954, and the player item 956 for multimedia data reproduction, as shown in FIG. 10C.

Figure 10D:
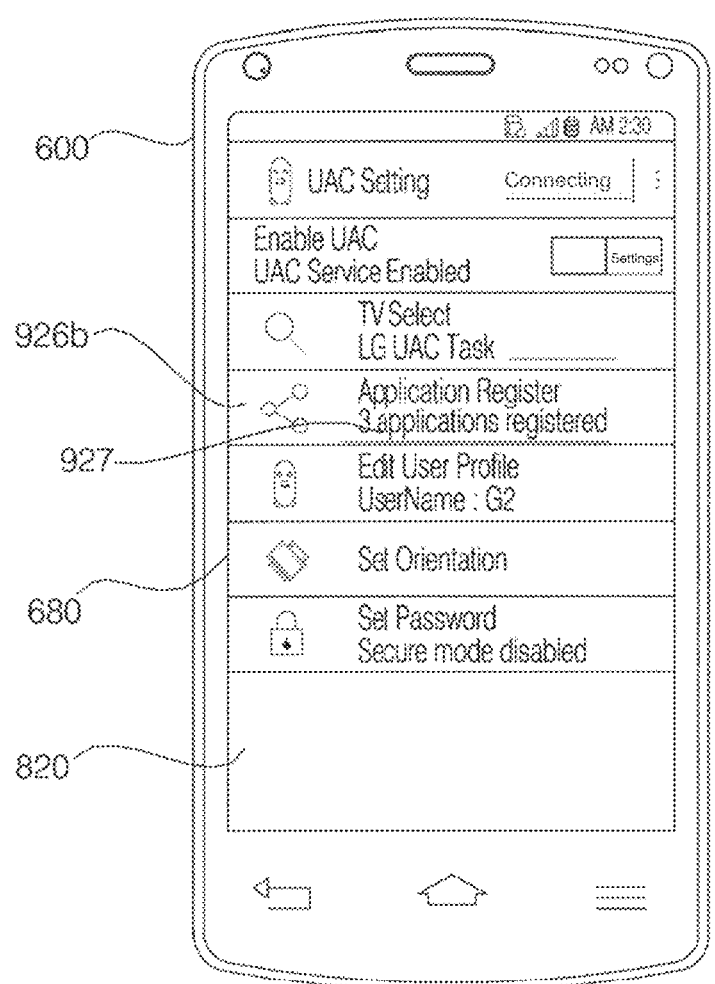

When a storage item or the like is selected, the controller 670 of the mobile terminal 600 may perform control to re-display the mirroring setting application image 820, as shown in FIG. 10D. In this case, an application registration item 926b may include three selected application related items 927.

Then, the controller 670 of the mobile terminal 600 may perform control to transmit information related to three selected application items to the image display apparatus 100. In this case, the controller 670 of the mobile terminal 600 may perform control to display three application transmission information items on the display 680.

The image display apparatus 100 may receive information related to three application items as a mirror target, through the interface unit 130 or 135.

Figure 11A:
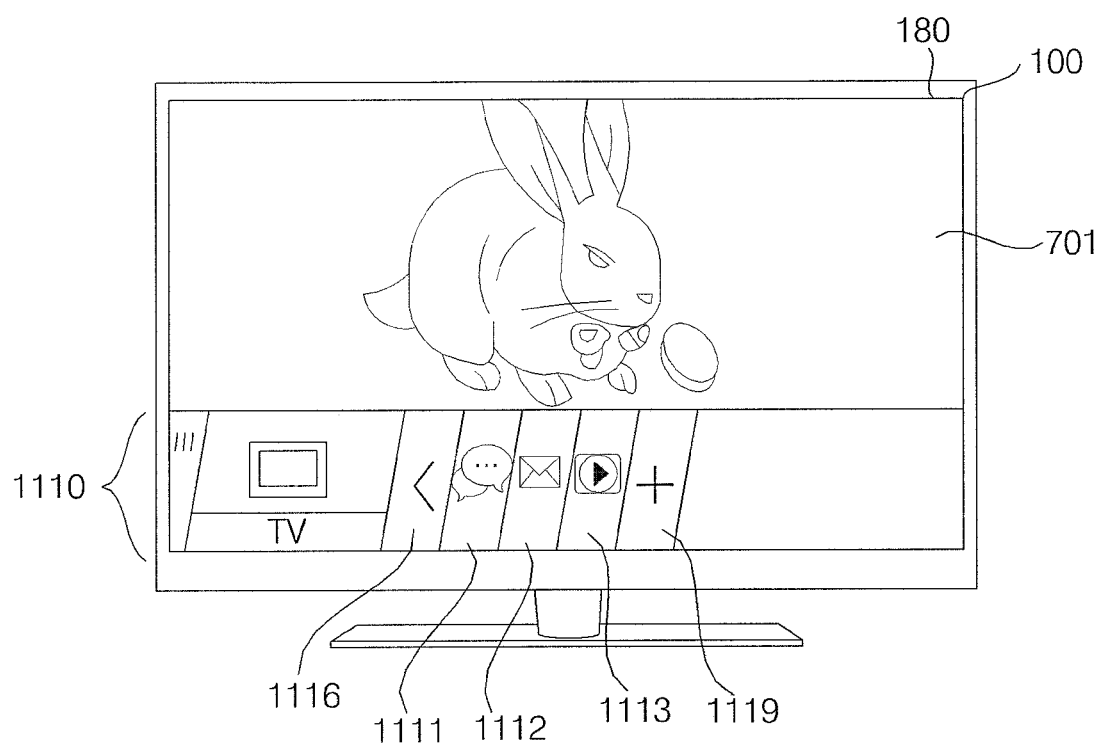

The controller 170 of the image display apparatus 100 may perform control to install the received mirroring application item in the image display apparatus 100 and, in particular, may perform control to display the received mirroring application item in the mirroring related menu in an application list 1110, as shown in FIG. 11A.

FIG. 11A shows a messenger application item 11111, a message application item 1112, and a player item 1113 for multimedia data reproduction as an example of a mirroring application transmitted from the mobile terminal 600.

The mirroring related menu may further include a restoration item 1116, an application added item 1119, and the like for restoration to the mirroring item 715a or 715b of FIG. 7B or 7C.

The controller 170 of the image display apparatus 100 may select a predetermined application item among mirroring application items displayed in the mirroring related menu and may perform control to transmit information on the selected application item to the mobile terminal 600 and, accordingly, may receive an application image executed in the mobile terminal 600. In addition, in a mirroring mode, the received application image may be displayed on the display 180.

Figure 11B:
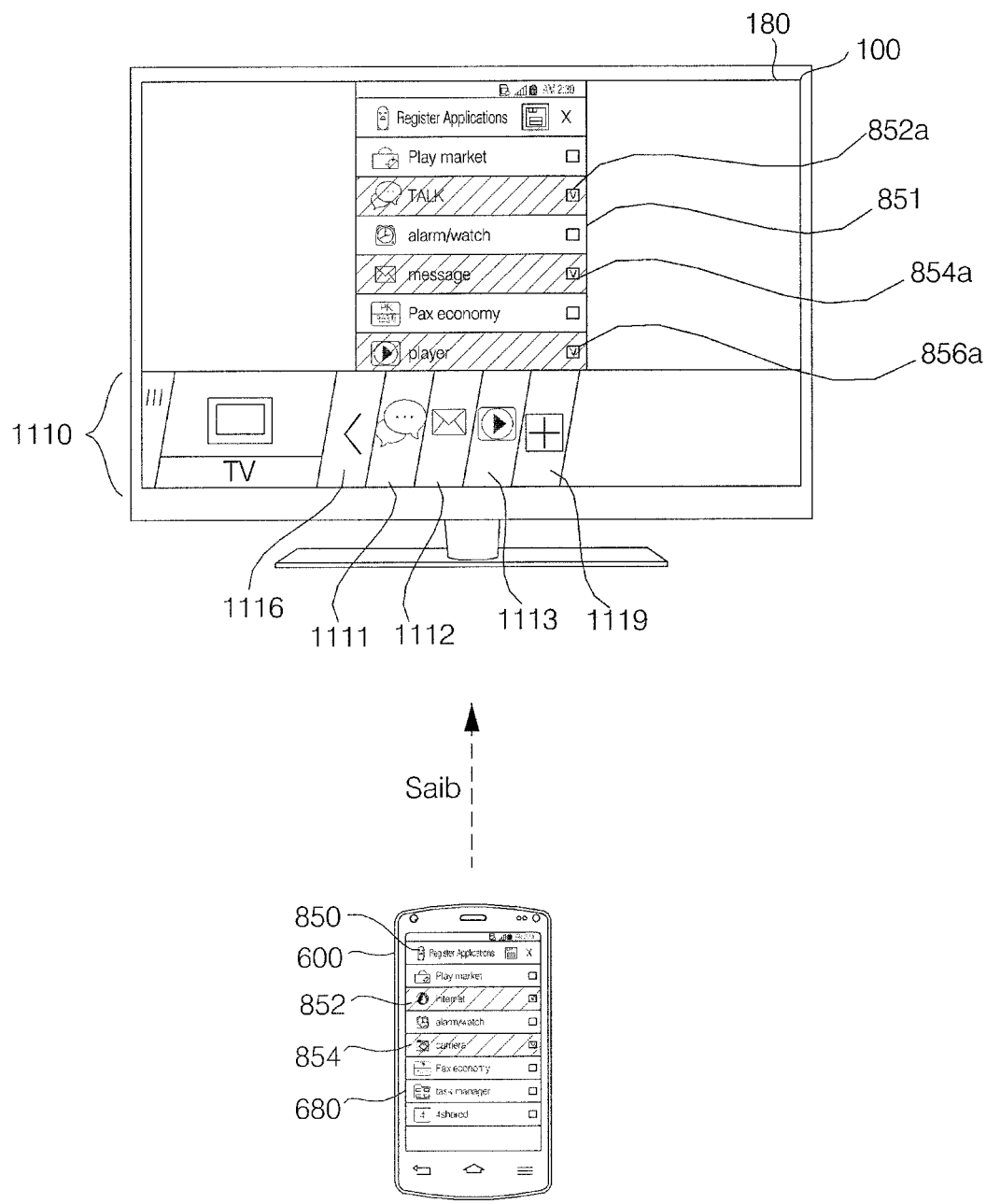
Figure 11C:
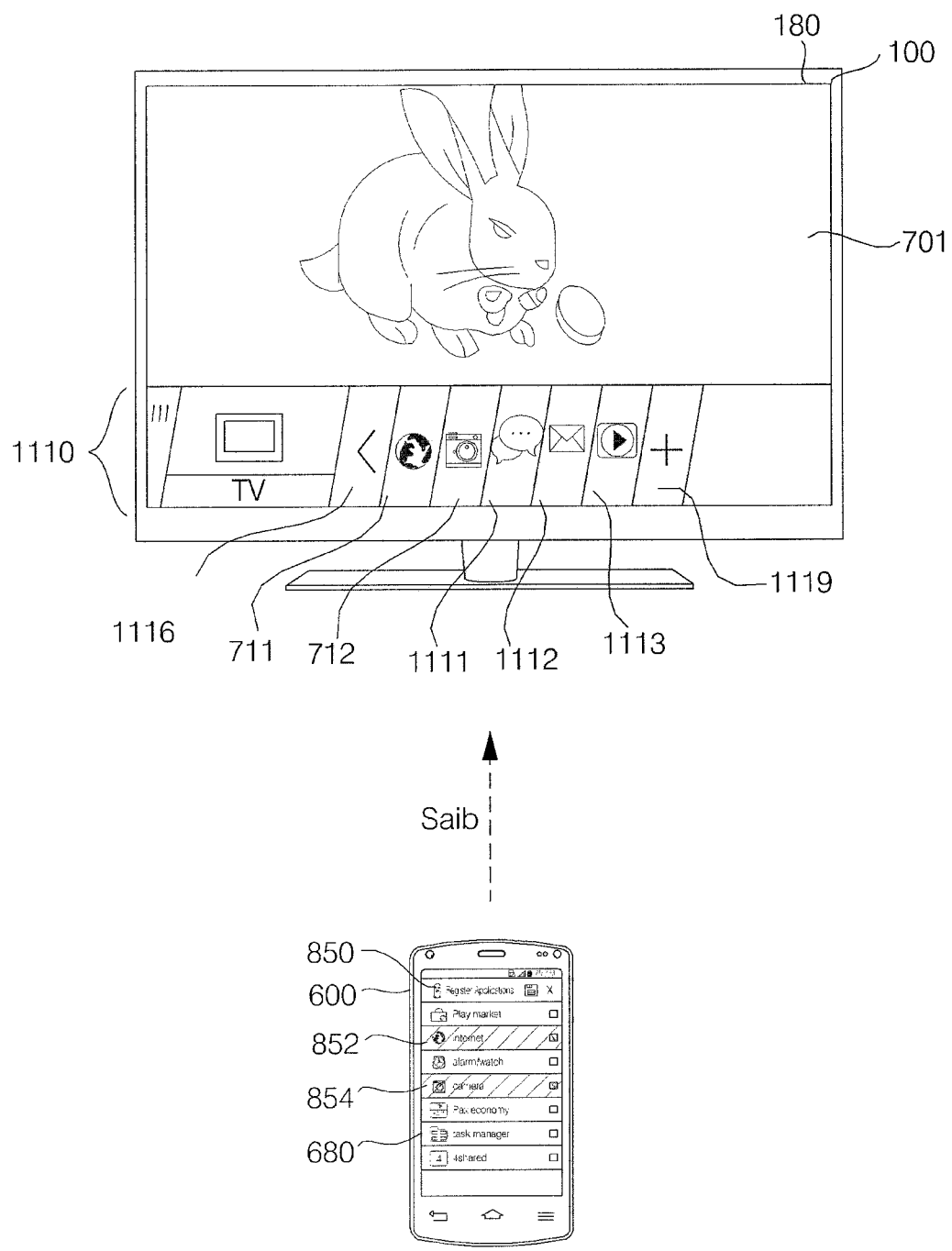

FIGS. 11B and 11C show an example of a method of further adding a mirroring application in a state in which the three mirroring application items shown in FIG. 11A are displayed.

For example, when the application added item 1119 of FIG. 11A is selected, the controller 170 of the image display apparatus 100 may access the mobile terminal 600.

In this case, the controller 670 of the mobile terminal 600 may receive application added information, may perform control to execute a mirroring application and to display the mirroring setting application image 820, as shown in FIG. 11B.

As another example, the controller 670 of the mobile terminal 600 may perform control to execute a mirroring application and to display the mirroring setting application image 820, as shown in FIG. 11B when a user executes the mirroring application to add the mirroring application to the image display apparatus 100.

The controller 670 of the mobile terminal 600 may perform control to transmit image data Saib corresponding to the mirroring setting application image 820, to the image display apparatus 100, as shown in FIG. 11B. The drawing shows an example of a case in which an image 851 corresponding to a mirroring application execution image is displayed on the display 180 of the image display apparatus 100.

The controller 670 of the mobile terminal 600 may perform control to highlight the Internet application item 852 and the camera application item 854, as shown in FIG. 11B when a plurality of application items in the application list 850, for example, the Internet application item 852 and the camera application item 854, are selected.

Then, when there is additional input of two selected application items, the controller 670 of the mobile terminal 600 may perform control to transmit the application items to the image display apparatus 100, as shown in FIG. 11C. In this case, the controller 670 of the mobile terminal 600 may perform control to display two application transmission information items on the display 680.

The image display apparatus 100 may receive information related to two application items as a mirror target, through the interface unit 130 or 135.

The controller 170 of the image display apparatus 100 may perform control to install the received mirroring application item in the image display apparatus 100 and, in particular, may perform control to display an Internet application item 711 and the camera application item 712 with the messenger application item 11111, the message application item 1112, and the player item 1113 for multimedia data reproduction, which have been already added to the mirroring related menu, as shown in FIG. 11C. Accordingly, the mirroring-related application may be easily added to an application list of the image display apparatus 100, in particular, the mirroring related menu.

Figure 12:
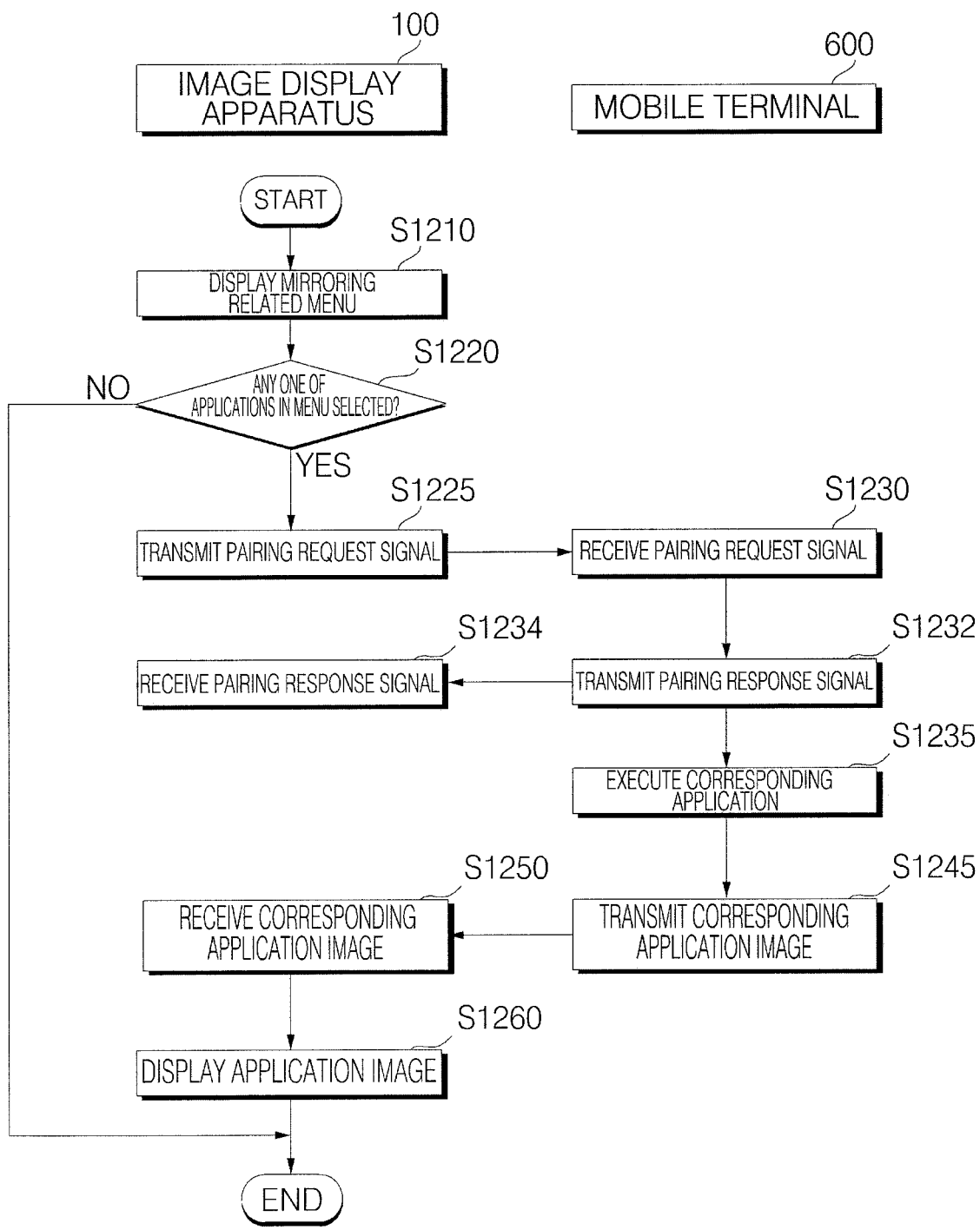
FIG. 12 is a flowchart showing an example of an operation method of an image display apparatus and a mobile terminal according to another embodiment of the present invention.

FIG. 12 is a flowchart showing an example of an operation method of an image display apparatus and a mobile terminal according to another embodiment of the present invention. FIGS. 13A to 14E are diagrams for explanation of the operation method of FIG. 12.

First, referring to FIG. 12, the controller 170 of the image display apparatus 100 may perform control to display a mirroring related menu based on user input (S1210).

For example, as shown in FIG. 7A, in a state in which the broadcast image 700 is displayed, when a home key, an application execution key, or the like is operated, the application list 710 may be displayed on a lower part of a screen, as shown in FIG. 7B. In this case, the application list may include a plurality of application items, in particular, the mirroring application item 715a or 715b shown in FIG. 7B or 7C.

When the mirroring application item 715a or 715b is selected by the pointer 205 based on a pointing signal of the remote controller 200, the mirroring related menu 717 may be displayed to be spread in a right direction, similarly to a pull-down menu.

When an application related to mirroring is not added, the mirroring related menu 717 may include a code image 720 for installation of a mirroring-related application as shown in FIG. 7D and, when an application related to mirroring is added as shown in FIGS. 8A to 8K, the code image 720 may disappear and the installed application items related to mirroring may be displayed.

Hereinafter, a detailed description will be given assuming that application items related to mirroring are installed in a mirroring related menu.

Then, when any one of the application items in the mirroring related menu is selected by the pointer 205 or the like based on a pointing signal of the remote controller 200 (S1220), the controller 170 of the image display apparatus 100 may perform control to transmit a pairing request signal to the mobile terminal 600 (S1225).

In response thereto, the controller 670 of the mobile terminal 600 may perform control to receive the pairing request signal (1230) and may perform control to transmit a pairing response signal (S1232).

In response thereto, the controller 170 of the image display apparatus 100 may receive the pairing response signal (S1234). Based thereon, the controller 170 of the image display apparatus 100 may access the mobile terminal 600 and may perform control to maintain access to the mobile terminal 600.

The controller 170 of the image display apparatus 100 may perform control to additionally transmit information on the selected application item as well as the pairing request signal to the mobile terminal 600.

Accordingly, the controller 670 of the mobile terminal 600 may receive information on the selected application item and may perform control to execute a corresponding application in the mobile terminal 600 based on the received information on the application item (S1235).

Then, the controller 670 of the mobile terminal 600 may perform control to transmit an image of an executed application to the image display apparatus 100 (S1245).

In response thereto, the controller 170 of the image display apparatus 100 may receive an image of the executed application through the interface unit 130 or 135 (S1250) and may perform control to display the received image of the executed application (S1260).

Figure 13A:
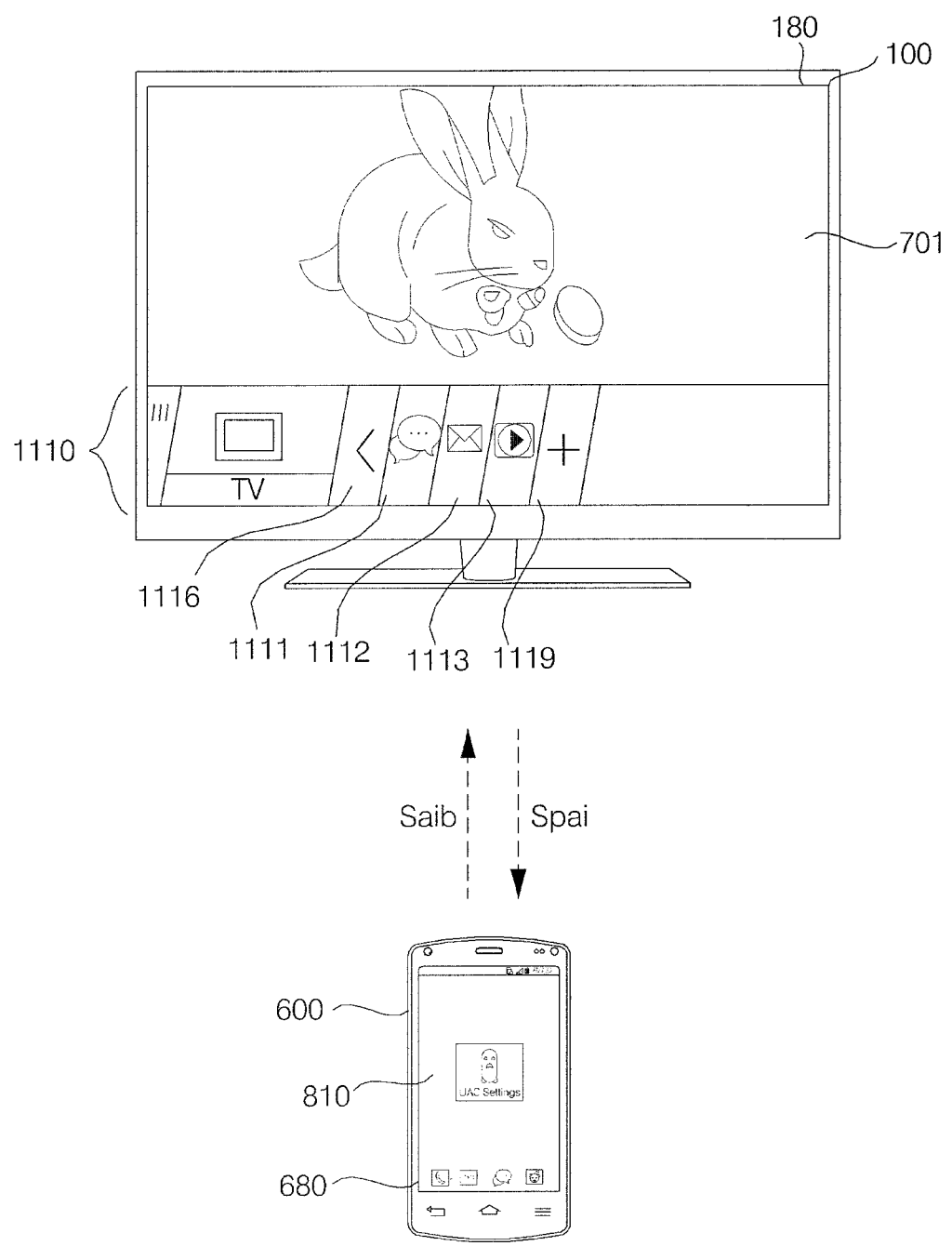
FIGS. 13A to 14E are diagrams for explanation of the operation method of FIG. 12.

FIG. 13A shows an example in which a player application item 1113 is selected among a plurality of mirroring application items in the application list 1110 on the display 180 of the image display apparatus 100.

Accordingly, the controller 170 of the image display apparatus 100 may transmit a pairing request signal Spai to the mobile terminal 600 on which a home image or the standby image 810 is displayed and may receive a pairing response signal Spar from the mobile terminal 600.

Figure 13B:
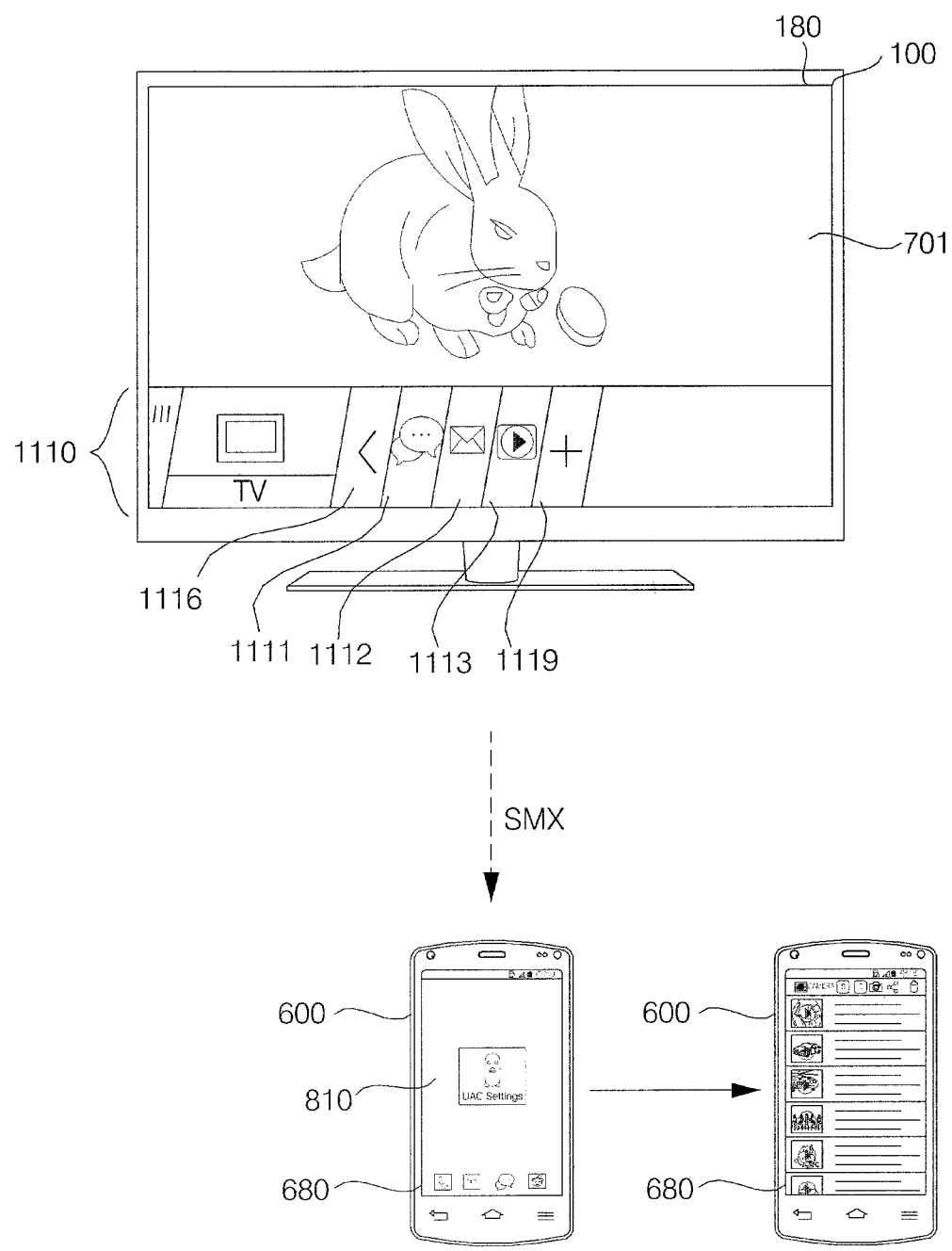

The controller 170 of the image display apparatus 100 may perform control to transmit information SMX on the selected application item to the mobile terminal 600 as well as the pairing request signal Spai, as shown in FIG. 13B.

The mobile terminal 600 on which a home image or the standby image 810 is displayed may execute a corresponding application in the mobile terminal 600 based on the received information SMX on the application item and may display the executed application image on the display 680, as shown in FIG. 13B.

In particular, FIG. 13B illustrates an example of a content list image among player application images. Thereamong, when any one of pieces of content is selected, a reproduced image 1320 may be displayed on the display 680 of the mobile terminal 600, as shown in FIG. 13C.

In addition, in a mirroring mode, an image corresponding to the reproduced image 1320 may be transmitted to the image display apparatus 100 and an image 1320a corresponding to a reproduced image may be displayed on the display 180 of the image display apparatus 100. Accordingly, mirroring between the image display apparatus 100 and the mobile terminal 600 may be easily performed.

Figure 14A:
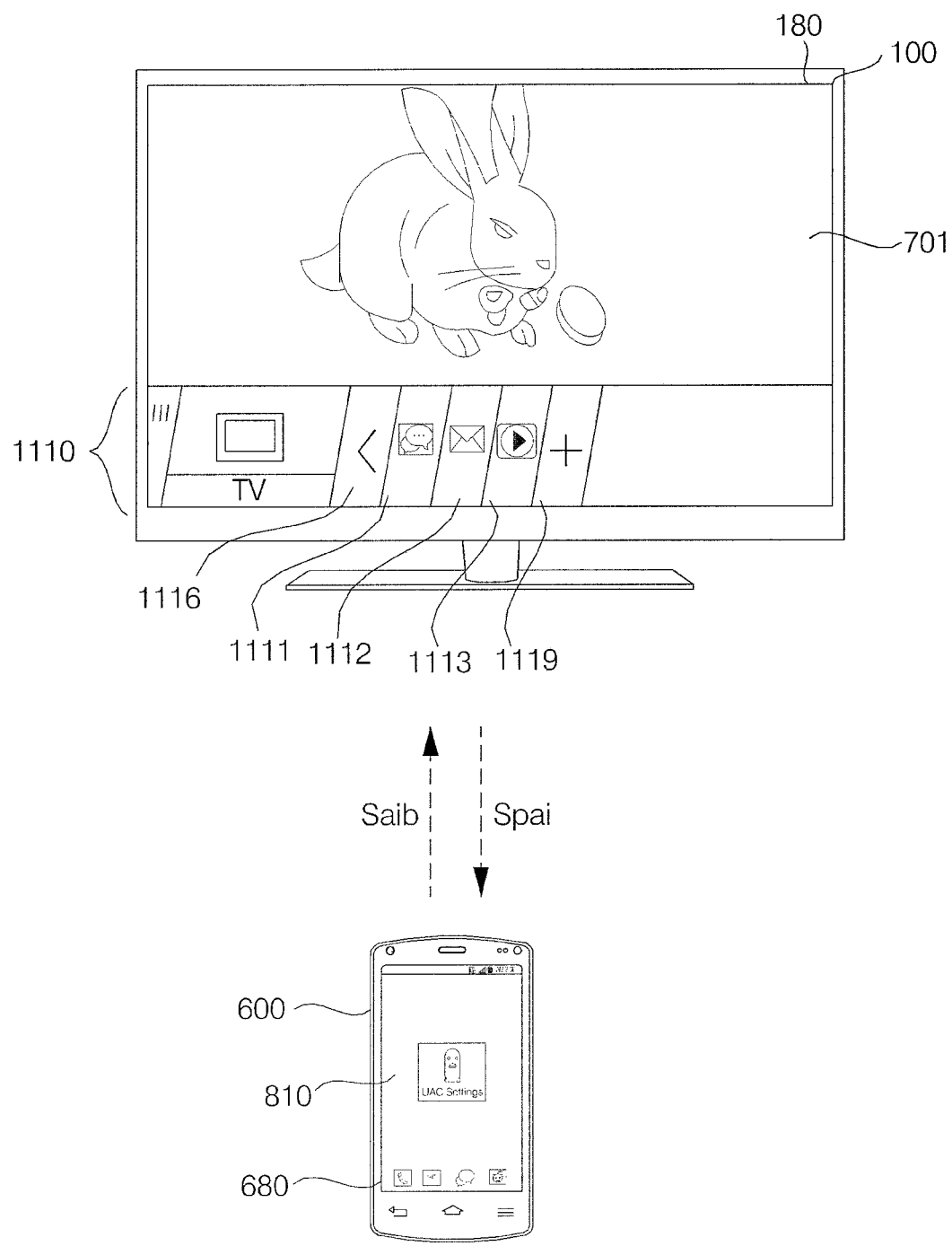
Figure 14B:
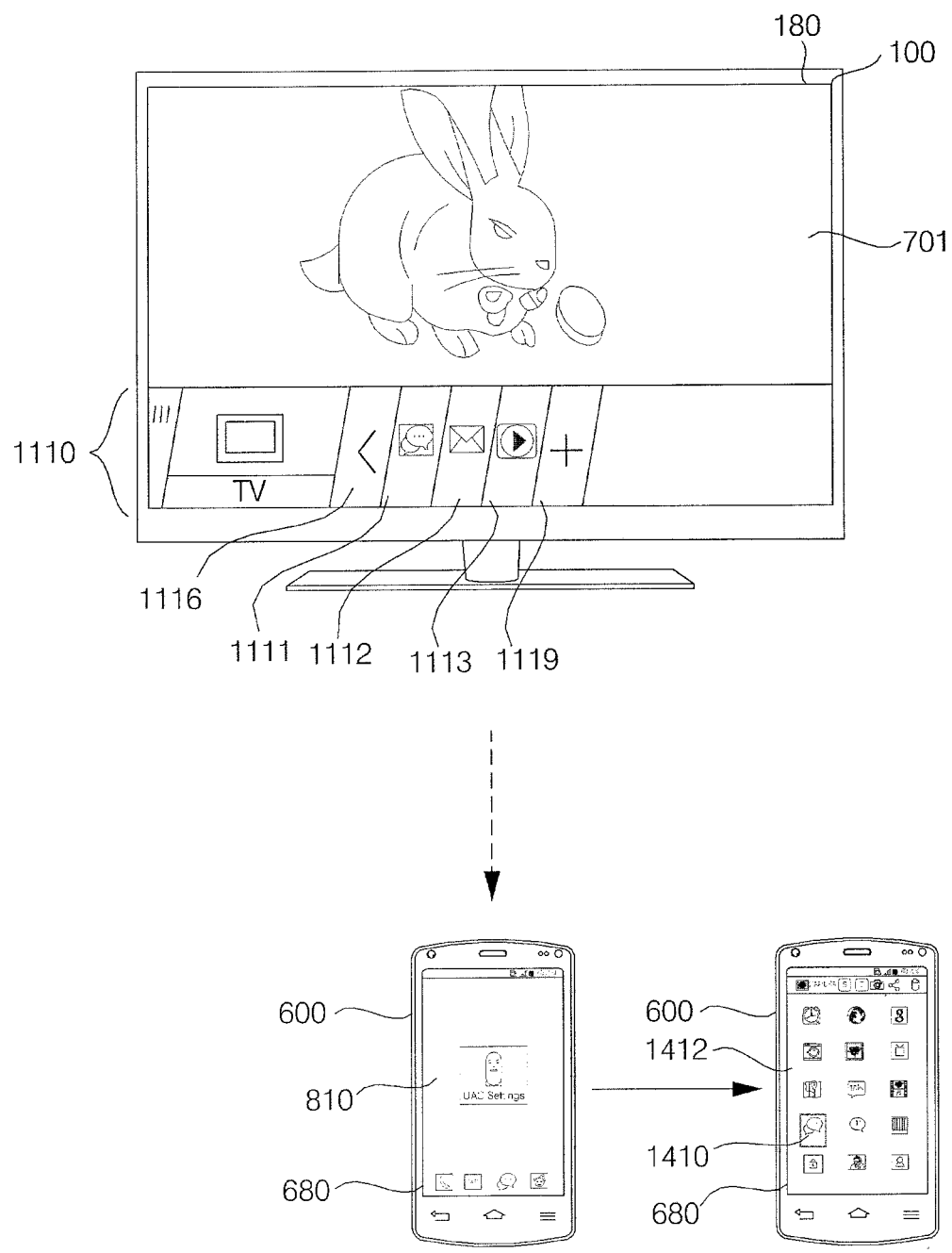
Figure 14C:
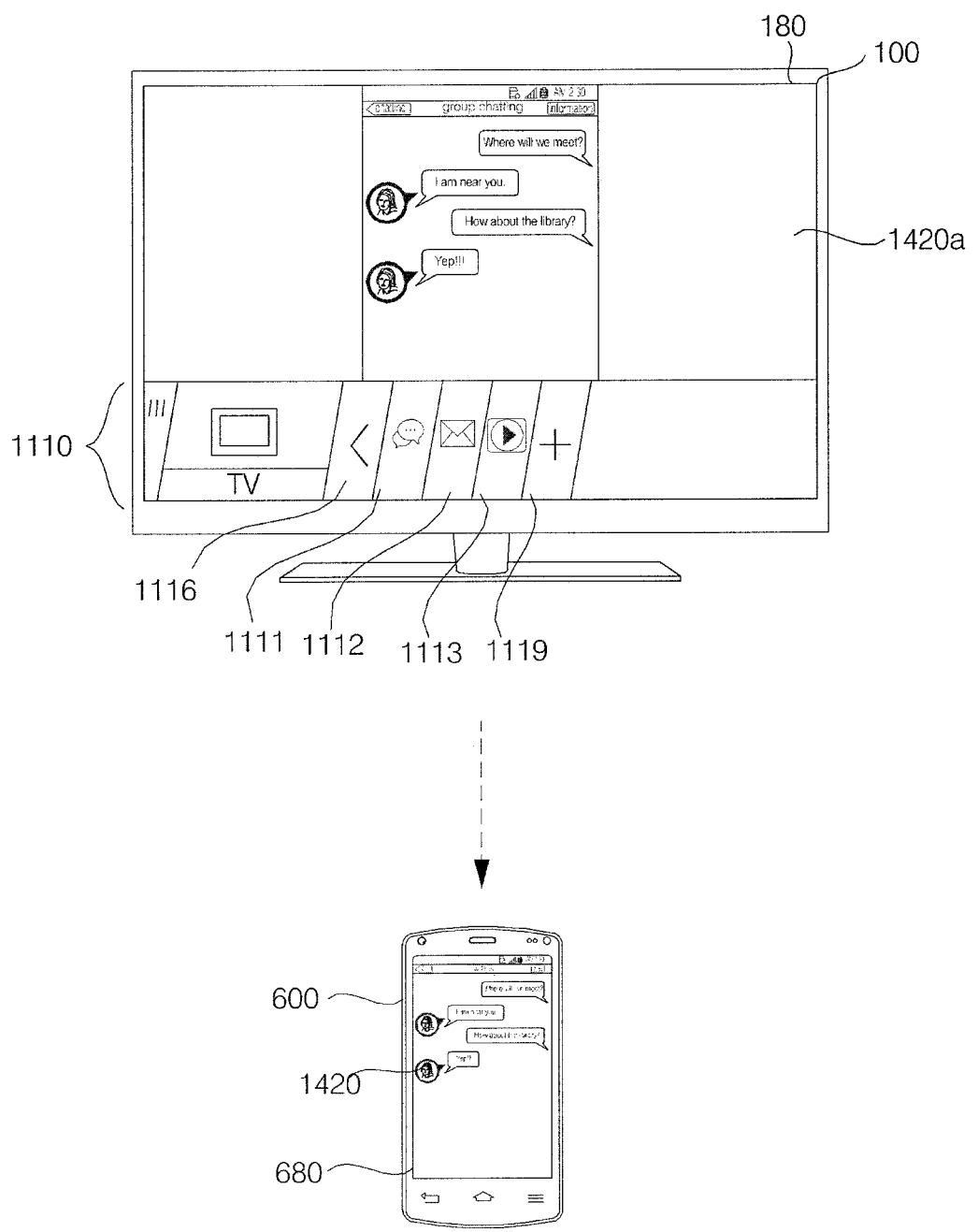

FIGS. 14A to 14C show an example of a case in which a messenger application is selected and mirrored, differently from FIGS. 13A to 13C.

FIG. 14A shows an example of a case in which the messenger application item 11111 is selected among a plurality of mirroring application items in the application list 1110 on the display 180 of the image display apparatus 100.

Accordingly, the controller 170 of the image display apparatus 100 may transmit a pairing request signal Spai to the mobile terminal 600 on which a home image or the standby image 810 is displayed and may receive a pairing response signal Spar from the mobile terminal 600.

The controller 170 of the image display apparatus 100 may perform control to additionally transmit information on the selected application item to the mobile terminal 600 as well as the pairing request signal Spai as shown in FIG. 14B.

The mobile terminal 600 on which a home image or the standby image 810 is displayed may perform control to convert a standby image of the mobile terminal 600 into a home image 1410 or to convert the first home image into a second home image 1410 in which the selected application item is positioned, based on the received information on the application item, as shown in FIG. 14B.

Then, when a messenger application item 1412 is selected from the home image 1410 of FIG. 14B, the controller 670 of the mobile terminal 600 may execute a corresponding application and may display the executed application image 1420 on the display 680, a shown in FIG. 14C.

The controller 670 of the mobile terminal 600 may perform control to transmit an image corresponding to the executed application image 1420 to the image display apparatus 100 in a mirroring mode.

Accordingly, an image 1420a corresponding to the executed application may be displayed on the display 180 of the image display apparatus 100. Accordingly, mirroring between the image display apparatus 100 and the mobile terminal 600 may be easily performed.

In a state in which the image display apparatus 100 and the mobile terminal 600 access each other via pairing, an application as a mirror target may be selected via manipulation of the image display apparatus 100 or the mobile terminal 600.

When the image display apparatus 100 and the mobile terminal 600 access each other via pairing, if the image display apparatus 100 first transmits a pairing signal, the possibility that an application as a mirror target is selected via manipulation of the image display apparatus 100 is high and, thus, the controller 670 of the mobile terminal 600 may perform control the display 680 not to enter a lock screen image for pairing access.

However, the controller 670 of the mobile terminal 600 may perform to reduce brightness, etc. of the display 680 to reduce power consumption until an application as a mirror target is selected by the image display apparatus 100 after pairing, as shown in FIG. 14B.

FIG. 14D shows an example of a case in which an image 810b with first brightness is displayed at a first time before a mirror target is selected by the image display apparatus 100 after pairing and an image 810a with second brightness lower than the first brightness is displayed at a second time after the first time.

Figure 14E:
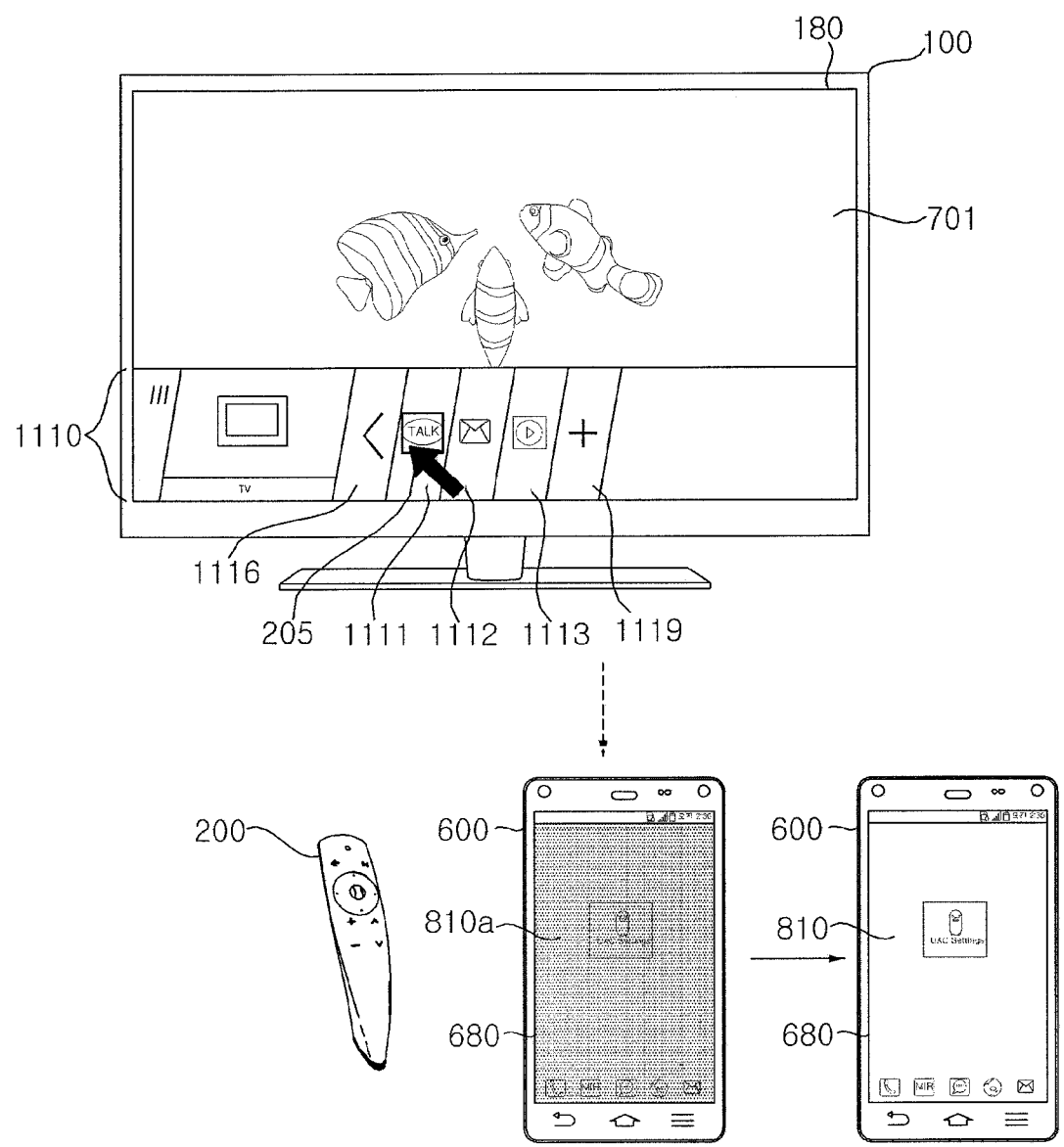

As shown in FIG. 14E, when the messenger application item 11111 is selected using the pointer 205 displayed based on a pointing signal of the remote controller 200, upon receiving information on the selected application item, the controller 670 of the mobile terminal 600 may perform control to convert the information into an image 1410 as shown in FIG. 14B while changing the information to the image 810 with third brightness higher than the image 810a with second brightness.

Differently from the above case, the controller 670 of the mobile terminal 600 may perform control to convert the image 810a with the second brightness into the image 1410 without display of the image 810 with the third brightness, as shown in FIG. 14B.

Figure 15:
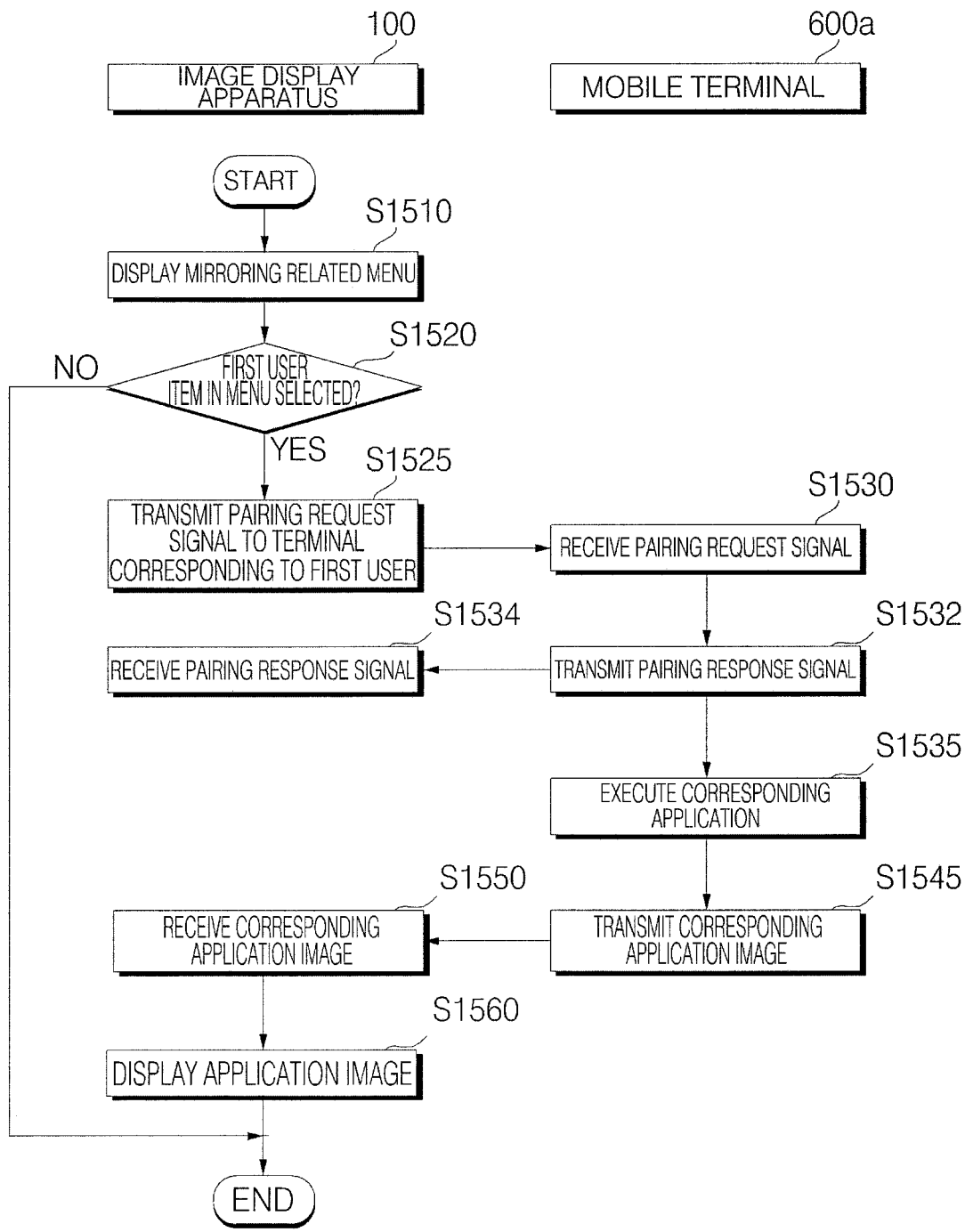
FIG. 15 is a flowchart showing an example of an operation method of a image display apparatus and a mobile terminal according to another embodiment of the present invention.

FIG. 15 is a flowchart showing an example of an operation method of the image display apparatus 100 and a mobile terminal according to another embodiment of the present invention. FIGS. 16A to 20F are diagrams for explanation of the operation method of FIG. 15.

First, referring to FIG. 15, the controller 170 of the image display apparatus 100 may perform control to display a mirroring related menu based on user input (S1510).

For example, as shown in FIG. 7A, in a state in which the broadcast image 700 is displayed, when a home key, an application execution key, or the like is operated, the application list 710 may be displayed on a lower part of a screen, as shown in FIG. 7B. In this case, the application list may include a plurality of application items, in particular, the mirroring application item 715a or 715b shown in FIG. 7B or 7C.

When the mirroring application item 715a or 715b is selected by the pointer 205 based on a pointing signal of the remote controller 200, the mirroring related menu 717 may be displayed to be spread in a right direction, similarly to a pull-down menu.

Then, when a first user item is selected by the pointer 205, etc. based on a pointing signal of the remote controller 200 in the mirroring related menu (S1520), the controller 170 of the image display apparatus 100 may perform control to transmit a pairing request signal to a mobile terminal 600a corresponding to a first user (S1525).

In response thereto, the controller 670 of the mobile terminal 600a corresponding to the first user may receive the pairing request signal (S1530) and may perform control to transmit the pairing response signal (S1532).

In response thereto, the controller 170 of the image display apparatus 100 may receive the pairing response signal (S1534). Based thereon, the controller 170 of the image display apparatus 100 may access the mobile terminal 600a of the first user and may perform control to maintain access to the mobile terminal 600a of the first user.

The controller 170 of the image display apparatus 100 may perform control to additionally transmit information on the selected application item as well as the pairing request signal to the mobile terminal 600a of the first user.

Accordingly, the controller 670 of the mobile terminal 600a of the first user may receive information on the selected application item and may perform control to execute a corresponding application in the mobile terminal 600a of the first user based on the received information on the application item (S1535).

Then, the controller 670 of the mobile terminal 600a of the first user may perform control to transmit an image of the executed application to the image display apparatus 100 (S1545).

In response thereto, the controller 170 of the image display apparatus 100 may receive an image of an executed application through the interface unit 130 or 135 (S1550) and may perform control to display the received image of the executed application (S1560).

Figure 16A:
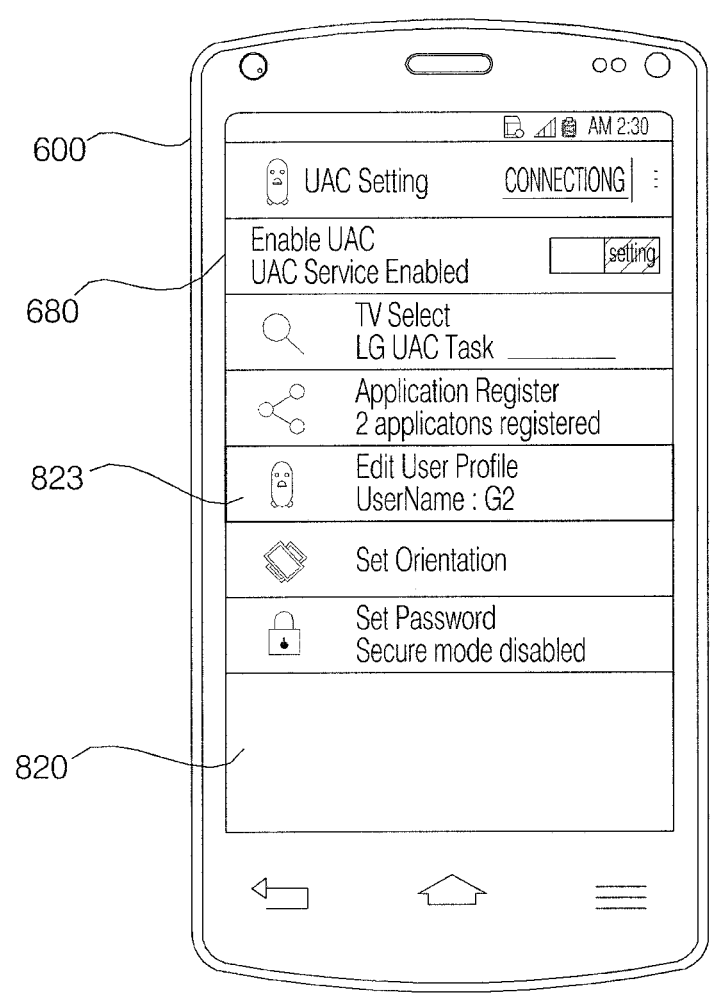
FIGS. 16A to 20F are diagrams for explanation of the operation method of FIG. 15.

FIG. 16A shows an example of a case in which the user information edit item 823 is selected in a state in which the mirroring setting application image 820 is displayed on the mobile terminal 600.

Figure 16B:
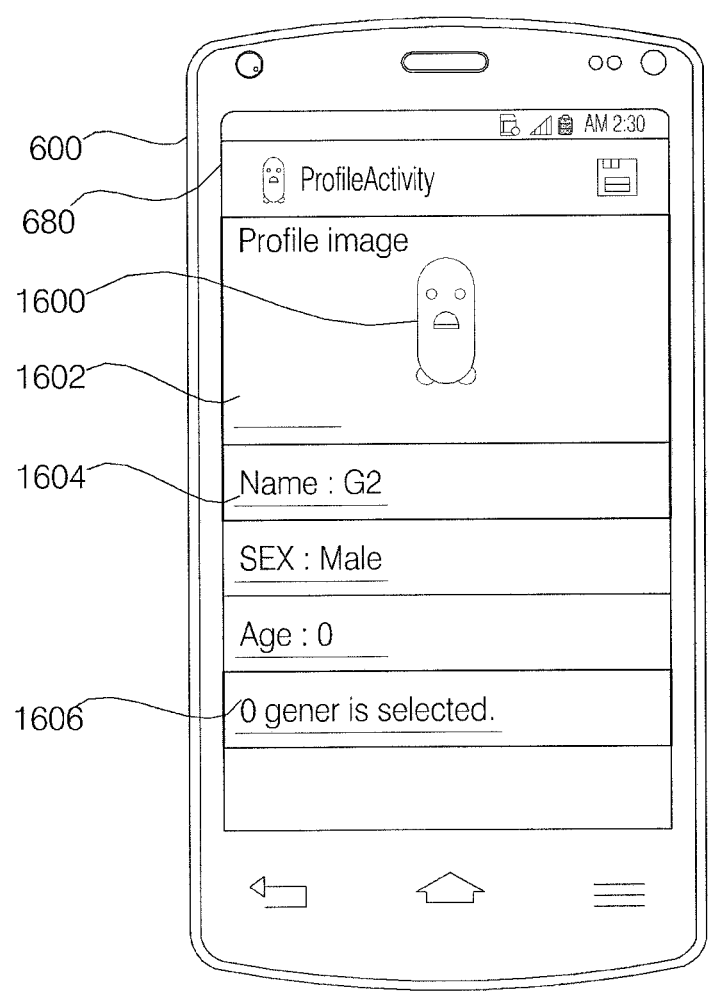

Accordingly, the controller 670 of the mobile terminal 600 may perform control to display a user information setting image 1600, as shown in FIG. 16B.

The user information setting image 1600 may include a profile image item 1602, a title item 1604, a genre item 1606, and so on.

Figure 16C:
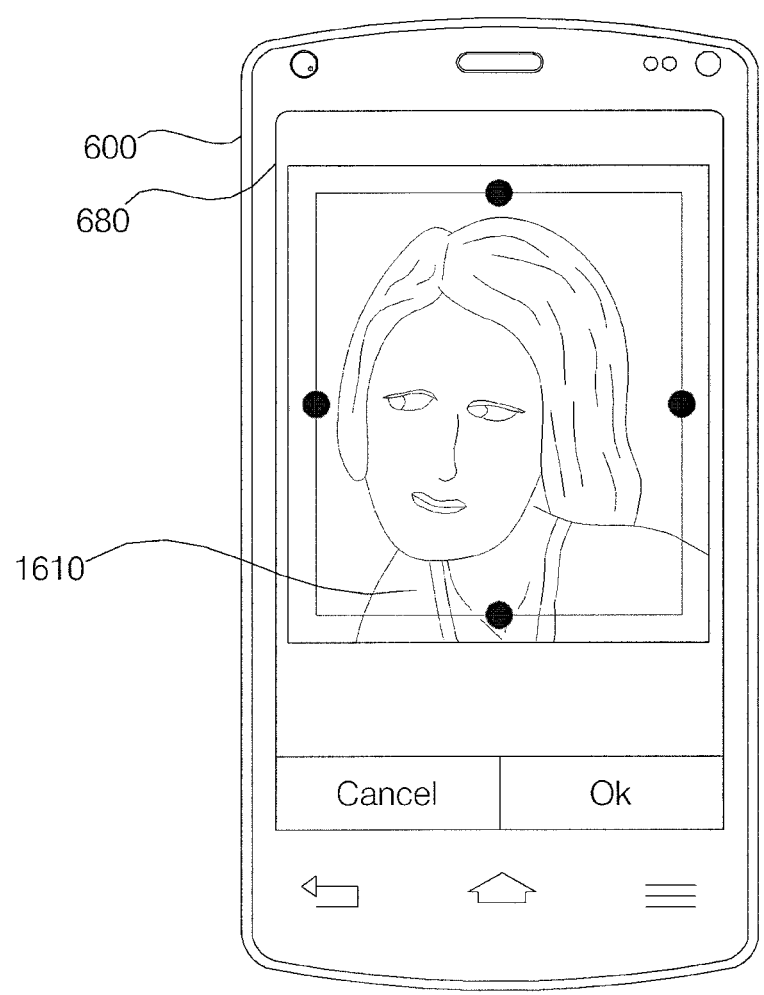

When the profile image item 1602 is selected, the controller 670 of the mobile terminal 600 may activate the camera 621 and may perform control to capture a face image of a user. As shown in FIG. 16C, the controller 670 of the mobile terminal 600 may perform control to display an image 1610 for editing the captured image.

Figure 16D:
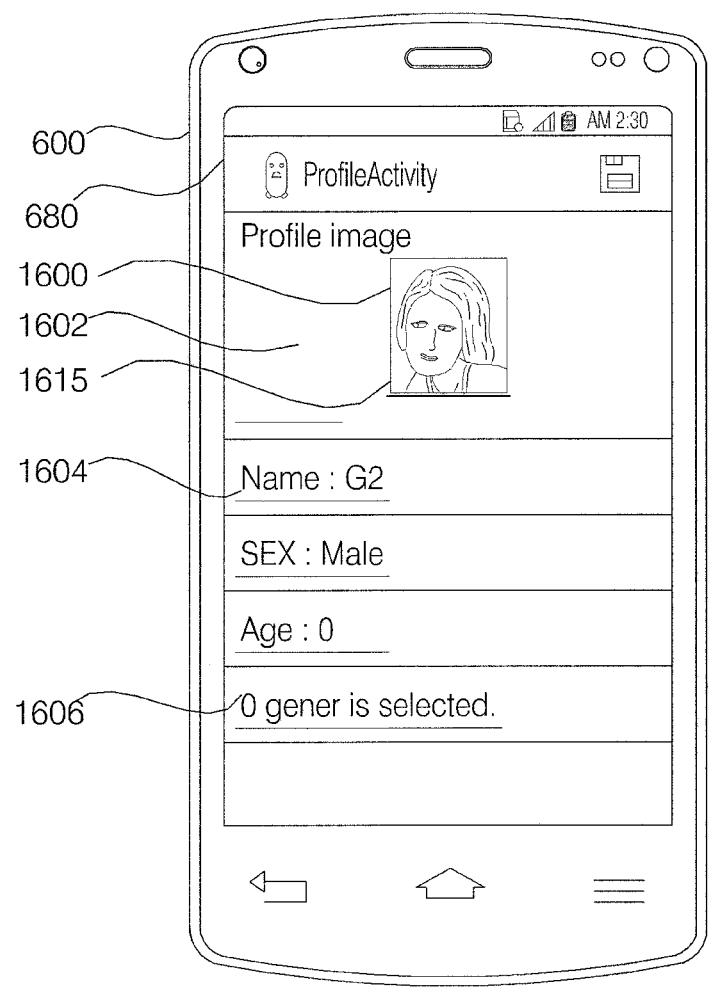

When editing is completed, the controller 670 of the mobile terminal 600 may perform control to position an edited user image 1615 in the profile image item 1602, as shown in FIG. 16D.

Figure 16E:
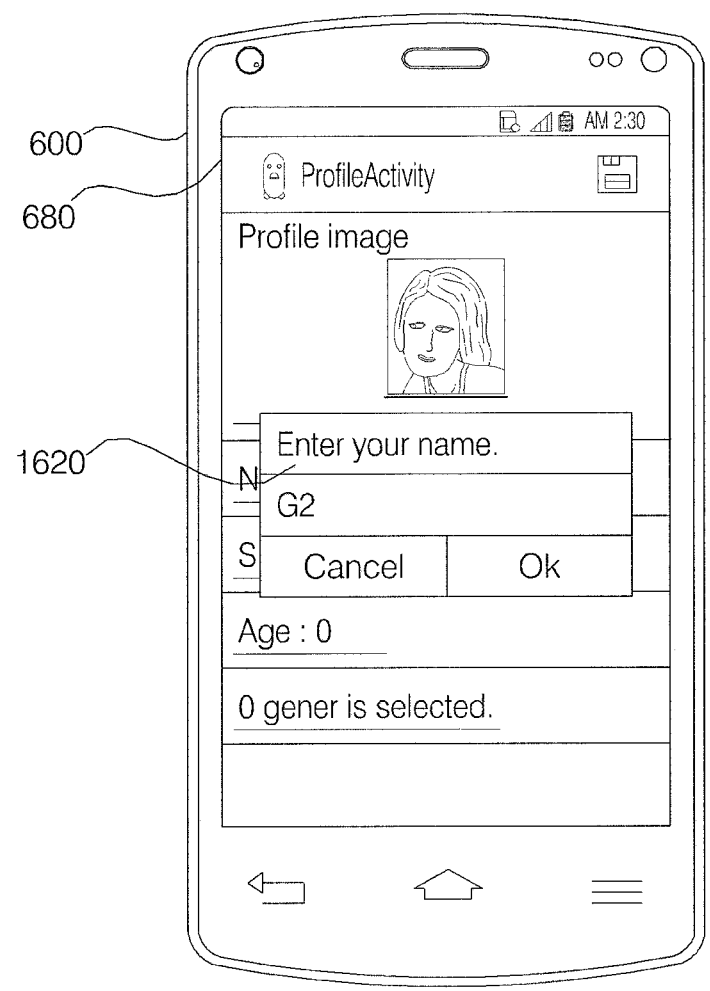

Then, when the title item 1604 in the user information setting image 1600 is selected, the controller 670 of the mobile terminal 600 may perform control to display a title input window 1620, as shown in FIG. 16E.

Figure 16F:
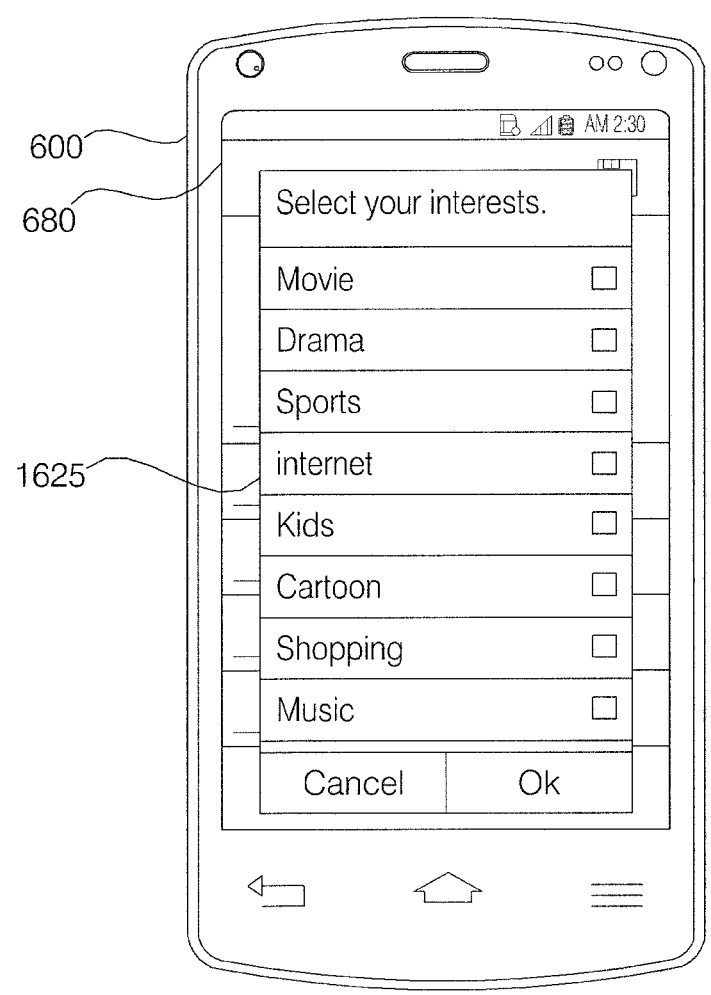

When the genre item 1606 in the user information setting image 1600 is selected, the controller 670 of the mobile terminal 600 may perform control to display a genre setting window 1625, as shown in FIG. 16F.

When user information setting is completely performed in the user information setting image 1600, the controller 670 of the mobile terminal 600 may perform control to transmit application information as a mirroring target as well as the set user information to the image display apparatus 100.

Accordingly, the controller 170 of the image display apparatus 100 may receive application information as a mirroring target as well as the set user information through the interface unit 130 or 135 and may perform control to add a user item to an application list.

Figure 17A:
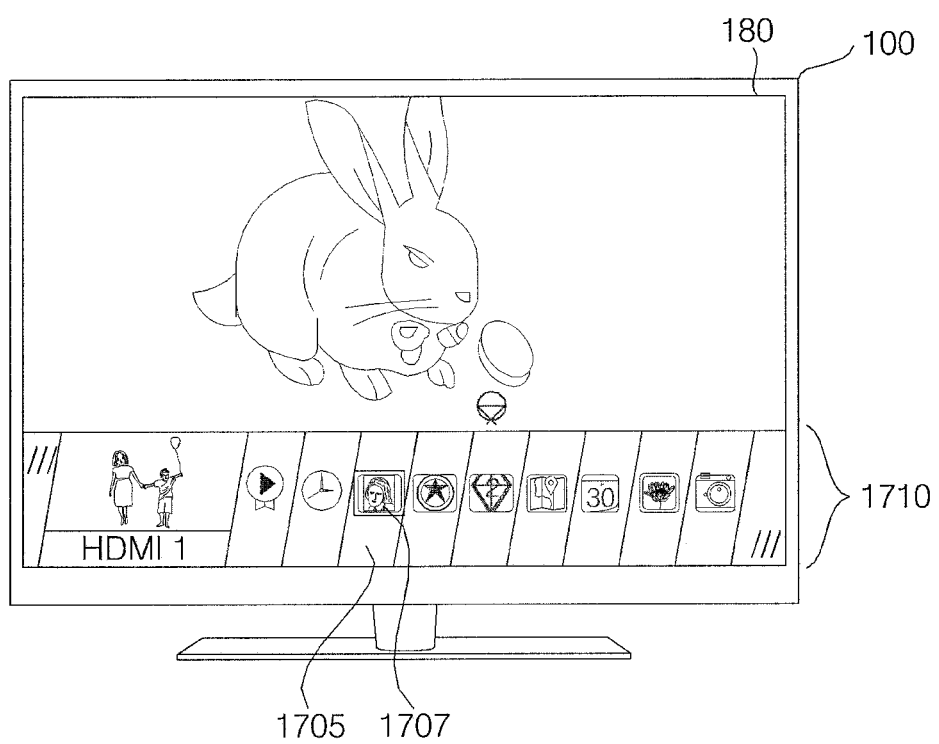

FIG. 17A shows an example of a case in which a plurality of application items and a first user item 1705 for mirroring are displayed in an application list 1710.

The controller 170 of the image display apparatus 100 may perform control to display a user image 1707 included in the received user information to overlap on the first user item to differentiate from other items of the first user item 1705. Accordingly, the first user item 1705 may be intuitively recognized.

Figure 17B:
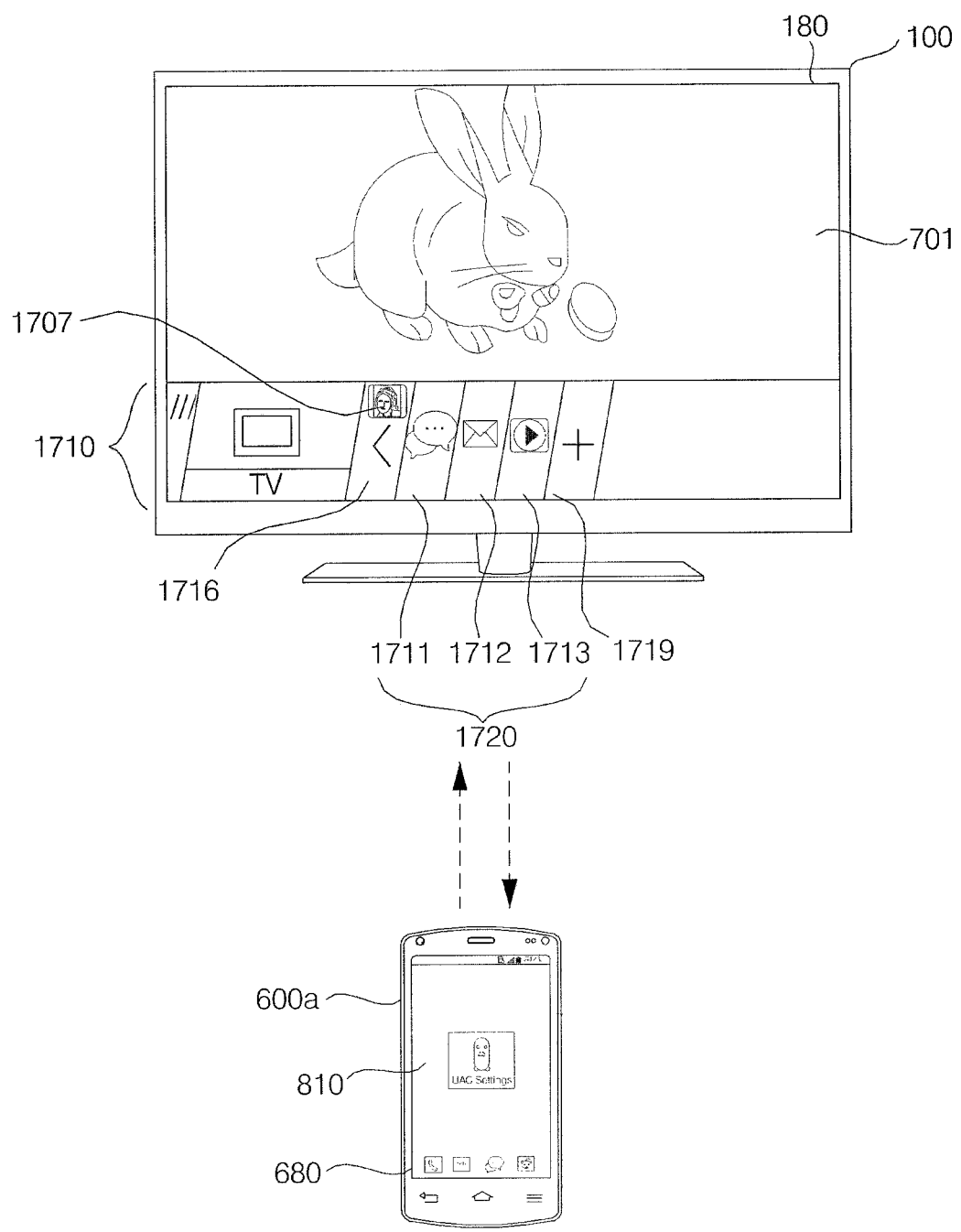

When the first user item 1705 in the application list 1710 is selected, the controller 170 of the image display apparatus 100 may perform control to display a first user related menu 1720 while the first user item 1705 is spread, as shown in FIG. 17B.

The first user related menu 1720 may include a plurality of application items 1711, 1712, and 1713, a restoration item 1716, and an added item 1719, which are set in the mobile terminal 600a of the first user.

Thereamong, when a player item 1713 for multimedia data reproduction is selected, the controller 170 of the image display apparatus 100 may transmit a pairing request signal Spai to the mobile terminal 600a of the first user, on which a home image or the standby image 810 is displayed, and may receive a pairing response signal Spar from the mobile terminal 600.

Figure 17C:
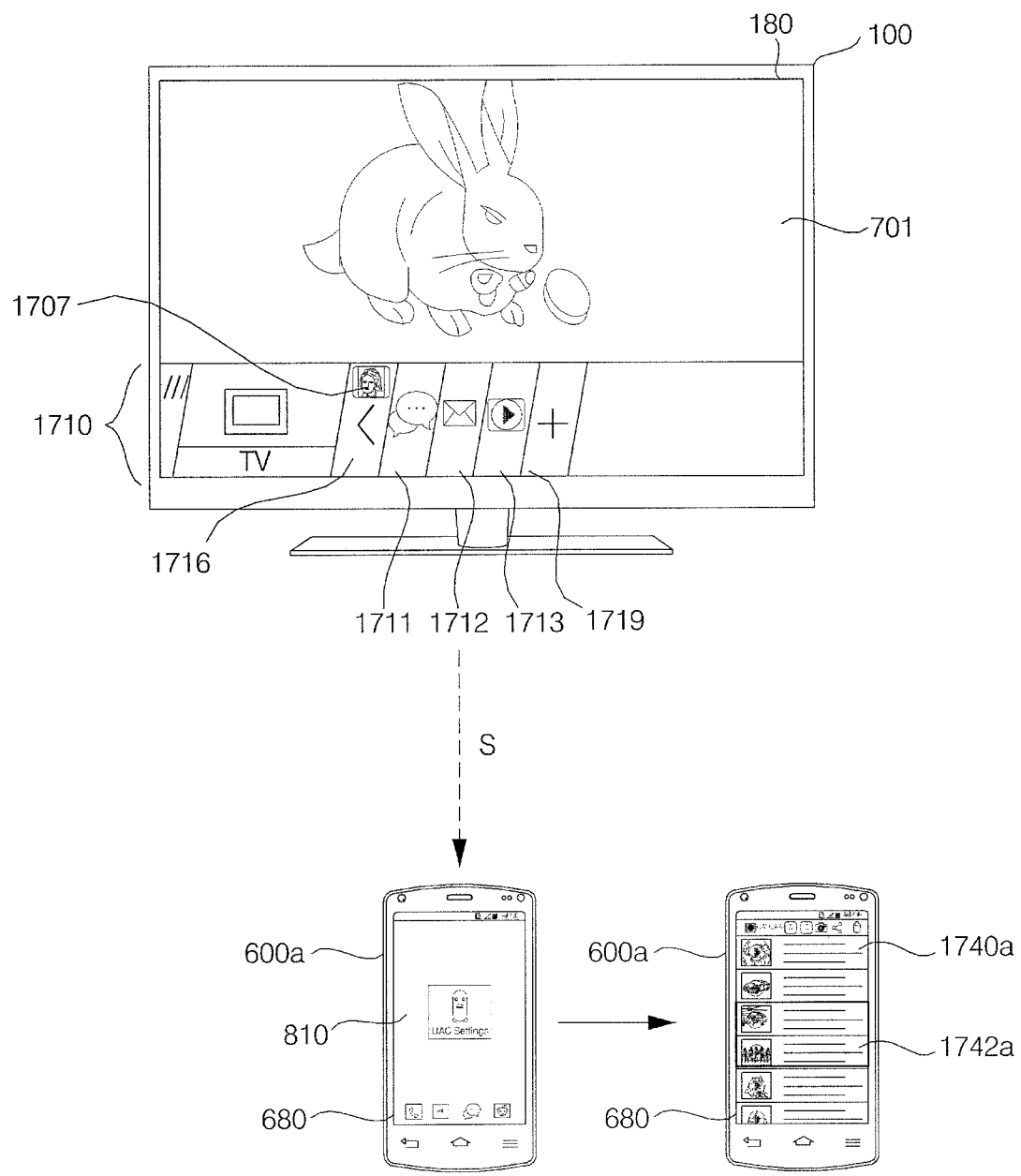

The controller 170 of the image display apparatus 100 may perform control to additionally transmit information "S" on the selected application item as well as the pairing request signal Spai to the mobile terminal 600a of the first user, as shown in FIG. 17C.

The mobile terminal 600a of the first user, on which a home image or the standby image 810 is displayed, may execute a corresponding application in the mobile terminal 600a of the first user based on the received information "S" of the application item and may display an executed application image 1740 on the display 680 as shown in FIG. 17C.

Figure 17D:
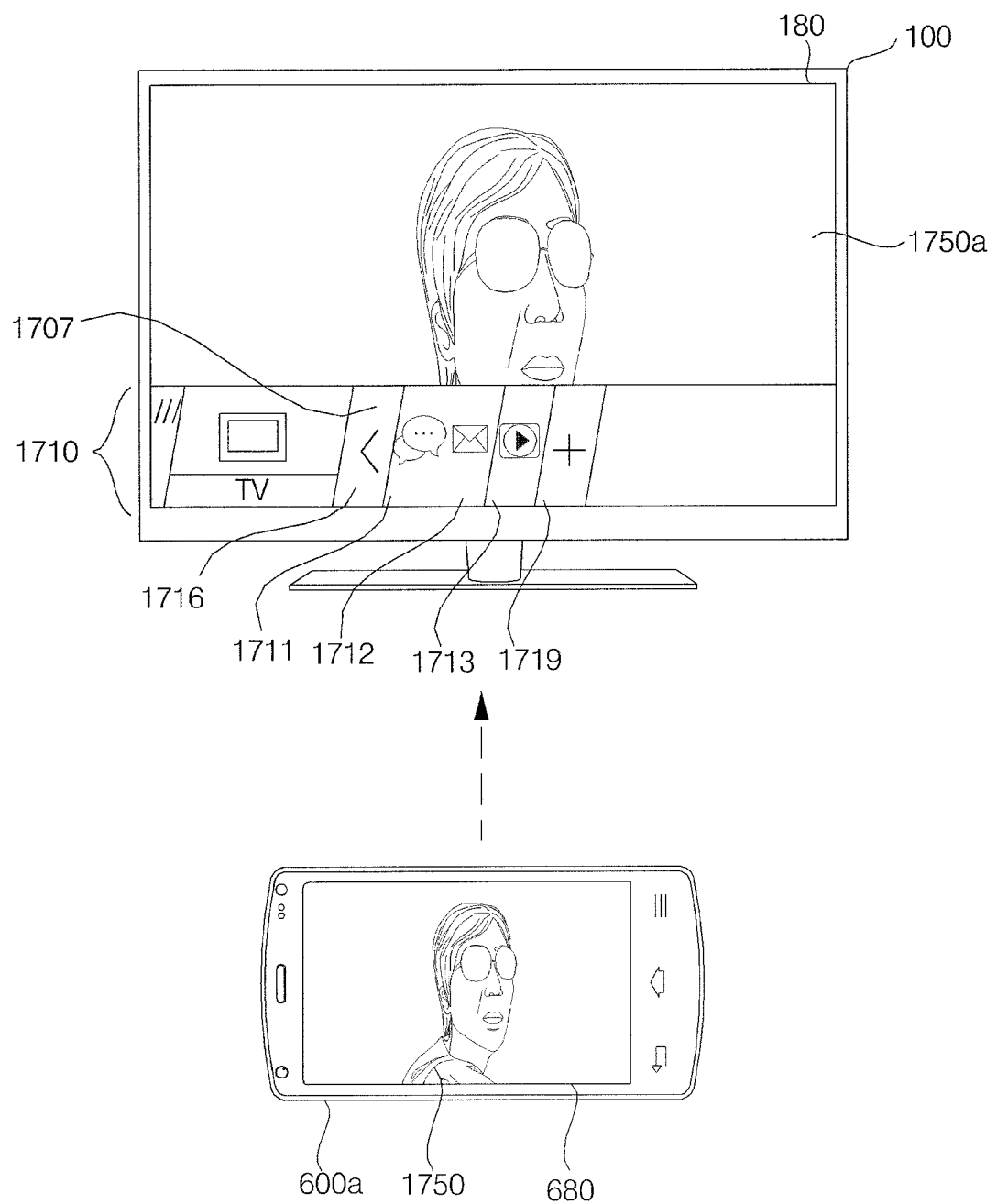

In particular, FIG. 17C illustrates an example of a content list image 1740a among player application images. Thereamong, when any one of pieces of content 1742a is selected, a reproduced image 1750 may be displayed on the display 680 of the mobile terminal 600a of the first user, as shown in FIG. 17D.

In a mirroring mode, an image corresponding to the reproduced image 1750 may be transmitted to the image display apparatus 100 and an image 1750a corresponding to a reproduced image may be displayed on the display 180 of the image display apparatus 100. Accordingly, mirroring between the image display apparatus 100 and the mobile terminal 600 may be easily performed.

Figure 18A:
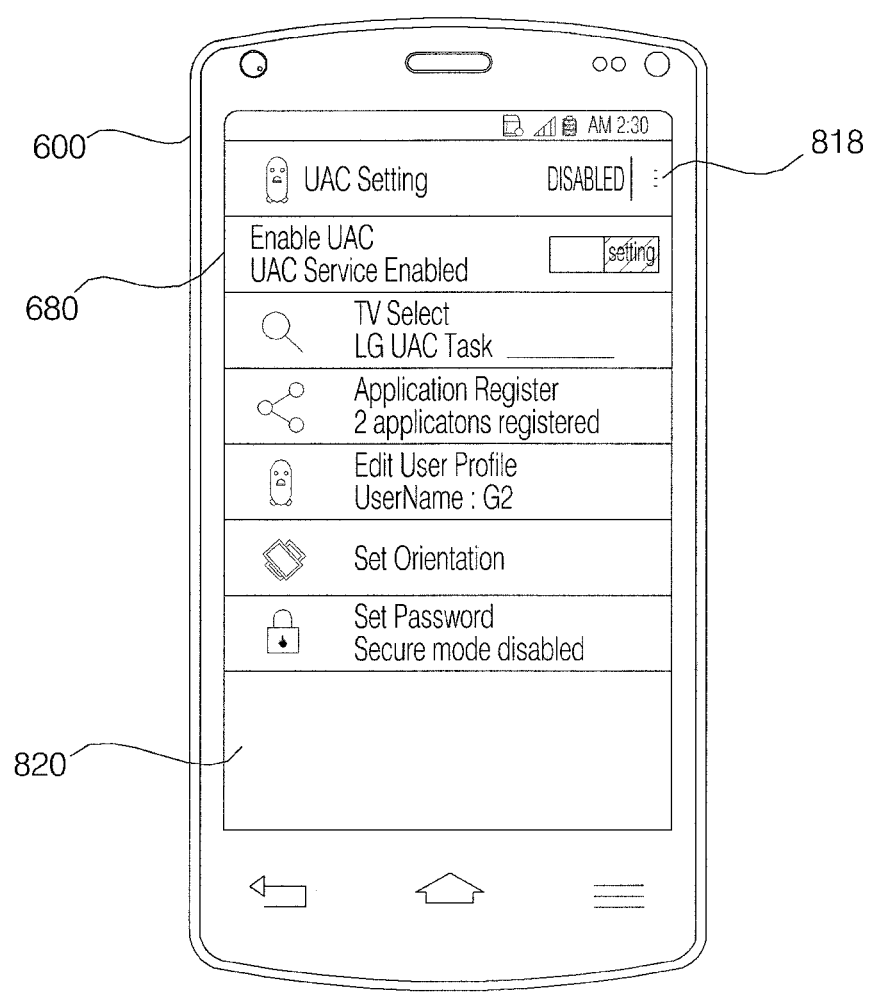

FIG. 18A illustrates an example of a case in which an additional setting item 818 is selected from the mirroring setting application image 820 displayed on the mobile terminal 600.

Figure 18B:
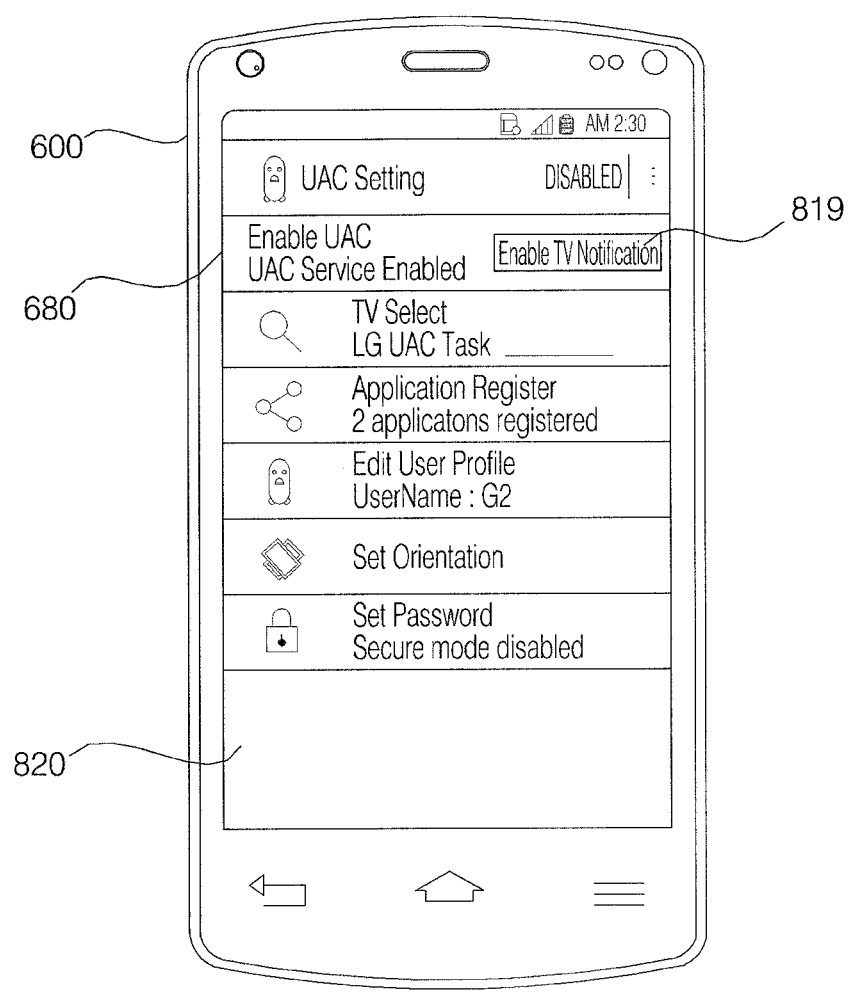

Accordingly, the controller 670 of the mobile terminal 600 may perform control to display a TV notification item 819, as shown in FIG. 18B.

Figure 18C:
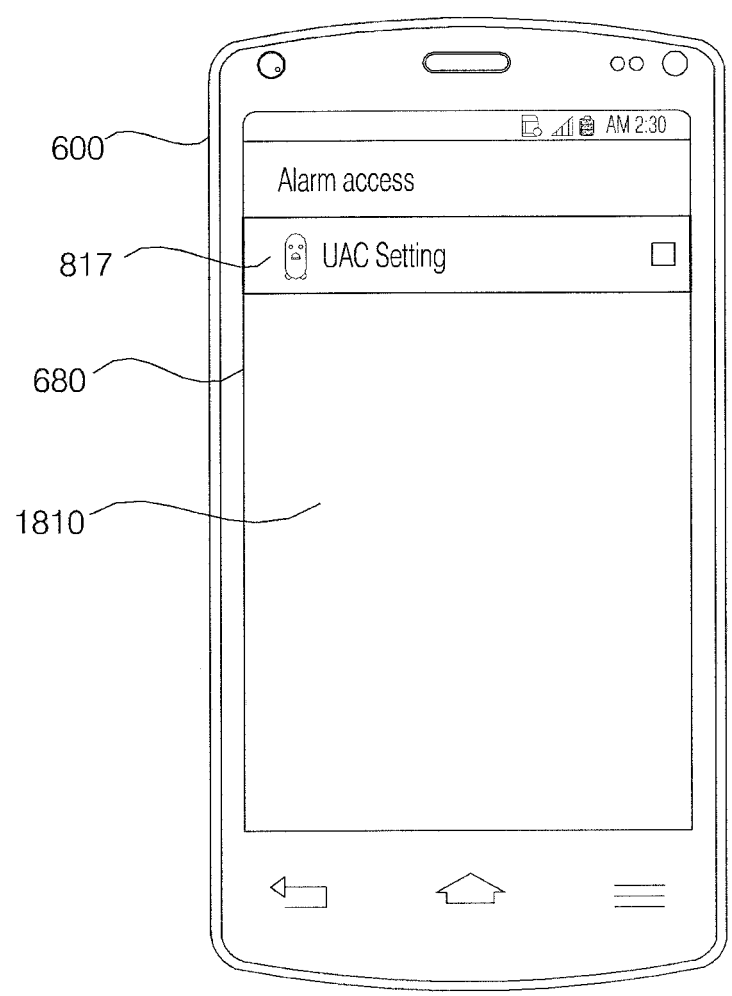
Figure 18D:
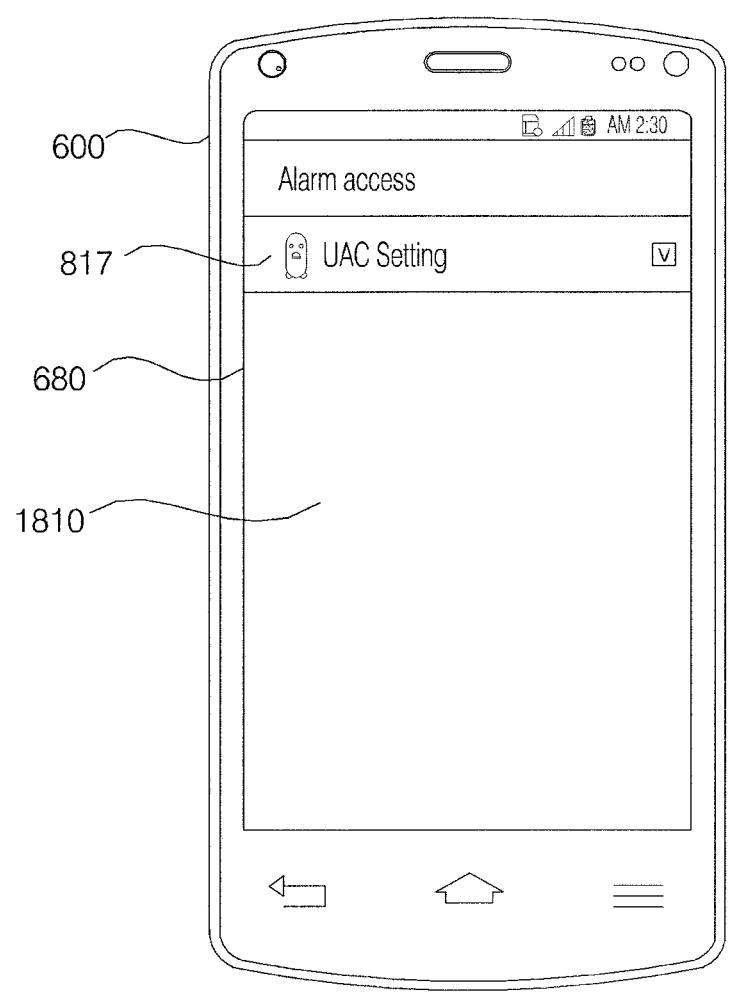

When the TV notification item 819 is selected, an image 1810 including a notification setting item 817 may be displayed as shown in FIG. 18C and, when the notification setting item 817 is selected, notification setting may be completed as shown in FIG. 18D.

Accordingly, upon receiving a notification message from a mirroring application installed in a mobile terminal, from an external server or the like, the controller 670 of the mobile terminal 600 may perform control to forward the notification message to the image display apparatus 100.

Figure 18E:
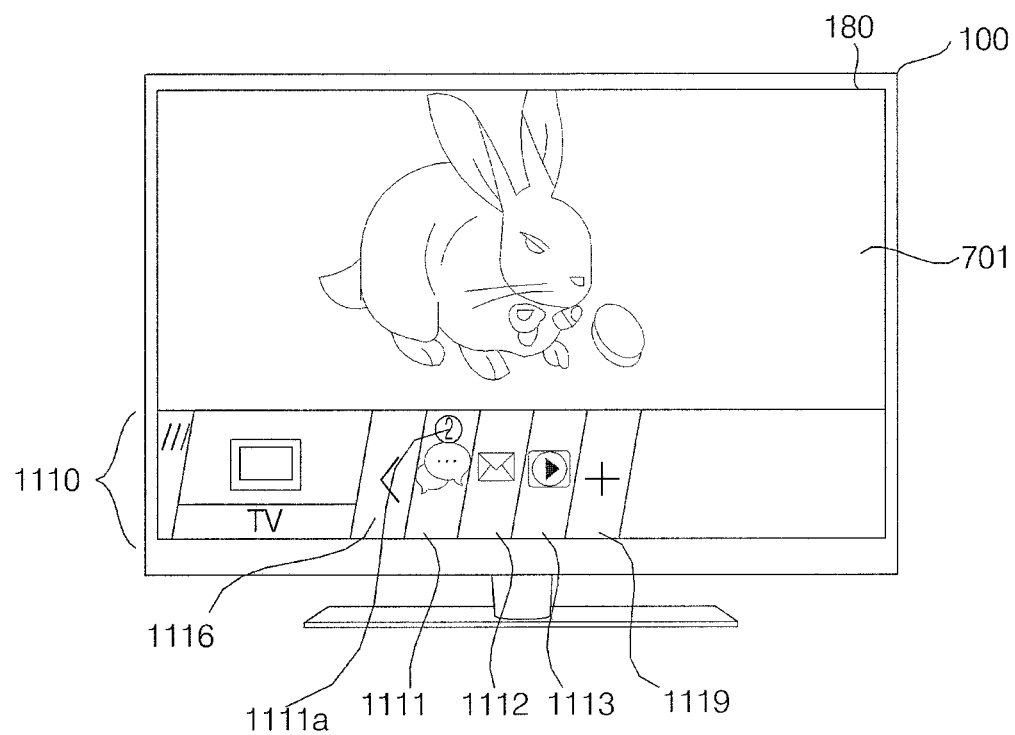

That is, as shown in FIG. 18E, a notification message from a messenger application may be received by the image display apparatus 100 from the mobile terminal 600 and, accordingly, the controller 170 of the image display apparatus 100 may perform control to additionally display a notification message 1111a in the displayed mirroring application item 1111. Accordingly, the notification message may also be frequently checked in the image display apparatus 100.

Figure 19A:
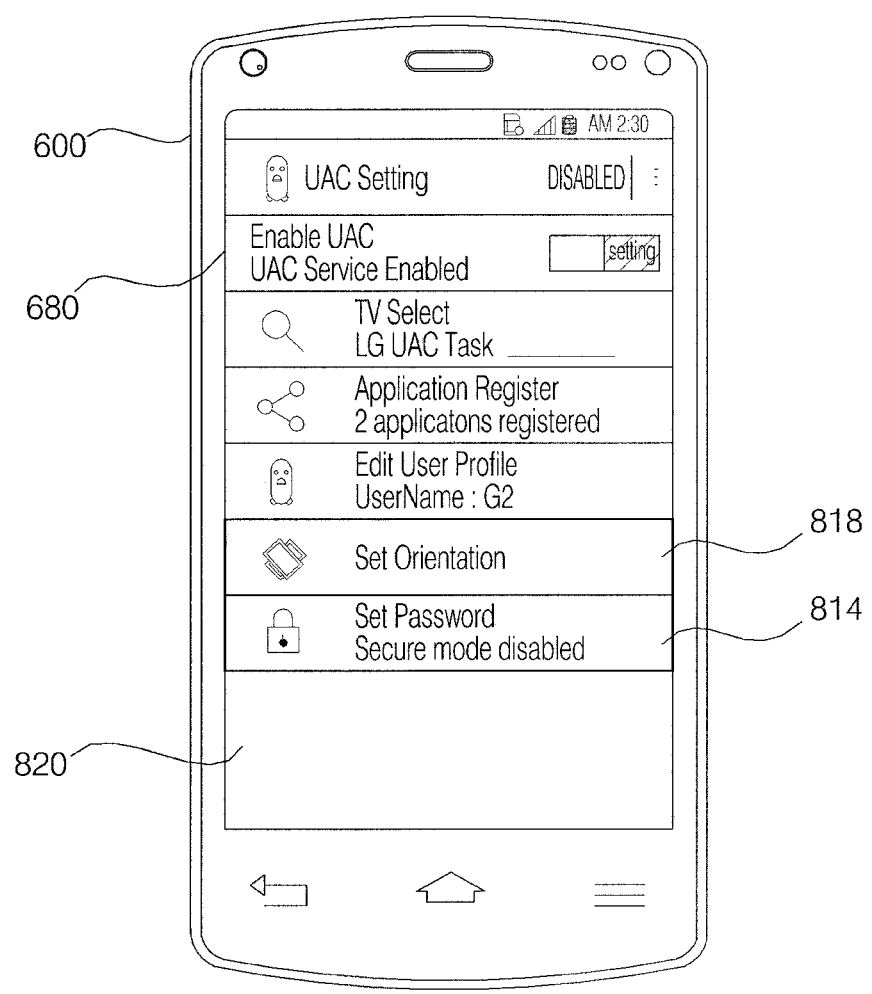

FIG. 19A shows an example of a case in which the horizontal and vertical view setting item 813 is selected from the mirroring setting application image 820 displayed on the mobile terminal 600.

Figure 19B:
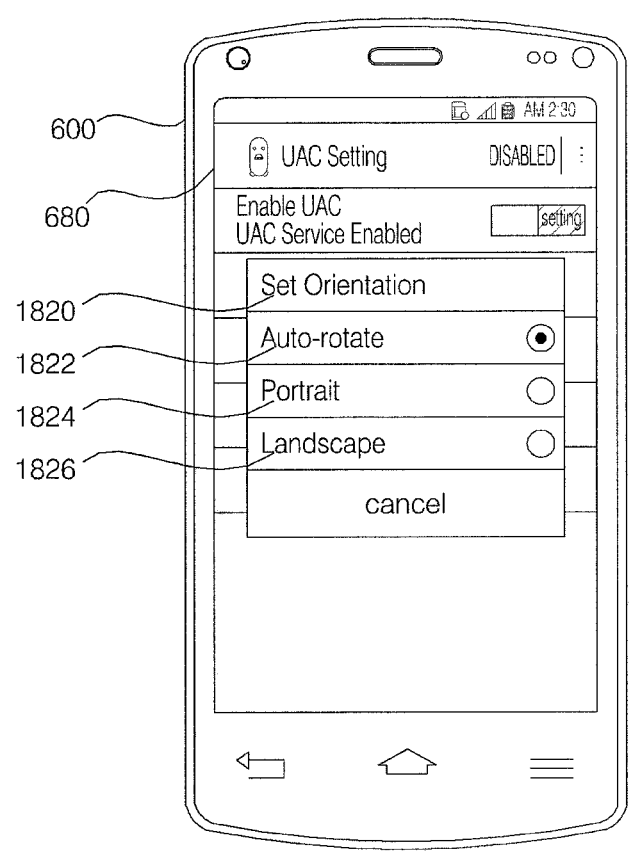

Accordingly, the controller 670 of the mobile terminal 600 may perform control to display a horizontal and vertical view setting window 1820, as shown in FIG. 19B.

The horizontal and vertical view setting window 1820 may include an automatic rotation item 1822, a vertical view item 1824, a horizontal view item 1826, and so on. Thereby, according to a predetermined method, an image may be displayed by the image display apparatus 100.

Figure 19C:
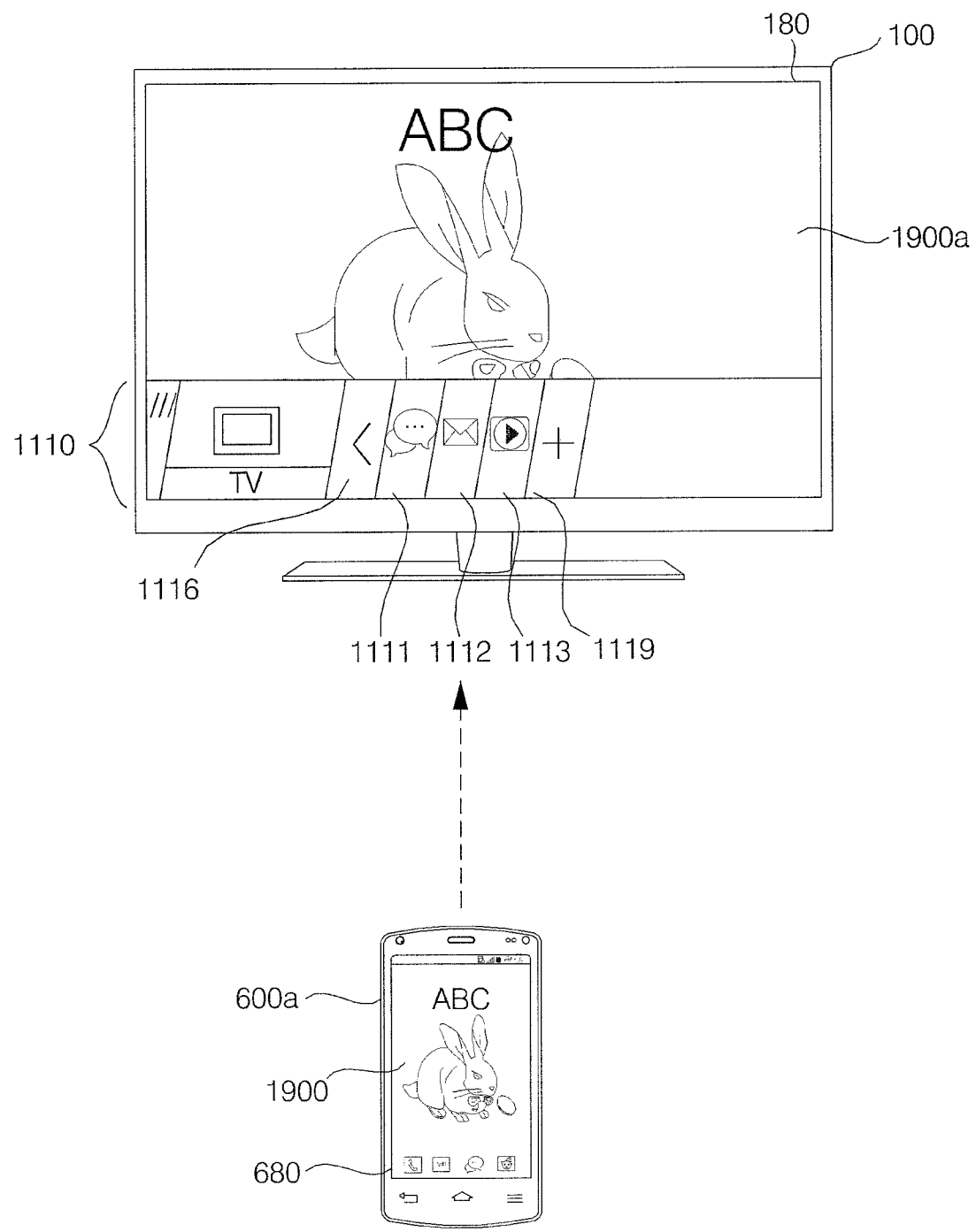

For example, when the horizontal view item 1826 is selected and set, the controller 170 of the image display apparatus 100 may receive horizontal view item setting information and, accordingly, may perform control to set and display a vertical image 1900 of the mobile terminal 600 as a horizontal image 1900a in the image display apparatus 100, as shown in FIG. 19C.

Figure 20A:
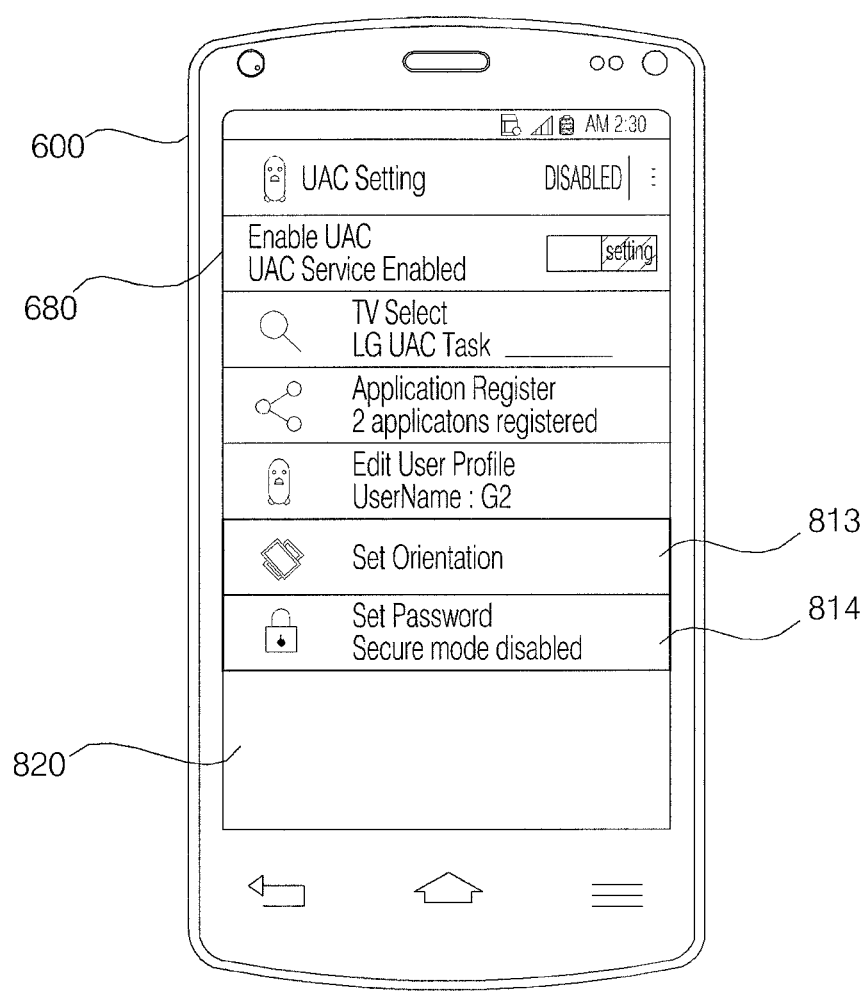

FIG. 20A illustrates an example of a case in which the password item 814 is selected from the mirroring setting application image 820 displayed on the mobile terminal 600.

Figure 20B:
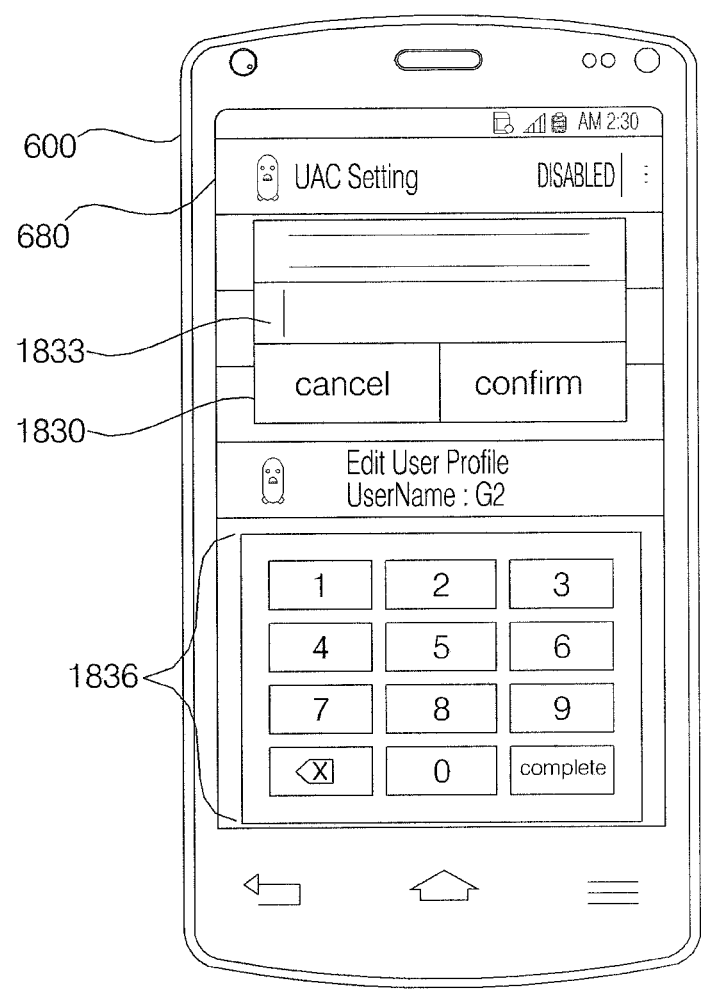

Accordingly, the controller 670 of the mobile terminal 600 may perform control to display a password setting window 1830 and a number input window 1836, as shown in FIG. 20B.

Figure 20C:
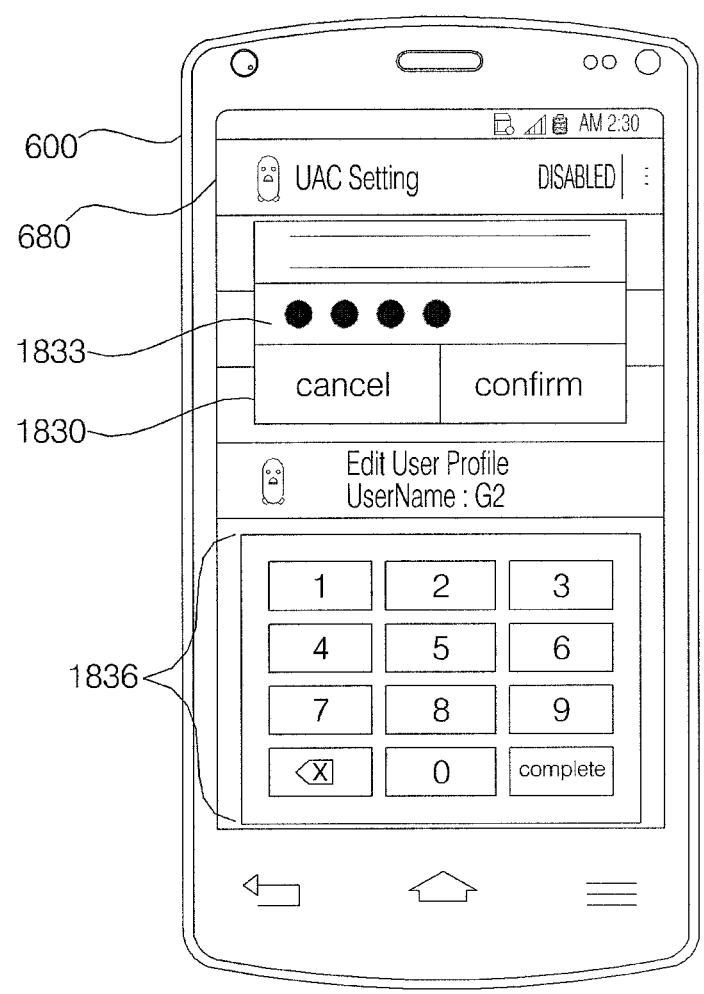
Figure 20D:
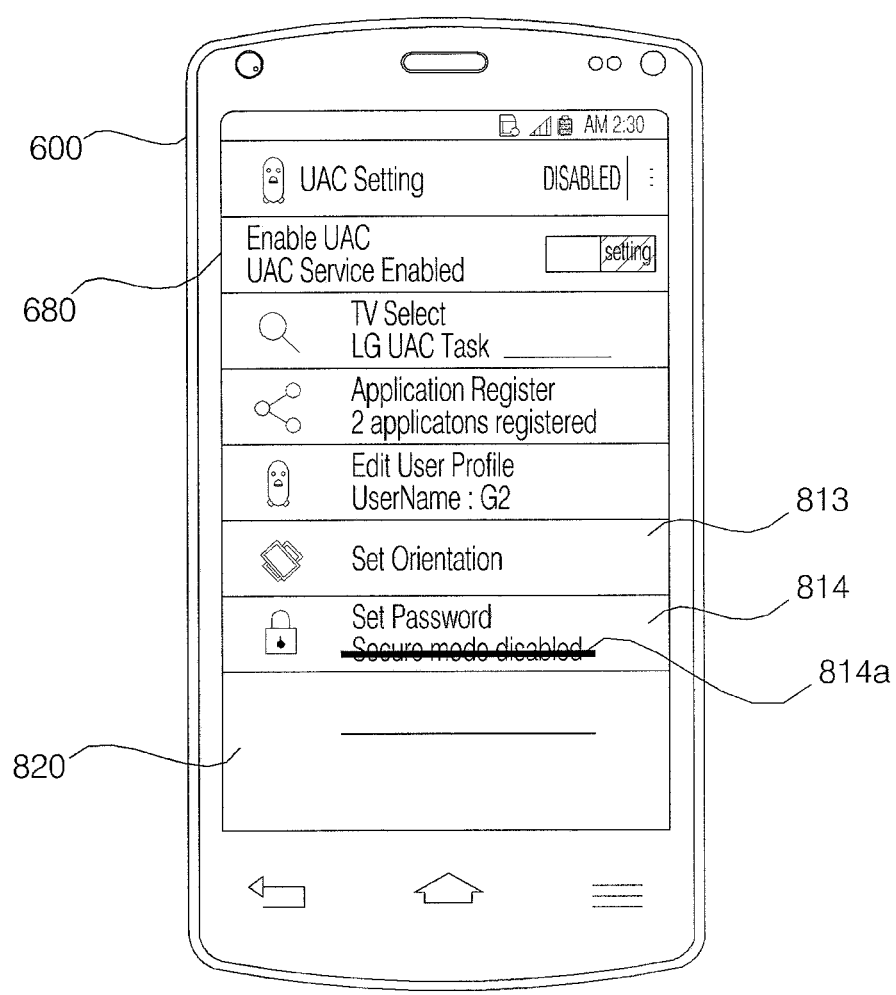

When a predetermined number is completely input as shown in FIG. 20C, the controller 670 of the mobile terminal 600 may perform control to re-display the mirroring setting application image 820 as shown in FIG. 20D.

In this case, the password item 814 may include password setting completion information 814a.

The controller 670 of the mobile terminal 600 may perform control to transmit the set password information to the image display apparatus 100 and the image display apparatus 100 may receive the set password information.

The password information may be used to select a first user item or a specific mirroring application item under a mirroring related menu.

Figure 20E:
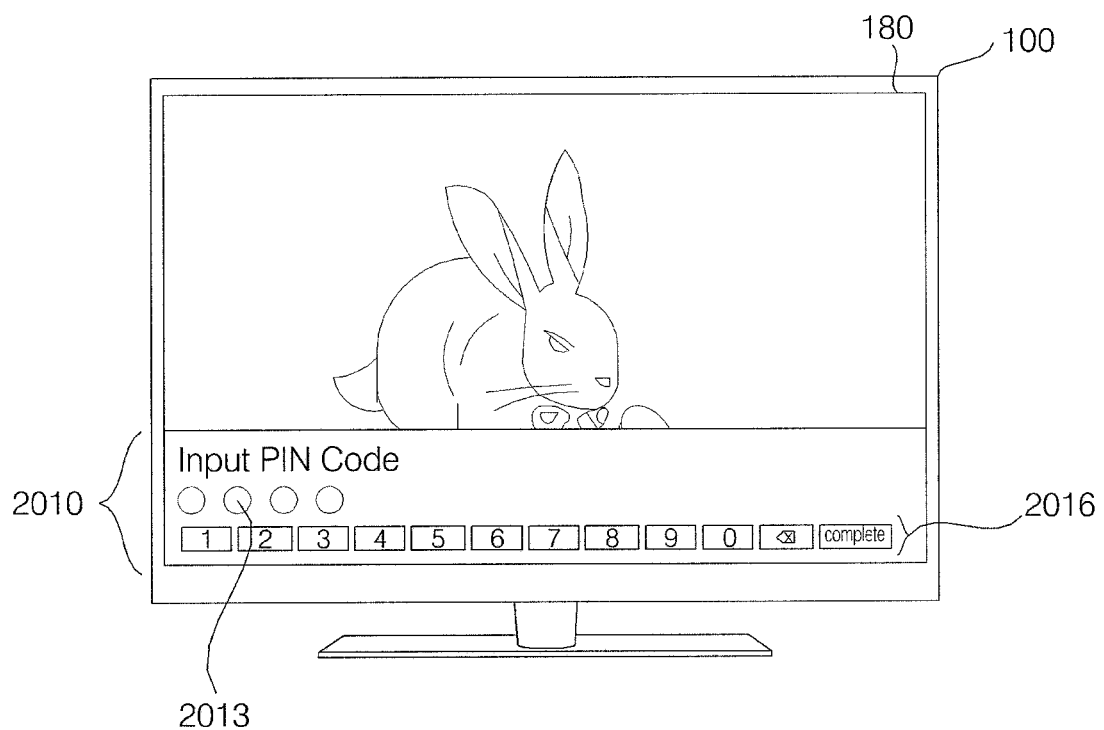

For example, when the first user item 1705 of FIG. 17C is selected, the controller 170 of the image display apparatus 100 may perform control to display a password input window 2010 shown in FIG. 20E without immediately displaying a mirroring application item corresponding to a first user item.

The password input window 2010 may include a display window 2013 and a number input window 2016.

Figure 20F:
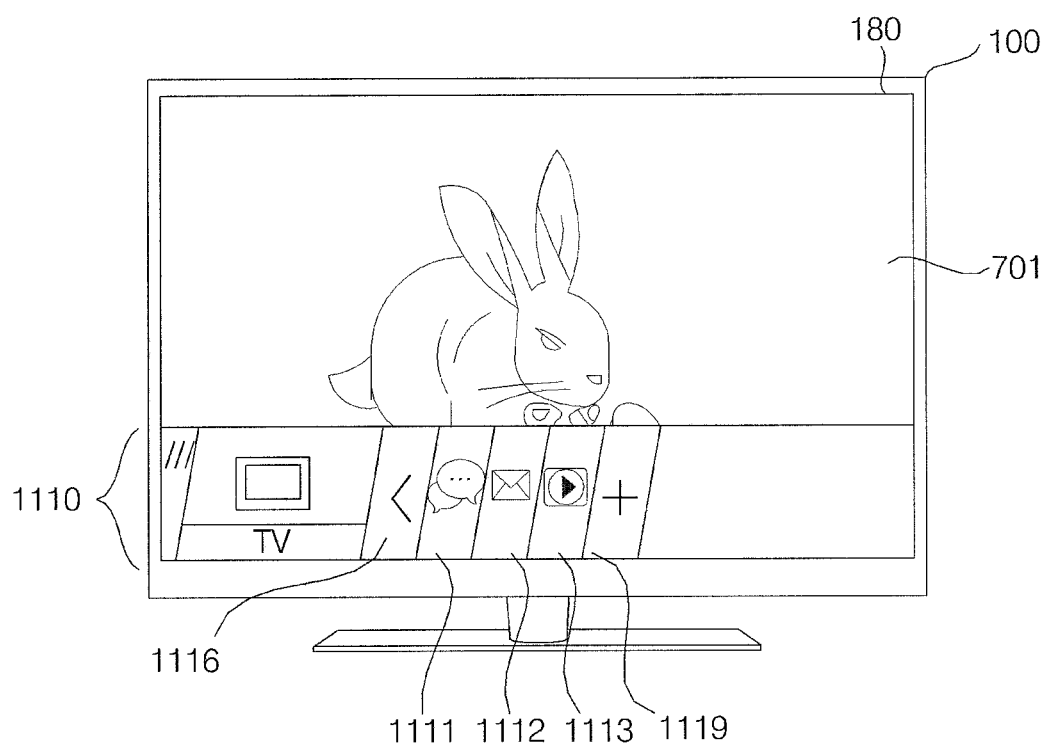

When an input password is matched, the controller 170 of the image display apparatus 100 may perform control to display a plurality of mirroring application items 1111, 1112, and 1113, an additional item 1119, and the like under a mirroring related menu, as shown in FIG. 20F. Thereby, a mirroring mode for only a specific user may be provided.

Password setting may be applied only to a specific application item and, in this case, a mirroring mode for a specific application may also be provided.

The operating method of an image display apparatus or a mobile terminal according to the present invention may also be embodied as processor readable code on a processor readable recording medium in the image display apparatus or the mobile terminal. The processor readable recording medium is any type of recording device that stores processor readable data. Examples of the processor readable recording medium include read-only memory (ROM), random-access memory (RAM), CD-ROMs, magnetic tapes, hard disks, floppy disks, a optical data storage devices, and so on. In addition, the processor readable recording medium may also be distributed over network coupled computer systems so that the processor readable code is stored and executed in a distributed fashion.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention is applicable to an image display apparatus or a mobile terminal and, in particular, to an image display apparatus or a mobile terminal, for easily installing and displaying a mirroring application item from the mobile terminal.

The invention claimed is:
1. An image display apparatus comprising:

a display;

an interface unit to exchange data with a mobile terminal; and a controller to perform control to display a mirroring related menu comprising mirroring related server information or content associated with server information based on user input, to receive a mirroring application item from the mobile terminal through the interface unit, and to perform control to display the received mirroring application item in the mirroring related menu, wherein the controller is configured to access the mobile terminal, wherein when an image data is received from the mobile terminal, the controller is configured to display an image corresponding to a mirroring application execution image of the mobile terminal, wherein the image data corresponds to the mirroring setting application image displayed and transmitted by the mobile terminal, wherein when a first mirroring application item is received from the mobile terminal, the controller is configured to add the first mirroring application item to the mirroring related menu, and display the mirroring related menu including the added first mirroring application item, wherein the first mirroring application item is an item selected in the mirroring setting application image and transmitted by the mobile terminal, and wherein the controller is further configured to:

perform control to transmit a pairing request signal to a first user mobile terminal in response to a first user item in the mirroring related menu being selected, perform control to transmit information on the selected first menu item to the mobile terminal to cause the mobile terminal to display an executed application image, and display a reproduced image corresponding to a reproduced image on the mobile terminal when a piece of content of the executed application image is selected.

2. The image display apparatus according to claim 1, wherein the content associated with the server information comprises a code image comprising the server information.

3. The image display apparatus according to claim 1, wherein, in response to an item of a first mirroring application being selected among mirroring application items displayed in the mirroring related menu, the controller performs control to transmit pairing information or execution request information of the first mirroring application, to the mobile terminal, receives an execution image of the first mirroring application from the mobile terminal through the interface unit, and performs control to display the received execution image of the first mirroring application on the display.

4. The image display apparatus according to claim 1, further comprising a broadcast receiver to receive a broadcast signal, wherein the controller performs control to display the mirroring related menu in an application list based on the user input in a state in which the application list and a broadcast image corresponding to the broadcast signal are displayed.

5. The image display apparatus according to claim 1, further comprising a user input interface unit to exchange data with a remote controller, wherein the controller performs control to display a pointer based on a pointing signal of the remote controller, and in response to a mirroring item being selected based on the pointer, the controller performs control to display the mirroring related menu comprising the mirroring related server information or content associated with the server information.

\* \* \* \* \*